US012087913B2

(12) United States Patent
Rosen et al.

(10) Patent No.: US 12,087,913 B2
(45) Date of Patent: Sep. 10, 2024

(54) THREE-DIMENSIONAL BATTERIES USING CONSTRAINT ADHESIVE

(71) Applicant: Enovix Corporation, Fremont, CA (US)

(72) Inventors: Robert Keith Rosen, Rocklin, CA (US); Bruno A. Valdes, Sunnyvale, CA (US); Murali Ramasubramanian, Fremont, CA (US); Robert S. Busacca, San Francisco, CA (US)

(73) Assignee: Enovix Corporation, Fremont, CA (US)

( * ) Notice: Subject to any disclaimer, the term of this patent is extended or adjusted under 35 U.S.C. 154(b) by 0 days.

(21) Appl. No.: 17/974,923

(22) Filed: Oct. 27, 2022

(65) Prior Publication Data

US 2023/0057582 A1 Feb. 23, 2023

Related U.S. Application Data

(63) Continuation of application No. PCT/US2022/022437, filed on Mar. 30, 2022.
(Continued)

(51) Int. Cl.
*H01M 50/474* (2021.01)
*H01M 4/04* (2006.01)
(Continued)

(52) U.S. Cl.
CPC ..... *H01M 10/0585* (2013.01); *H01M 4/0485* (2013.01); *H01M 10/0525* (2013.01);
(Continued)

(58) Field of Classification Search
CPC .. H01M 50/40; H01M 50/403; H01M 50/474; H01M 4/04; H01M 10/0585; H01M 10/0525
See application file for complete search history.

(56) References Cited

U.S. PATENT DOCUMENTS 10,177,400 B2 1/2019 Busacca et al.
10,770,760 B2 9/2020 Castledine et al.
(Continued)

OTHER PUBLICATIONS

Patent Cooperation Treaty, International Search Report for PCT/US2022/022437, 4 pages Oct. 11, 2022.

*Primary Examiner* — Kenneth J Douyette
(74) *Attorney, Agent, or Firm* — Haley Guiliano LLP

(57) ABSTRACT

An electrode assembly for a secondary battery and method are provided. The electrode assembly comprises a population of unit cells and a constraint system. The electrode assembly comprises a population of electrode structures, a population of counter-electrode structures, and an electrically insulating separator material. The constraint system comprises (i) first and second primary growth constraints separated in the longitudinal direction, (ii) first and second connecting members separated in the vertical direction that connect the first and second primary growth constraints and a subset of the members of the electrode or counter-electrode population. The first and second connecting members are adhered to the subset by an electrically-insulating, thermoplastic, hot-melt adhesive having (i) a melting temperature in the range of 75° C. to 130° C., and (ii) a melt index value as measured according to ASTM D1238 in a range of at least 20 to no more than 350.

19 Claims, 22 Drawing Sheets

Related U.S. Application Data

(60) Provisional application No. 63/168,742, filed on Mar. 31, 2021.

(51) Int. Cl.
*H01M 10/0525* (2010.01)
*H01M 10/0585* (2010.01)
*H01M 50/403* (2021.01)
*H01M 50/46* (2021.01)

(52) U.S. Cl.
CPC ......... *H01M 50/403* (2021.01); *H01M 50/46* (2021.01); *H01M 50/474* (2021.01)

(56) References Cited

U.S. PATENT DOCUMENTS

| | | |
|---|---|---|
| 11,128,020 B2 | 9/2021 | Busacca et al. |
| 2002/0160258 A1 | 10/2002 | Lee et al. |
| 2013/0313754 A1* | 11/2013 | Heckenberger ... H01M 10/0525 264/328.17 |
| 2014/0335410 A1 | 11/2014 | Loveridge et al. |
| 2015/0283965 A1* | 10/2015 | Lynds ................. H01M 10/613 361/434 |
| 2018/0114972 A1 | 4/2018 | Doe et al. |
| 2018/0166665 A1 | 6/2018 | Audebert et al. |
| 2019/0207264 A1 | 7/2019 | Busacca et al. |
| 2020/0313146 A1 | 10/2020 | Busacca et al. |

* cited by examiner

THREE-DIMENSIONAL BATTERIES USING CONSTRAINT ADHESIVE

CROSS REFERENCE TO RELATED APPLICATIONS

The present application is a continuation of International Application No. PCT/US22/22437, filed on Mar. 30, 2022, which claims priority to U.S. Provisional Patent Application No. 63/168,742, filed Mar. 31, 2021. The entire contents of the above applications are hereby incorporated by reference as if recited in full herein.

FIELD OF THE INVENTION

This disclosure generally relates to structures for use in energy storage devices, to energy storage devices employing such structures, and to methods for producing such structures and energy devices.

BACKGROUND

Rocking chair or insertion secondary batteries are a type of energy storage device in which carrier ions, such as lithium, sodium, potassium, calcium or magnesium ions, move between a positive electrode and a negative electrode through an electrolyte. The secondary battery may comprise a single battery cell, or two or more battery cells that have been electrically coupled to form the battery, with each battery cell comprising a positive electrode, a negative electrode, a microporous separator, and an electrolyte.

In rocking chair battery cells, both the positive and negative electrodes comprise materials into which a carrier ion inserts and extracts. As a cell is discharged, carrier ions are extracted from the negative electrode and inserted into the positive electrode. As a cell is charged, the reverse process occurs: the carrier ion is extracted from the positive and inserted into the negative electrode.

When the carrier ions move between electrodes, one of the persistent challenges resides in the fact that the electrodes tend to expand and contract as the battery is repeatedly charged and discharged. The expansion and contraction during cycling tends to be problematic for reliability and cycle life of the battery because when the electrodes expand, electrical shorts and battery failures occur.

Therefore, there remains a need for controlling the expansion and contraction of electrodes during battery cycling to improve reliability and cycle life of the battery.

SUMMARY

Briefly, therefore, one aspect of this disclosure relates to the implementation of constraint adhesive to securely hold constraint structures in position without losing adhesion under long-term exposure to the electrolyte and other conditions of secondary battery cycling, thereby improving the energy density, reliability, and cycle life of batteries.

According to one aspect, an electrode assembly for a secondary battery is provided, the electrode assembly having a population of unit cells, a constraint system, and an adhesive, wherein the electrode assembly has mutually perpendicular longitudinal, transverse, and vertical axes, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction. The electrode assembly further comprises a population of electrode structures, a population of counter-electrode structures, and an electrically insulating separator material electrically separating members of the electrode and counter-electrode structure populations, the members of the electrode and counter-electrode structure populations having opposing upper and lower end surfaces separated in the vertical direction, and wherein each member of the unit cell population comprises an electrode structure, a counter-electrode structure, and an electrically insulating separator between the electrode and counter-electrode structures. The constraint system comprises (i) first and second primary growth constraints separated in the longitudinal direction, (ii) first and second connecting members separated in the vertical direction that connect the first and second primary growth constraints, and a subset of the members of the electrode or counter-electrode structure populations wherein the first and second connecting members have opposing upper and lower inner surfaces to which the upper and lower end surfaces of the subset are adhered, respectively, by an electrically-insulating, thermoplastic, hot-melt adhesive having (i) a melting temperature in the range of 75° C. to 130° C., and (ii) a melt index value as measured according to ASTM D1238 in a range of at least 20 to no more than 350. Another aspect relates to a secondary having the electrode assembly.

According to another aspect, a process of fabricating the secondary battery or electrode assembly is provided, the process including: (a) stacking the population of electrode structures, population of counter-electrode structures, and the population of electrically insulating separator materials electrically separating members of the electrode and counter-electrode populations, in a stacked series; (b) placing a first side of at least one of adhesive film comprising the electrically-insulating, thermoplastic, hot-melt adhesive in contact with upper or lower inner surfaces of the first or second connecting members of the constraint system; (c) placing the upper or lower end surfaces of the subset of the members of the electrode or counter-electrode population in contact with a second side of the at least one adhesive film; and (d) at least partly melting or softening the at least one adhesive film by heating, to adhere the subset of the members of the electrode or counter-electrode population to the first and second connecting members.

Other aspects, features and embodiments of the present disclosure will be, in part, discussed and, in part, apparent in the following description and drawings.

BRIEF DESCRIPTION OF THE DRAWING

FIG. 10 is an inset cross-sectional view of the electrode assembly of FIG. 1B.

Figure 1A:
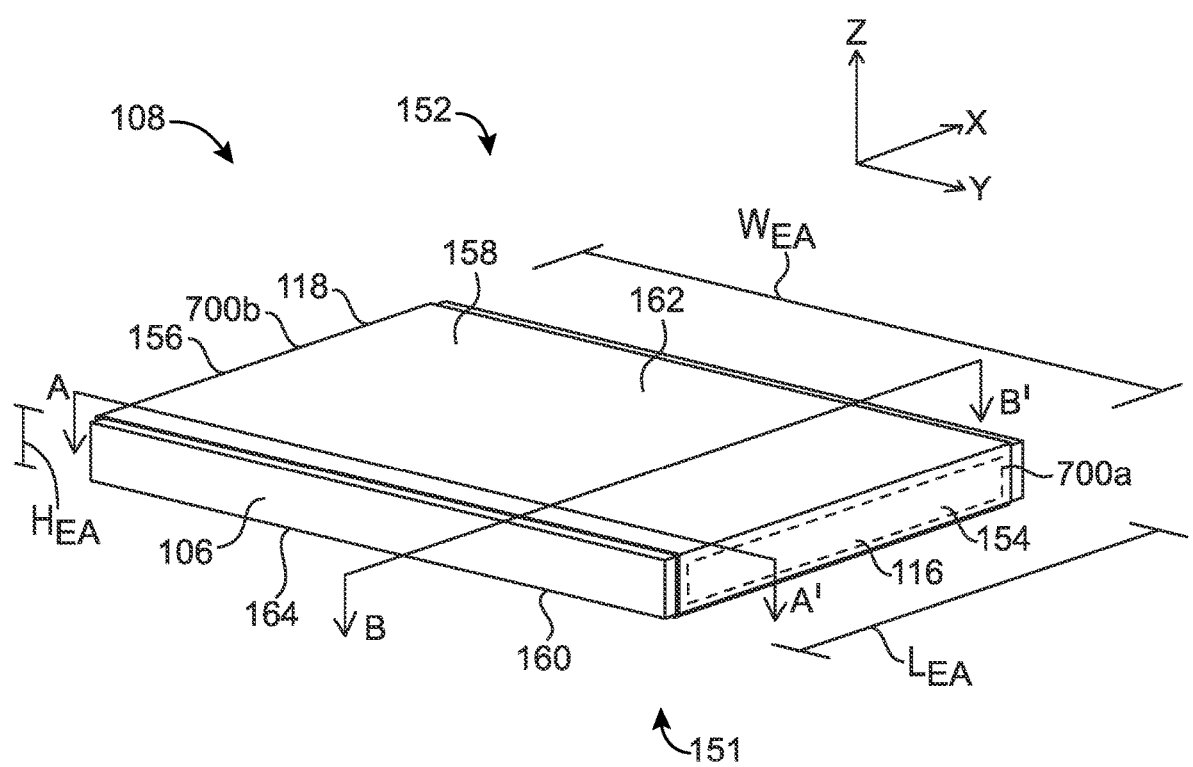
FIG. 1A is a perspective view of one embodiment of an electrode assembly with a set of electrode constraints.

Other aspects, embodiments and features of the inventive subject matter will become apparent from the following detailed description when considered in conjunction with the accompanying drawing. The accompanying figures are schematic and are not intended to be drawn to scale. For purposes of clarity, not every element or component is labeled in every figure, nor is every element or component of each embodiment of the inventive subject matter shown where illustration is not necessary to allow those of ordinary skill in the art to understand the inventive subject matter.

DEFINITIONS

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 µm would include 225 µm to 275 µm. By way of further example, in one instance, about 1,000 µm would include 900 µm to 1,100 µm. Unless otherwise indicated, all numbers expressing quantities (e.g., measurements, and the like) and so forth used in the specification and claims are to be understood as being modified in all instances by the term "about" Accordingly, unless indicated to the contrary, the numerical parameters set forth in the following specification and attached claims are approximations. Each numerical parameter should at least be construed in light of the number of reported significant digits and by applying ordinary rounding techniques.

"Charged stale" as used herein in the context of the stale of a secondary battery refers to a state where the secondary battery is charged to at least 75% of its rated capacity. For example, the battery may be charged to at least 80% of its rated capacity, at least 90% of its rated capacity, and even at least 95% of its rated capacity, such as 100% of its rated capacity.

"C-rate" as used herein refers to a measure of the rate at which a secondary battery is discharged, and is defined as the discharge current divided by the theoretical current draw under which the battery would deliver its nominal rated capacity in one hour. For example, a C-rate of 1C indicates the discharge current that discharges the battery in one hour, a rate of 2C indicates the discharge current that discharges the battery in ½ hours, a rate of C/2 indicates the discharge current that discharges the battery in 2 hours, etc.

"Discharged state" as used herein in the context of the state of a secondary battery refers to a state where the secondary battery is discharged to less than 25% of its rated capacity. For example, the battery may be discharged to less than 20% of its rated capacity, such as less than 10% of its rated capacity, and even less than 5% of its rated capacity, such as 0% of its rated capacity.

A "cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

"Feret diameter" as referred to herein with respect to the electrode assembly is defined as the distance between two parallel planes restricting the electrode assembly measured in a direction perpendicular to the two planes. For example, a Feret diameter of the electrode assembly in the longitudinal direction is the distance as measured in the longitudinal direction between two parallel planes restricting the electrode assembly that are perpendicular to the longitudinal direction. As another example, a Feret diameter of the electrode assembly in the transverse direction is the distance as measured in the transverse direction between two parallel planes restricting the electrode assembly that are perpendicular to the transverse direction. As yet another example, a Feret diameter of the electrode assembly in the vertical direction is the distance as measured in the vertical direction between two parallel planes restricting the electrode assembly that are perpendicular to the vertical direction.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the inventive subject matter herein are not limited to the particular axis or axes used to describe three-dimensional orientations of the elements. Atematively stated, the axes may be interchangeable when referring to three-dimensional aspects of the inventive subject matter.

"Longitudinal direction," "transverse direction," and "vertical direction," as used herein, refer to mutually perpendicular directions (i.e., each are orthogonal to one another). For example, the "longitudinal direction," "transverse direction," and the "vertical direction" as used herein may be generally parallel to the longitudinal axis, transverse axis and vertical axis, respectively, of a Cartesian coordinate system used to define three-dimensional aspects or orientations.

"Repeated cycling" as used herein in the context of cycling between charged and discharged states of the secondary battery refers to cycling more than once from a discharged state to a charged state, or from a charged state to a discharged state. For example, repeated cycling between charged and discharged states can including cycling at least 2 times from a discharged to a charged state, such as in charging from a discharged state to a charged state, discharging back to a discharged state, charging again to a charged state and finally discharging back to the discharged state. As yet another example, repeated cycling between charged and discharged states at least 2 times can include discharging from a charged state to a discharged state, charging back up to a charged state, discharging again to a discharged state and finally charging back up to the charged state By way of further example, repeated cycling between charged and discharged states can include cycling at least 5 times, and even cycling at least 10 times from a discharged to a charged state. By way of further example, the repeated cycling between charged and discharged states can include cycling at least 25, 50, 100, 300, 500 and even 1000 times from a discharged to a charged state.

"Rated capacity" as used herein in the context of a secondary battery refers to the capacity of the secondary battery to deliver a specified current over a period of time, as measured under standard temperature conditions (25° C.). For example, the rated capacity may be measured in units of Amp·hour, either by determining a current output for a specified time, or by determining for a specified current, the time the current can be output, and taking the product of the current and time. For example, for a battery rated 20 Amp·hr, if the current is specified at 2 amperes for the rating, then the battery can be understood to be one that will provide that current output for 10 hours, and conversely if the time is specified at 10 hours for the rating, then the battery can be understood to be one that will output 2 amperes during the 10 hours. In particular, the rated capacity for a secondary battery may be given as the rated capacity at a specified discharge current, such as the C-rate, where the C-rate is a measure of the rate at which the battery is discharged relative to its capacity. For example, a C-rate of 1C indicates the discharge current that discharges the battery in one hour, 2C indicates the discharge current that discharges the battery in ½ hours, C/2 indicates the discharge current that discharges the battery in 2 hours, etc. Thus, for example, a battery rated at 20 Amp·hr a C-rate of 1C would give a discharge current of 20 Amp for 1 hour, whereas a battery rated at 20 Amp.hr at a C-rate of 20 would give a discharge current of 40 Amps for ½ hour, and a battery rated at 20 Amp.hr at a C-rate of C/2 would give a discharge current of 10 Amps over 2 hours.

"Maximum width" ($W_{EA}$) as used herein in the context of a dimension of an electrode assembly corresponds to the greatest width of the electrode assembly as measured from opposing points of longitudinal end surfaces of the electrode assembly in the longitudinal direction.

"Maximum length" ($L_{EA}$) as used herein in the context of a dimension of an electrode assembly corresponds to the greatest length of the electrode assembly as measured from opposing points of a lateral surface of the electrode assembly in the transverse direction.

"Maximum height" ($H_{EA}$) as used herein in the context of a dimension of an electrode assembly corresponds to the greatest height of the electrode assembly as measured from opposing points of the lateral surface of the electrode assembly in the transverse direction.

Furthermore, as used herein, for each embodiment that describes a material or structure using the term "electrode" such as an "electrode structure" or "electrode active material," it is to be understood that such structure and/or material may in certain embodiments correspond that of a "negative electrode", such as a "negative electrode structure" or "negative electrode active material." Similarly, as used herein, for each embodiment that describes a material or structure using the term "counter-electrode" such as a "counter-electrode structure" or "counter-electrode active material," it is to be understood that such structure and/or material may in certain embodiments correspond to that of a "positive electrode," such as a "positive electrode structure" or "positive electrode active material." That is, where suitable, any embodiments described for an electrode and/or counter-electrode may correspond to the same embodiments where the electrode and/or counter-electrode are specifically a negative electrode and/or positive electrode, including their corresponding structures and materials, respectively.

DETAILED DESCRIPTION

In general, the present disclosure is directed to an energy storage device 100, such as a secondary battery 102, as shown for example in FIGS. 1A-1D and 2, that cycles between a charged state and a discharged state. The secondary battery 102 includes a battery enclosure 104, an electrode assembly 106, carrier ions, and a non-aqueous liquid electrolyte within the battery enclosure. In certain embodiments, the secondary battery 102 also includes a constraint system 108 that restrains growth of the electrode assembly 106. The growth of the electrode assembly 106 that is being constrained may be a macroscopic increase in one or more dimensions of the electrode assembly 106.

Figure 1B:
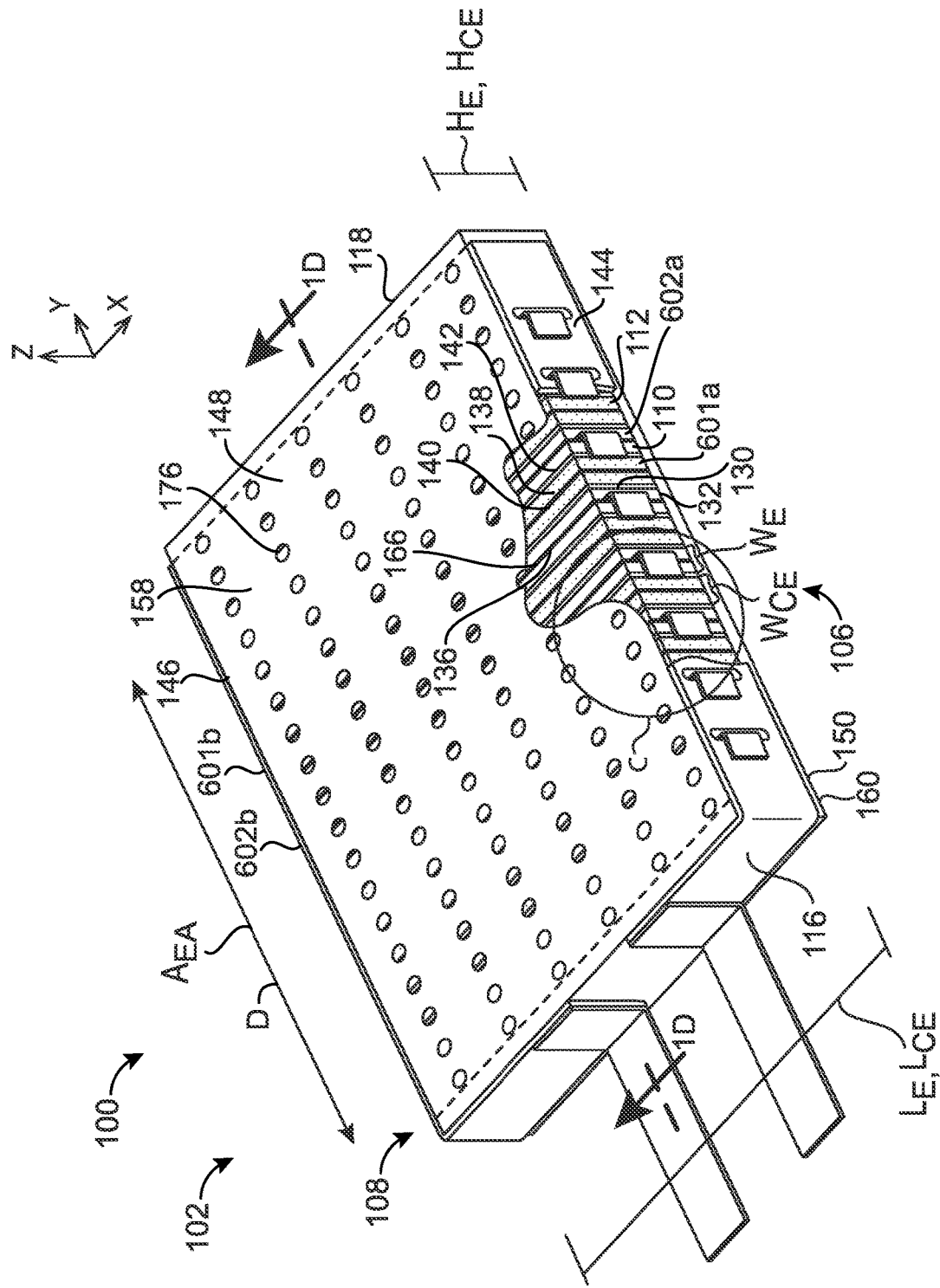
FIG. 1B is a schematic of one embodiment of a three-dimensional electrode assembly for a secondary battery.
Figure 1C:
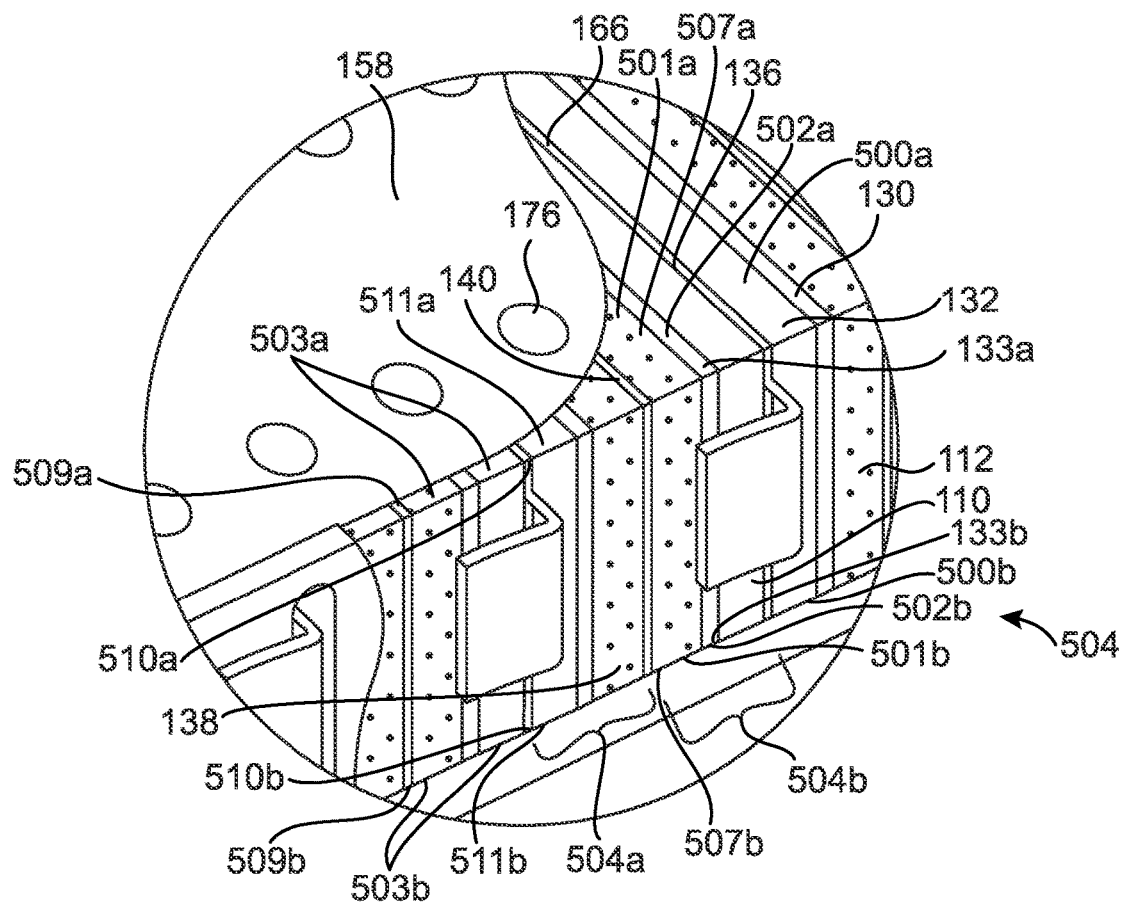
FIG. 1D is a cross-sectional view of the electrode assembly of FIG. 1B, taken along line D in FIG. 1B.
Figure 1D:
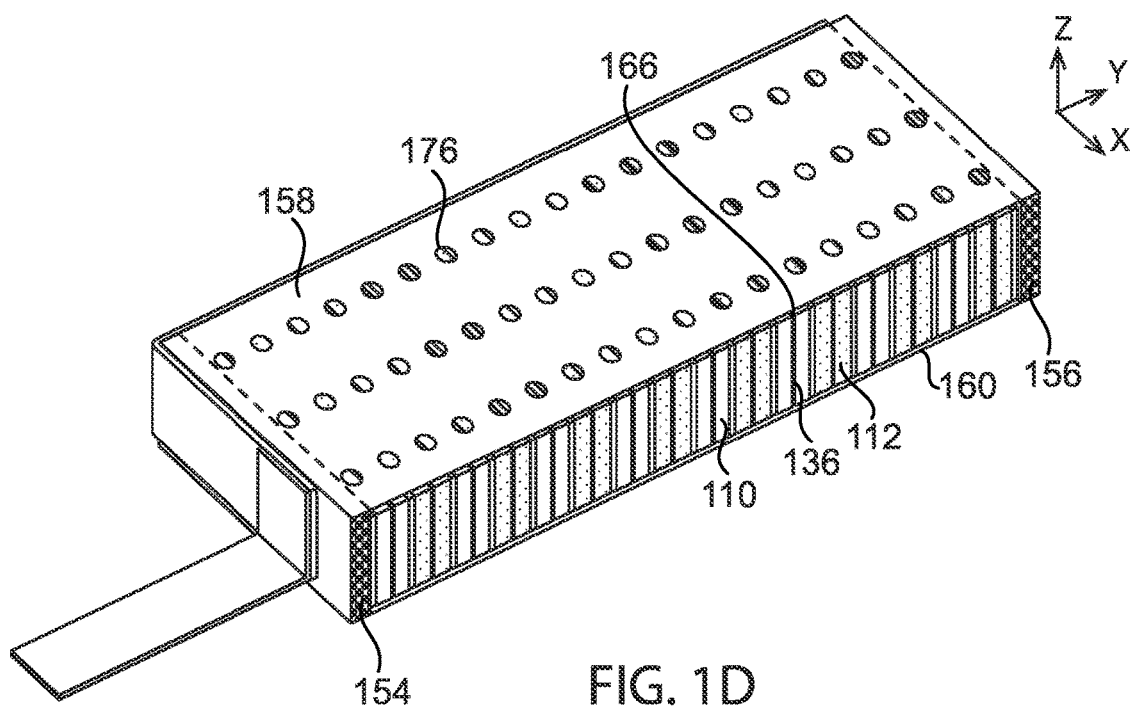

Referring to FIGS. 1A-1D, in one embodiment, the electrode assembly 106 includes a population of unit cells 504 stacked in series in a stacking direction (i.e. stacking direction D in FIG. 1B). Each member of the unit cell population comprises an electrode structure 110, a counter-electrode structures 112, and an electrically insulating separator 130 between the electrode and counter-electrode structures, to electrically insulate the electrode and counter-electrode structures 110, 112 from one another. In one example, as shown in FIG. 1B, the electrode assembly 106 comprises a series of stacked unit cells 504 comprising the electrode structures 110 and counter-electrode structures in an alternating arrangement. FIG. 10 is an inset showing the secondary battery with electrode assembly 106 of FIG. 1B, and FIG. 1D is a cross-section of the secondary battery with electrode assembly 106 of FIG. 1B. Other arrangements of the stacked series of unit cells 504a, 504b, can also be provided. Accordingly, the electrode assembly can comprise a population of electrode structures, a population of counter-electrode structures, and a population of electrically insulating separator materials electrically separating members of the electrode and counter-electrode structure populations, where each member of the unit cell population comprises an electrode structure, a counter-electrode structure, and an electrically insulating separator between the electrode and counter-electrode structures.

In one embodiment, the electrode structure 110 comprises an electrode active material layer 132, and an electrode current collector 136, as shown for example in FIGS. 1A-1D. For example, the electrode structure 110 can comprise an electrode current collector 136 disposed between one or more electrode active material layers 132. According to one embodiment, the electrode active material layer 132 comprises an anode active material, and the electrode current collector 136 comprises an anode current collector. Similarly, in one embodiment, the counter-electrode structure 112 comprises a counter-electrode active material layer 138, and a counter-electrode current collector 140. For example, the counter-electrode structure 112 can comprise a counter-electrode current collector 140 disposed between one or more counter-electrode active material layers 138. According to one embodiment, the counter-electrode active material layer 138 comprises a cathode active material, and the counter-electrode current collector 140 comprises a cathode current collector. Furthermore, it should be understood that the electrode and counter-electrode structures 110 and 112, respectively, are not limited to the specific embodiments and structures described herein, and other configurations, structures, and/or materials other than those specifically described herein can also be provided to form the electrode structures 110 and counter-electrode structures 112. According to certain embodiments, each unit cell 504a, 504b in the unit cell population comprises, in the stacked series, a unit cell portion of the electrode current collector 136, an electrode structure 110 comprising an electrode active material layer 132, an electrically insulating separator 130 between the electrode and counter-electrode active material layers, a counter-electrode structure 113 comprising a counter-electrode active material layer 138, and a unit cell portion of a counter-electrode current collector 140. In certain embodiments, the order of the unit cell portion of the electrode current collector, electrode active material layer, separator, counter-electrode active material layer, and the unit cell portion of the counter-electrode current collector will be reversed for unit cells that are adjacent to one another in the stacked series, with portions of the electrode current collector and/or counter-electrode current collector being shared between adjacent unit cells, as shown for example in FIG. 10.

According to the embodiment as shown in FIGS. 1A-1D, the members of the electrode and counter-electrode structure populations 110, 112, respectively, are arranged in alternating sequence, with a direction of the alternating sequence corresponding to the stacking direction D. The electrode assembly 106 according to this embodiment further comprises mutually perpendicular longitudinal, transverse, and vertical axes, with the longitudinal axis $A_{EA}$ generally corresponding or parallel to the stacking direction D of the members of the electrode and counter-electrode structure populations. As shown in the embodiment in FIG. 1B, the longitudinal axis $A_{EA}$ is depicted as corresponding to the Y axis, the transverse axis is depicted as corresponding to the X axis, and the vertical axis is depicted as corresponding to the Z axis. According to embodiments of the disclosure herein, the electrode structures 110, counter-electrode structures 112 and electrically insulating separators 130 within each unit cell 504 of the unit cell population have opposing upper and lower end surfaces separated in a vertical direction that is orthogonal to the stacking direction of the unit cell population. For example, referring to FIGS. 10 and 4, the electrode structures 110 in each member of the unit cell population can comprise opposing upper and lower end surfaces 500a, 500b separated in the vertical direction, the counter-electrode structures 112 in each member of the unit cell population can comprise opposing upper and lower end surfaces 501a, 501b separated in the vertical direction, and the electrically insulating separator 130 can comprise opposing upper and lower end surfaces 502a, 502b separated in the vertical direction.

Referring to FIGS. 1A-1D, according to one embodiment, the electrode assembly 106 has mutually perpendicular transverse, longitudinal and vertical axes corresponding to the x, y and z axes, respectively, of an imaginary three-dimensional Cartesian coordinate system, a first longitudinal end surface 116 and a second longitudinal end surface 118 separated from each other in the longitudinal direction, and a lateral surface 142 surrounding an electrode assembly longitudinal axis $A_{EA}$ and connecting the first and second longitudinal end surfaces 116, 118. In one embodiment, the surface area of the first and second longitudinal end surfaces 116, 118 is less than 33% of the surface area of the electrode assembly 106. For example, in one such embodiment, the sum of the surface areas of the first and second longitudinal end surfaces 116, 118, respectively, is less than 25% of the surface area of the total surface of the electrode assembly 106. By way of further example, in one embodiment, the sum of the surface areas of the first and second longitudinal end surfaces 116, 118, respectively, is less than 20% of the surface area of the total surface of the electrode assembly. By way of further example, in one embodiment, the sum of the surface areas of the first and second longitudinal end surfaces 116, 118, respectively, is less than 15% of the surface area of the total surface of the electrode assembly. By way of further example, in one embodiment, the sum of the surface areas of the first and second longitudinal end surfaces 116, 118, respectively, is less than 10% of the surface area of the total surface of the electrode assembly.

In one embodiment, the lateral surface 142 comprises first and second regions on opposite sides of the longitudinal axis and separated in a first direction that is orthogonal to the longitudinal axis. For example, the lateral surface 142 can comprise opposing surface regions 144, 146 in the X direction (i.e., the side surfaces of the rectangular prism) and opposing surface regions 148, 150 in the Z direction. In yet another embodiment, the lateral surface can comprise a cylindrical shape. The electrode assembly 106 can further comprise a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction. In one embodiment, a ratio of the maximum length $L_{EA}$ to the maximum height $H_{EA}$ may be at least 2:1. By way of further example, in one embodiment a ratio of the maximum length $L_{EA}$ to the maximum height $H_{EA}$ may be at least 5:1. By way of further example, in one embodiment, the ratio of the maximum length $L_{EA}$ to the maximum height $H_{EA}$ may be at least 10:1. By way of further example, in one embodiment, the ratio of the maximum length $L_{EA}$ to the maximum height $H_{EA}$ may be at least 15:1. By way of further example, in one embodiment, the ratio of the maximum length $L_{EA}$ to the maximum height $H_{EA}$ may be at least 20:1. The ratios of the different dimensions may allow for optimal configurations within an energy storage device to maximize the amount of active materials, thereby increasing energy density.

In some embodiments, the maximum width $W_{EA}$ may be selected to provide a width of the electrode assembly 106 that is greater than the maximum height $H_{EA}$. For example, in one embodiment, a ratio of the maximum width $W_{EA}$ to the maximum height $H_{EA}$ may be at least 2:1. By way of further example, in one embodiment, the ratio of the maximum width $W_{EA}$ to the maximum height $H_{EA}$ may be at least 5:1. By way of further example, in one embodiment, the ratio of the maximum width $W_{EA}$ to the maximum height $H_{EA}$ may be at least 10:1. By way of further example, in one embodiment, the ratio of the maximum width $W_{EA}$ to the maximum height $H_{EA}$ may be at least 15:1. By way of further example, in one embodiment, the ratio of the maximum width $W_{EA}$ to the maximum height $H_{EA}$ may be at least 20:1.

According to one embodiment, a ratio of the maximum width $W_{EA}$ to the maximum length $L_{EA}$ may be selected to be within a predetermined range that provides for an optimal configuration. For example, in one embodiment, a ratio of the maximum width $W_{EA}$ to the maximum length $L_{EA}$ may be in the range of from 1:5 to 5:1. By way of further example, in one embodiment a ratio of the maximum width $W_{EA}$ to the maximum length $L_{EA}$ may be in the range of from 1:3 to 3:1. By way of yet a further example, in one embodiment a ratio of the maximum width $W_{EA}$ to the maximum length $L_{EA}$ may be in the range of from 1:2 to 2:1.

According to embodiments of the present disclosure, each electrode structure 110 of members of the unit cell population comprise a length $L_E$ as measured in the transverse direction between first and second opposing transverse end surfaces 601a, 601b of the electrode structure 110, and a height $H_E$ as measured in the vertical direction between upper and lower opposing vertical end surfaces 500a, 500b of the electrode structure 110, and a width $W_E$ as measured in the longitudinal direction between first and second opposing surfaces 603a, 603b of the electrode structure 110, and each counter-electrode structure 112 of members of the unit cell population comprises a length $L_{CE}$ as measured in the transverse direction between first and second opposing transverse end surfaces 602a, 602b of the counter-electrode structure 112, a height $H_{CE}$ as measured in the vertical direction between upper and lower second opposing vertical end surfaces 501a, 501b of the counter-electrode structure 112, and a width $W_{CE}$ as measured in the longitudinal direction between first and second opposing surfaces 604a, 604b of the counter-electrode structure 112.

According to one embodiment, a ratio of $L_E$ to each of $W_E$ and $H_E$ is at least 5:1, respectively, and a ratio of $H_E$ to $W_E$ is in the range of about 2:1 to about 100:1, for electrode structures 110 of members of the unit cell population, and the ratio of $L_{CE}$ to each of $W_{CE}$ and $H_{CE}$ is at least 5:1, respectively, and a ratio of $H_{CE}$ to $W_{CE}$ is in the range of about 2:1 to about 100:1, for counter-electrode structures 112 of members of the unit cell population. By way of further example, in one embodiment the ratio of $L_E$ to each of $W_E$ and $H_E$ is at least 10:1, and the ratio of $L_{CE}$ to each of $W_{CE}$ and $H_{CE}$ is at least 10:1.

By way of further example, in one embodiment, the ratio of $L_E$ to each of $W_E$ and $H_E$ is at least 15:1, and the ratio of $L_{CE}$ to each of $W_{CE}$ and $H_{CE}$ is at least 15:1. By way of further example, in one embodiment, the ratio of $L_E$ to each of $W_E$ and $H_E$ is at least 20:1, and the ratio of $L_{CE}$ to each of $W_{CE}$ and $H_{CE}$ is at least 20:1.

In one embodiment, the ratio of the height (HE) to the width (WE) of the electrode structures 110 is at least 0.4:1, respectively. For example, in one embodiment, the ratio of $H_E$ to $W_E$ will be at least 2:1, respectively, for each electrode structure 110 of members of the unit cell population. By way of further example, in one embodiment the ratio of $H_E$ to $W_E$ will be at least 10:1, respectively. By way of further example, in one embodiment the ratio of $H_E$ to $W_E$ will be at least 20:1, respectively. Typically, however, the ratio of $H_E$ to $W_E$ will generally be less than 1,000:1, respectively. For example, in one embodiment the ratio of $H_E$ to $W_E$ will be less than 500:1, respectively. By way of further example, in one embodiment the ratio of $H_E$ to $W_E$ will be less than 100:1, respectively. By way of further example, in one embodiment the ratio of $H_E$ to $W_E$ will be less than 10:1, respectively. By way of further example, in one embodiment the ratio of $H_E$ to $W_E$ will be in the range of about 2:1 to about 100:1, respectively, for each electrode structure 110 of members of the unit cell population.

In one embodiment, the ratio of the height ($H_{CE}$) to the width ($W_{CE}$) of the counter-electrode structures 112 is at least 0.4:1, respectively. For example, in one embodiment, the ratio of $H_{CE}$ to $W_{CE}$ will be at least 2:1, respectively, for each counter-electrode structure 112 of members of the unit cell population. By way of further example, in one embodiment the ratio of $H_{CE}$ to $W_{CE}$ will be at least 10:1, respectively. By way of further example, in one embodiment the ratio of $H_{CE}$ to $W_{CE}$ will be at least 20:1, respectively. Typically, however, the ratio of $H_{CE}$ to $W_{CE}$ will generally be less than 1,000:1, respectively. For example, in one embodiment the ratio of $H_{CE}$ to $W_{CE}$ will be less than 500:1, respectively. By way of further example, in one embodiment the ratio of $H_{CE}$ to $W_{CE}$ will be less than 100:1, respectively. By way of further example, in one embodiment the ratio of $H_{CE}$ to $W_{CE}$ will be less than 10:1, respectively. By way of further example, in one embodiment the ratio of $H_{CE}$ to $W_{CE}$ will be in the range of about 2:1 to about 100:1, respectively, for each counter-electrode structure 112 of members of the unit cell population.

In one embodiment, the unit cell populations can comprise alternating sequence of electrode and counter-electrode structures 110 and 112, and, may include any number of members, depending on the energy storage device 100 and the intended use thereof. By way of further example, in one embodiment, and stated more generally, the population of electrode structures 110 and the population of counter-electrode structures 112 each have N members, each of N-1 electrode structure members 110 is between two counter-electrode structure members 112, each of N-1 counter-electrode structure members 112 is between two electrode structure members 110, and N is at least 2. By way of further example, in one embodiment, N is at least 4. By way of further example, in one embodiment, N is at least 5. By way of further example, in one embodiment, N is at least 10. By way of further example, in one embodiment, N is at least 25. By way of further example, in one embodiment, N is at least 50. By way of further example, in one embodiment, N is at least 100 or more.

In one embodiment, the electrode assembly 106 is enclosed within a volume V defined by the constraint system 108 that restrains overall macroscopic growth of the electrode assembly 106, as illustrated for example in FIGS. 1A and 1B. The constraint system 108 may be capable of restraining growth of the electrode assembly 106 along one or more dimensions, such as to reduce swelling and deformation of the electrode assembly 106, and thereby improve the reliability and cycling lifetime of an energy storage device 100 having the constraint system 108. Without being limited to any one particular theory, it is believed that carrier ions traveling between the electrode structures 110 and counter electrode structures 112 during charging and/or discharging of a secondary battery 102 and/or electrode assembly 106 can become inserted into electrode active material, causing the electrode active material and/or the electrode structure 110 to expand. This expansion of the electrode structure 110 can cause the electrodes and/or electrode assembly 106 to deform and swell, thereby compromising the structural integrity of the electrode assembly 106, and/or increasing the likelihood of electrical shorting or other failures. In one example, excessive swelling and/or expansion and contraction of the electrode active material layer 132 during cycling of an energy storage device 100 can cause fragments of electrode active material to break away and/or delaminate from the electrode active material layer 132, thereby compromising the efficiency and cycling lifetime of the energy storage device 100. In yet another example, excessive swelling and/or expansion and contraction of the electrode active material layer 132 can cause electrode active material to breach the electrically insulating microporous separator 130, thereby causing electrical shorting and other failures of the electrode assembly 106. Accordingly, the constraint system 108 inhibits this swelling or growth that can otherwise occur with cycling between charged and discharged states to improve the reliability, efficiency, and/or cycling lifetime of the energy storage device 100.

In one embodiment, a constraint system 108 comprising a primary growth constraint system 151 is provided to mitigate and/or reduce at least one of growth, expansion, and/or swelling of the electrode assembly 106 in the longitudinal direction (i.e., in a direction that parallels the Y axis), as shown for example in FIG. 1A. For example, the primary growth constraint system 151 can include structures configured to constrain growth by opposing expansion at longitudinal end surfaces 116, 118 of the electrode assembly 106. In one embodiment, the primary growth constraint system 151 comprises first and second primary growth constraints 154, 156, that are separated from each other in the longitudinal direction (stacking direction), and that can operate in conjunction with at least one primary connecting member 162 that connects the first and second primary growth constraints 154, 156 together to restrain growth in the electrode assembly 106 in the stacking direction. For example, the first and second primary growth constraints 154, 156 may at least partially cover first and second longitudinal end surfaces 116, 118 of the electrode assembly 106, and may operate in conjunction with connecting members 162, 164 connecting the primary growth constraints 154, 156 to one another to oppose and restrain any growth in the electrode assembly 106 that occurs during repeated cycles of charging and/or discharging.

According to embodiments herein, the primary growth constraint system 151 restrains growth of the electrode assembly 106 in the longitudinal direction such that any increase in the Feret diameter of the electrode assembly 106 in the longitudinal direction over 20 consecutive cycles (cycles between charged and discharges states) of the secondary battery 102 is less than 20%, or over 10 consecutive cycles of the secondary battery is less than 10%, or over 5 consecutive cycles is less than 10%, or is less than 1% per cycle of the battery. In one embodiment, any increase in the Feret diameter of the electrode assembly in the stacking direction over 20 consecutive cycles and/or 50 consecutive cycles of the secondary battery is less than 3% and/or less than 2%.

According to one embodiment, a projection of members of the electrode structure population 110 and the counter-electrode structure population 112 onto the first longitudinal surface circumscribes a first projected area 700a and a projection of the members of the electrode structure population 110 and the counter-electrode structure population 112 onto the second longitudinal surface circumscribes a second projected area 700b, and wherein the first and second primary growth constraints 154, 156 comprises first and second compression members that overlie the first and second projected areas 700a, 700b.

In addition, repeated cycling through charge and discharge processes in a secondary battery 102 can induce growth and strain not only in a longitudinal direction of the electrode assembly 106 (e.g., Y-axis in FIG. 1A), but can also induce growth and strain in directions orthogonal to the longitudinal direction, as discussed above, such as the transverse and vertical directions (e.g., X and Z axes, respectively, in FIG. 1A). Furthermore, in certain embodiments, the incorporation of a primary growth constraint system 151 to inhibit growth in one direction can even exacerbate growth and/or swelling in one or more other directions. For example, in a case where the primary growth constraint system 151 is provided to restrain growth of the electrode assembly 106 in the longitudinal direction, the intercalation of carrier ions during cycles of charging and discharging and the resulting swelling of electrode structures can induce strain in one or more other directions. In particular, in one embodiment, the strain generated by the combination of electrode growth/swelling and longitudinal growth constraints can result in buckling or other failure(s) of the electrode assembly 106 in the vertical direction (e.g., the Z axis as shown in FIG. 1A), or even in the transverse direction (e.g., the X axis as shown in FIG. 1A). Accordingly, in one embodiment of the present disclosure, a secondary growth constraint system 152 is provided that may operate in conjunction with the primary growth constraint system 151 to restrain growth of the electrode assembly 106 along multiple axes of the electrode assembly 106. For example, in one embodiment, the secondary growth constraint system 152 may be configured to interlock with, or otherwise synergistically operate with, the primary growth constraint system 151, such that overall growth of the electrode assembly 106 can be restrained to impart improved performance and reduced incidence of failure of the secondary battery having the electrode assembly 106 and primary and secondary growth constraint systems 151 and 152, respectively.

In one embodiment, a secondary growth constraint system 152 comprising first and second connecting member 158, 160 restrains growth of the electrode assembly 106 in the vertical direction, such that any increase in the Feret diameter of the electrode assembly in the vertical direction over 20 consecutive cycles of the secondary battery is less than 20%, or over 10 consecutive cycles of the secondary battery is less than 10%, or over 5 consecutive cycles is less than 10%, or is less than 1% per cycle of the battery. In one embodiment, any increase in the Feret diameter of the electrode assembly in the vertical direction over 20 consecutive cycles and/or 50 consecutive cycles of the secondary battery is less than 3% and/or less than 2%.

Figure 7A:
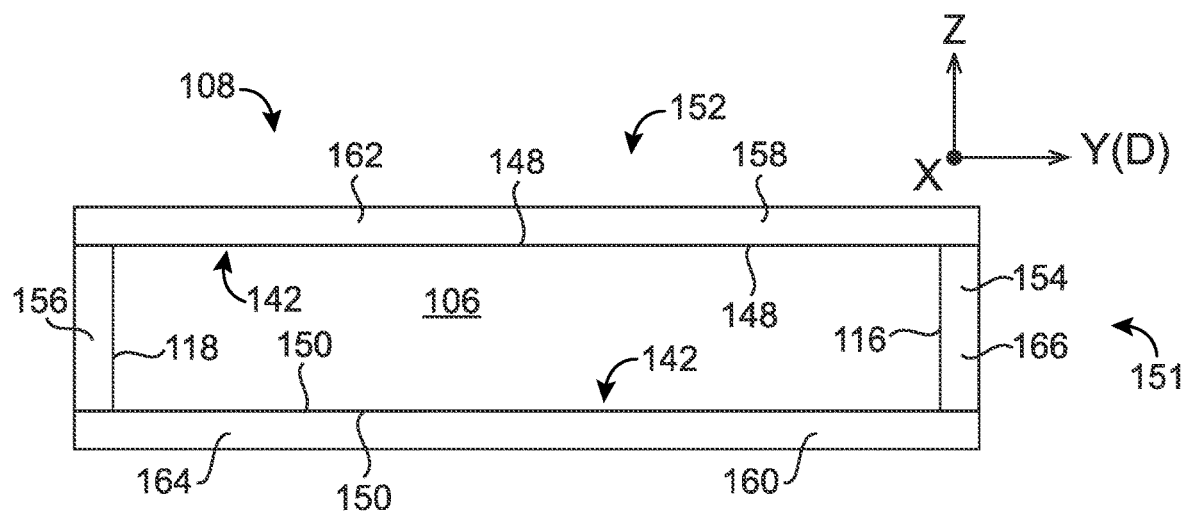
FIG. 7A illustrates a cross-section of an embodiment of the electrode assembly taken along the line A-A' as shown in FIG. 1A, and illustrates elements of embodiments of primary and secondary growth constraint systems.
Figure 7B:
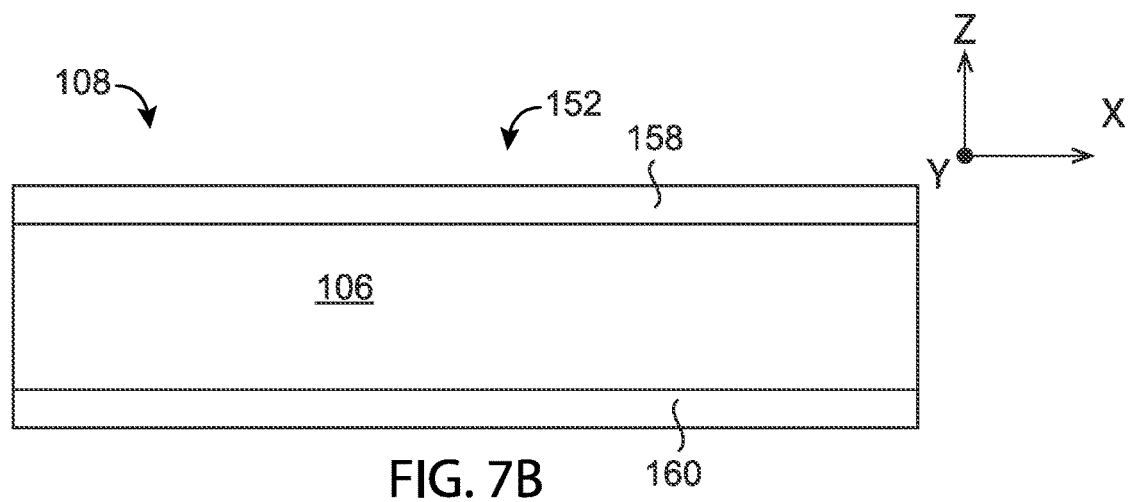
FIG. 7B illustrates a cross-section of an embodiment of the electrode assembly taken along the line B-B' as shown in FIG. 1A, and illustrates elements of embodiments of primary and secondary growth constraint systems.
Figure 7C:
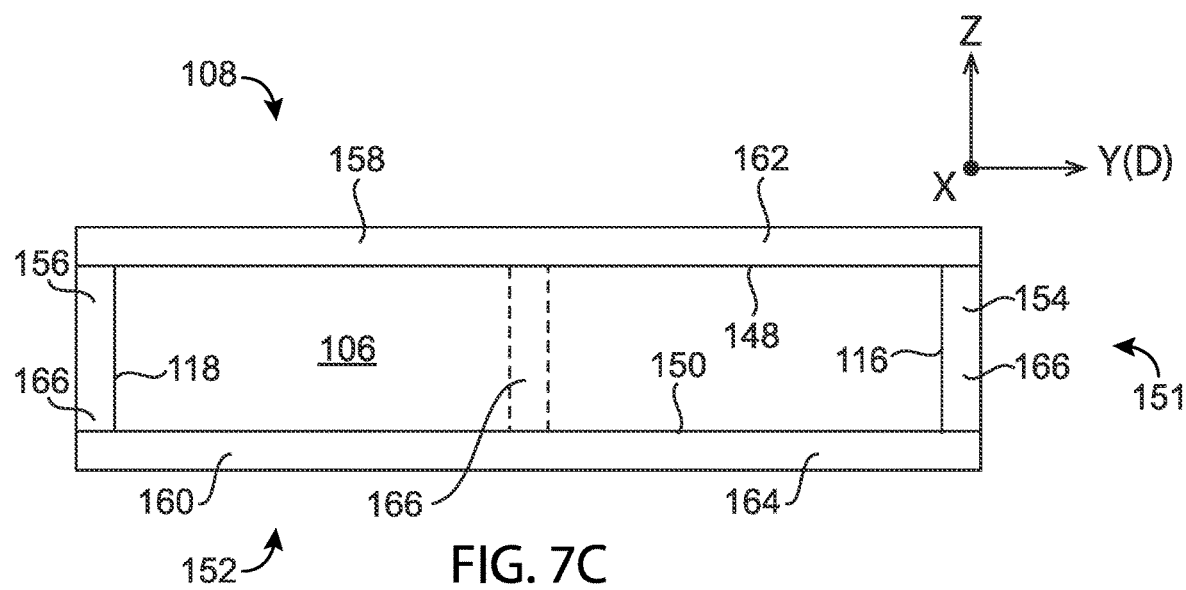
FIG. 7C illustrates a cross section of an embodiment of the electrode assembly taken along the line A-A' as shown in FIG. 1A, and illustrates further elements of embodiments of primary and secondary growth constraint systems.

Referring to FIGS. 7A-7C, an embodiment of a constraint system 108 is shown having the primary growth constraint system 151 and the secondary growth constraint system 152 for an electrode assembly 106. FIG. 7A shows a cross-section of the electrode assembly 106 in FIG. 1A taken along the longitudinal axis (Y axis), such that the resulting 2-D cross-section is illustrated with the vertical axis (Z axis) and longitudinal axis (Y axis). FIG. 7B shows a cross-section of the electrode assembly 106 in FIG. 1A taken along the transverse axis (X axis), such that the resulting 2-D cross-section is illustrated with the vertical axis (Z axis) and transverse axis (X axis). As shown in FIG. 7A, the primary growth constraint system 151 can generally comprise first and second primary growth constraints 154, 156, respectively, that are separated from one another along the longitudinal direction (Y axis). For example, in one embodiment, the first and second primary growth constraints 154, 156, respectively, comprise a first primary growth constraint 154 that at least partially or even entirely covers a first longitudinal end surface 116 of the electrode assembly 106, and a second primary growth constraint 156 that at least partially or even entirely covers a second longitudinal end surface 118 of the electrode assembly 106. In yet another version, one or more of the first and second primary growth constraints 154, 156 may be interior to the longitudinal end surfaces 116, 118 of the electrode assembly 106, such as when one or more of the primary growth constraints comprise an internal structure of the electrode assembly 106. The primary growth constraint system 151 can further comprise at least one primary connecting member 162 that connects the first and second primary growth constraints 154, 156, and that may have a principal axis that is parallel to the longitudinal direction. For example, the primary growth constraint system 151 can comprise first and second primary connecting members 162, 164, respectively, that are separated from each other along an axis that is orthogonal to the longitudinal axis, such as along the vertical axis (Z axis) as depicted in the embodiment. The first and second primary connecting members 162, 164, respectively, can serve to connect the first and second primary growth constraints 154, 156, respectively, to one another, and to maintain the first and second primary growth constraints 154, 156, respectively, in tension with one another, so as to restrain growth along the longitudinal axis of the electrode assembly 106.

Further shown in FIGS. 7A-7C, the constraint system 108 can further comprise the secondary growth constraint system 152, that can generally comprise first and second secondary growth constraints 158, 160, respectively, that are separated from one another along a second direction orthogonal to the longitudinal direction, such as along the vertical axis (Z axis) in the embodiment as shown. For example, in one embodiment, the first secondary growth constraint 158 at least partially extends across a first region 148 of the lateral surface 142 of the electrode assembly 106, and the second secondary growth constraint 160 at least partially extends across a second region 150 of the lateral surface 142 of the electrode assembly 106 that opposes the first region 148. In yet another version, one or more of the first and second secondary growth constraints 158, 160 may be interior to the lateral surface 142 of the electrode assembly 106, such as when one or more of the secondary growth constraints comprise an internal structure of the electrode assembly 106. In one embodiment, the first and second secondary growth constraints 158, 160, respectively, are connected by at least one secondary connecting member 166, which may have a principal axis that is parallel to the second direction, such as the vertical axis. The secondary connecting member 166 may serve to connect and hold the first and second secondary growth constraints 158, 160, respectively, in tension with one another, so as to restrain growth of the electrode assembly 106 along a direction orthogonal to the longitudinal direction, such as for example to restrain growth in the vertical direction (e.g., along the Z axis). In the embodiment depicted in FIG. 7A, the at least one secondary connecting member 166 can correspond to at least one of the first and second primary growth constraints 154, 156. However, the secondary connecting member 166 is not limited thereto, and can alternatively and/or in addition comprise other structures and/or configurations.

According to one embodiment, the primary and secondary growth constraint systems 151, 152, respectively, are configured to cooperatively operate such that portions of the primary growth constraint system 151 cooperatively act as a part of the secondary growth constraint system 152, and/or portions of the secondary growth constraint system 152 cooperatively act as a part of the primary growth constraint system 151. For example, in the embodiment shown in in FIGS. 7A and 7B, the first and second primary connecting members 162, 164, respectively, of the primary growth constraint system 151 can serve as at least a portion of, or even the entire structure of, the first and second secondary growth constraints 158, 160 that constrain growth in the second direction orthogonal to the longitudinal direction. In yet another embodiment, as mentioned above, one or more of the first and second primary growth constraints 154, 156, respectively, can serve as one or more secondary connecting members 166 to connect the first and second secondary growth constrains 158, 160, respectively. Conversely, at least a portion of the first and second secondary growth constraints 158, 160, respectively, can act as first and second primary connecting members 162, 164, respectively, of the primary growth constraint system 151, and the at least one secondary connecting member 166 of the secondary growth constraint system 152 can, in one embodiment, act as one or more of the first and second primary growth constraints 154, 156, respectively. In yet another embodiment, at least a portion of the first and second primary connecting members 162, 164, respectively, of the primary growth constraint system 151, and/or the at least one secondary connecting member 166 of the secondary growth constraint system 152 can serve as at least a portion of, or even the entire structure of, the first and second tertiary growth constraints 157, 159, respectively, that constrain growth in the transverse direction orthogonal to the longitudinal direction. Accordingly, the primary and secondary growth constraint systems 151, 152, respectively, can share components and/or structures to exert restraint on the growth of the electrode assembly 106.

In one embodiment, the constraint system 108 can comprise structures such as the primary and secondary growth constraints, and primary and secondary connecting members, that are structures that are external to and/or internal to the battery enclosure 104, or may be a part of the battery enclosure 104 itself. In certain embodiments, the battery enclosure 104 may be a sealed enclosure, for example to seal liquid electrolyte therein, and/or to seal the electrode assembly 106 from the external environment. In one embodiment, the constraint system 108 can comprise a combination of structures that includes the battery enclosure 104 as well as other structural components. In one such embodiment, the battery enclosure 104 may be a component of the primary growth constraint system 151 and/or the secondary growth constraint system 152; stated differently, in one embodiment, the battery enclosure 104, alone or in combination with one or more other structures (within and/or outside the battery enclosure 104, for example, the primary growth constraint system 151 and/or the secondary growth constraint system 152) restrains growth of the electrode assembly 106 in the electrode stacking direction D and/or in the second direction orthogonal to the stacking direction, D. In one embodiment, one or more of the primary growth constraints 154, 156 and secondary growth constraints 158, 160 can comprise a structure that is internal to the electrode assembly. In another embodiment, the primary growth constraint system 151 and/or secondary growth constraint system 152 do not form any part of the battery enclosure 104, and instead one or more discrete structures (within and/or outside the battery enclosure 104) other than the battery enclosure 104 restrains growth of the electrode assembly 106 in the electrode stacking direction, D, and/or in the second direction orthogonal to the stacking direction, D. In another embodiment, the primary and secondary growth constraint systems 151, 152 are within the battery enclosure 104, which may be a sealed battery enclosure, such as a hermetically sealed battery enclosure. The electrode assembly 106 may be restrained by the constraint system 108 at a pressure that is greater than the pressure exerted by growth and/or swelling of the electrode assembly 106 during repeated cycling of an energy storage device 100 or a secondary battery having the electrode assembly 106.

In one exemplary embodiment, the primary growth constraint system 151 includes one or more discrete structure(s) within the battery enclosure 104 that restrains growth of the electrode structure 110 in the stacking direction D by exerting a pressure that exceeds the pressure generated by the electrode structure 110 in the stacking direction D upon repeated cycling of a secondary battery 102 having the electrode structure 110 as a part of the electrode assembly 106. In another exemplary embodiment, the primary growth constraint system 151 includes one or more discrete structures within the battery enclosure 104 that restrains growth of the counter-electrode structure 112 in the stacking direction D by exerting a pressure in the stacking direction D that exceeds the pressure generated by the counter-electrode structure 112 in the stacking direction D upon repeated cycling of a secondary battery 102 having the counter-electrode structure 112 as a part of the electrode assembly 106. The secondary growth constraint system 152 can similarly include one or more discrete structures within the battery enclosure 104 that restrain growth of at least one of the electrode structures 110 and counter-electrode structures 112 in the second direction orthogonal to the stacking direction D, such as along the vertical axis (Z axis), by exerting a pressure in the second direction that exceeds the pressure generated by the electrode or counter-electrode structure 110, 112, respectively, in the second direction upon repeated cycling of a secondary battery 102 having the electrode or counter electrode structures 110, 112, respectively.

In yet another embodiment, the first and second primary growth constraints 154, 156, respectively, of the primary growth constraint system 151 restrain growth of the electrode assembly 106 by exerting a pressure on the first and second longitudinal end surfaces 116, 118 of the electrode assembly 106, meaning, in a longitudinal direction, that exceeds a pressure exerted by the first and second primary growth constraints 154, 156 on other surfaces of the electrode assembly 106 that would be in a direction orthogonal to the longitudinal direction, such as opposing first and second regions of the lateral surface 142 of the electrode assembly 106 along the transverse axis and/or vertical axis. That is, the first and second primary growth constraints 154, 156, may exert a pressure in a longitudinal direction (Y axis) that exceeds a pressure generated thereby in directions orthogonal thereto, such as the transverse (X axis) and vertical (Z axis) directions. For example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 by the primary growth constraint system 151 in at least one, or even both, of the two directions that are perpendicular to the stacking direction D, by a factor of at least 3. By way of further example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 by the primary growth constraint system 151 in at least one, or even both, of the two directions that are perpendicular to the stacking direction D by a factor of at least 4. By way of further example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 in at least one, or even both, of the two directions that are perpendicular to the stacking direction D, by a factor of at least 5.

Referring now to FIG. 7C, an embodiment of an electrode assembly 106 with a constraint system 108 is shown, with a cross-section taken along the line A-A' as shown in FIG. 1A. In the embodiment shown in FIG. 7C, the primary growth constraint system 151 can comprise first and second primary growth constraints 154, 156, respectively, at the longitudinal end surfaces 116, 118 of the electrode assembly 106, and the secondary growth constraint system 152 comprises first and second secondary growth constraints 158, 160 at the opposing first and second surface regions 148, 150 of the lateral surface 142 of the electrode assembly 106. According to this embodiment, the first and second primary growth constraints 154, 156 can serve as the at least one secondary connecting member 166 to connect the first and second secondary growth constrains 158, 160 and maintain the growth constraints in tension with one another in the second direction (e.g., vertical direction) that is orthogonal to the longitudinal direction. However, additionally and/or alternatively, the secondary growth constraint system 152 can comprise at least one secondary connecting member 166 that is located at a region other than the longitudinal end surfaces 116, 118 of the electrode assembly 106. Also, the at least one secondary connecting member 166 can be understood to act as at least one of a first and second primary growth constraint 154, 156 that is internal to the longitudinal ends 116, 118 of the electrode assembly, and that can act in conjunction with either another internal primary growth restraint and/or a primary growth restraint at a longitudinal end 116, 118 of the electrode assembly 106 to restrain growth. Referring to the embodiment shown in FIG. 7C, a secondary connecting member 166 can be provided that is spaced apart along the longitudinal axis away from the first and second longitudinal end surfaces 116, 118, respectively, of the electrode assembly 106, such as toward a central region of the electrode assembly 106. The secondary connecting member 166 can connect the first and second secondary growth constraints 158, 160, respectively, at an interior position from the electrode assembly end surfaces 116, 118, and may be under tension between the secondary growth constraints 158, 160 at that position. In one embodiment, the secondary connecting member 166 that connects the secondary growth constraints 158, 160 at an interior position from the end surfaces 116, 118 is provided in addition to one or more secondary connecting members 166 provided at the electrode assembly end surfaces 116, 118, such as the secondary connecting members 166 that also serve as primary growth constraints 154, 156 at the longitudinal end surfaces 116, 118. In another embodiment, the secondary growth constraint system 152 comprises one or more secondary connecting members 166 that connect with first and second secondary growth constraints 158, 160, respectively, at interior positions that are spaced apart from the longitudinal end surfaces 116, 118, with or without secondary connecting members 166 at the longitudinal end surfaces 116, 118. The interior secondary connecting members 166 can also be understood to act as first and second primary growth constraints 154, 156, according to one embodiment. For example, in one embodiment, at least one of the secondary connecting members 166 located at interior position(s) can comprise at least a portion of an electrode or counter electrode structure 110, 112, as described in further detail below.

More specifically, with respect to the embodiment shown in FIG. 7C, the secondary growth constraint system 152 may include a first secondary growth constraint 158 that overlies an upper region 148 of the lateral surface 142 of electrode assembly 106, and an opposing second secondary growth constraint 160 that overlies a lower region 150 of the lateral surface 142 of electrode assembly 106, the first and second secondary growth constraints 158, 160 being separated from each other in the vertical direction (i.e., along the Z-axis). Additionally, secondary growth constraint system 152 may further include at least one interior secondary connecting member 166 that is spaced apart from the longitudinal end surfaces 116, 118 of the electrode assembly 106. The interior secondary connecting member 166 may be aligned parallel to the Z axis and connects the first and second secondary growth constraints 158, 160, respectively, to maintain the growth constraints in tension with one another, and to form at least a portion of the secondary growth constraint system 152. In one embodiment, the at least one interior secondary connecting member 166, either alone or with secondary connecting members 166 located at the longitudinal end surfaces 116, 118 of the electrode assembly 106, may be under tension between the first and secondary growth constraints 158, 160 in the vertical direction (i.e., along the Z axis), during repeated charge and/or discharge of an energy storage device 100 and/or a secondary battery 102 having the electrode assembly 106, to reduce growth of the electrode assembly 106 in the vertical direction. Furthermore, in the embodiment as shown in FIG. 7C, the constraint system 108 further comprises a primary growth constraint system 151 having first and second primary growth constraints 154, 156, respectively, at the longitudinal ends 116, 118 of the electrode assembly 106, that are connected by first and second primary connecting members 162, 164, respectively, at the upper and lower lateral surface regions 148, 150, respectively, of the electrode assembly 106. In one embodiment, the secondary interior connecting member 166 can itself be understood as acting in concert with one or more of the first and second primary growth constraints 154, 156, respectively, to exert a constraining pressure on each portion of the electrode assembly 106 lying in the longitudinal direction between the secondary interior connecting member 166 and the longitudinal ends 116, 118 of the electrode assembly 106 where the first and second primary growth constraints 154, 156, respectively, can be located.

Figure 3A:
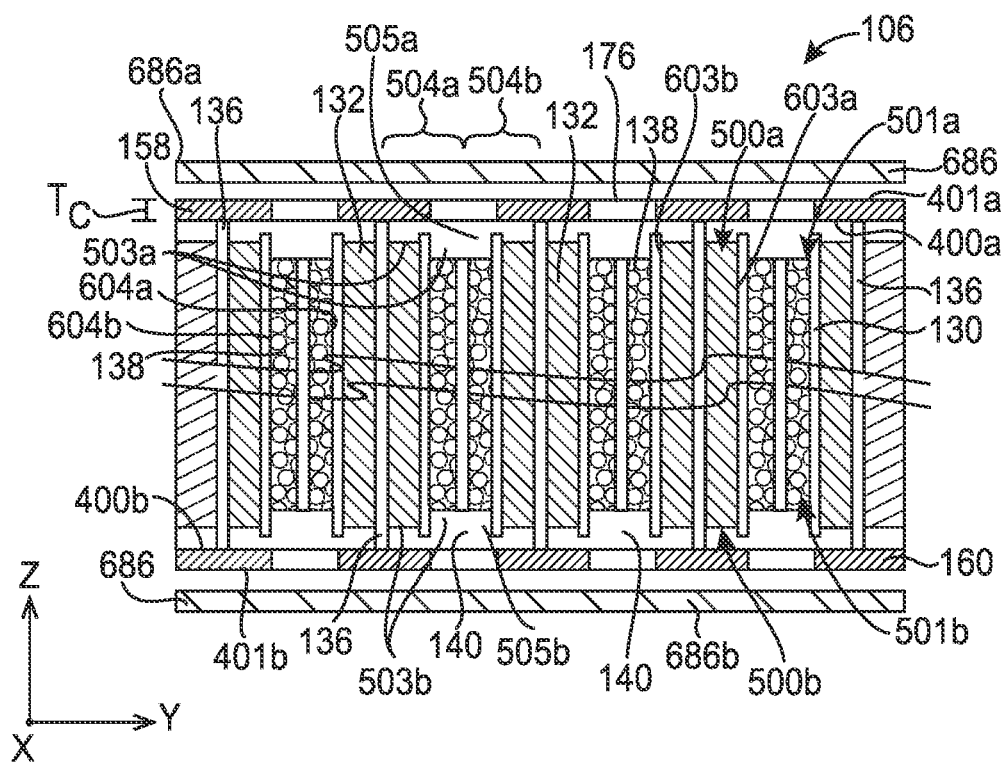
FIG. 3A illustrates a cross-section in a Z-Y plane, of embodiments of an electrode assembly, with an auxiliary electrodes.
Figure 3B:
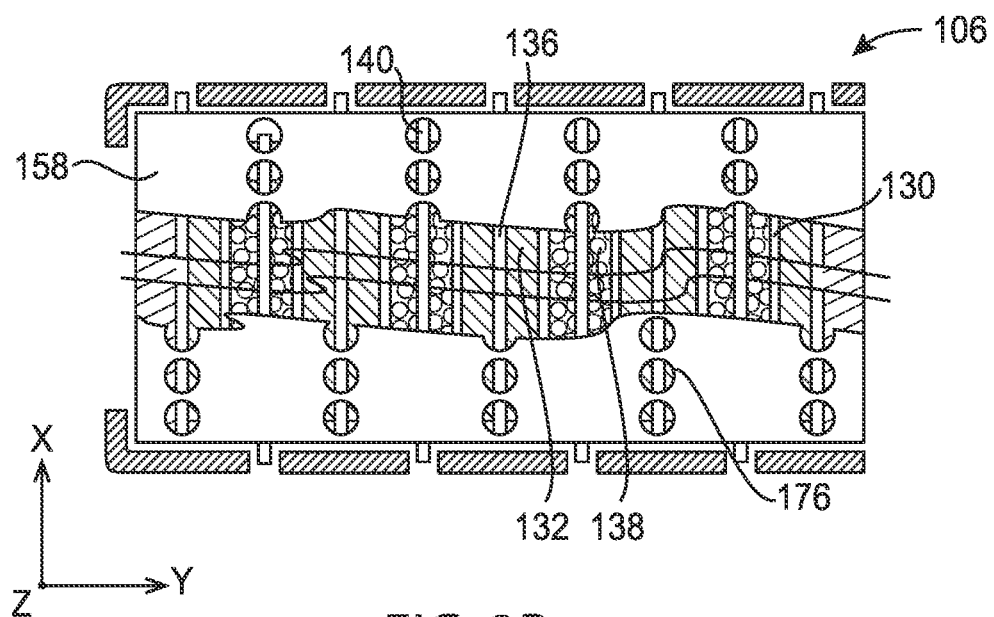
FIG. 3B illustrates a top view in the X-Y plane, of embodiments of an electrode assembly, with a constraint system having apertures therein.
Figure 4:
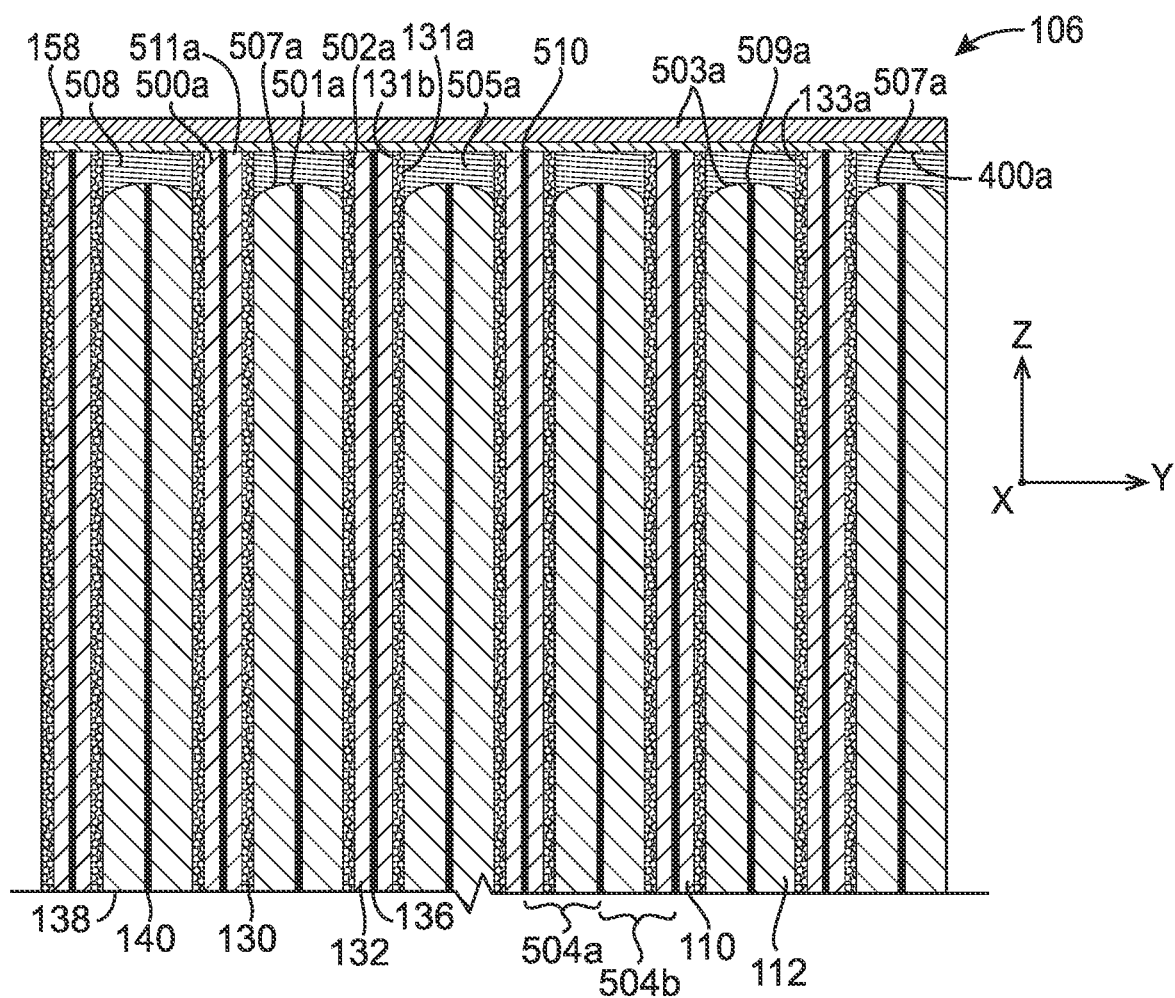
FIG. 4 is a cross-sectional view of an embodiment of an electrode assembly bonded to a constraint system.
Figure 5:
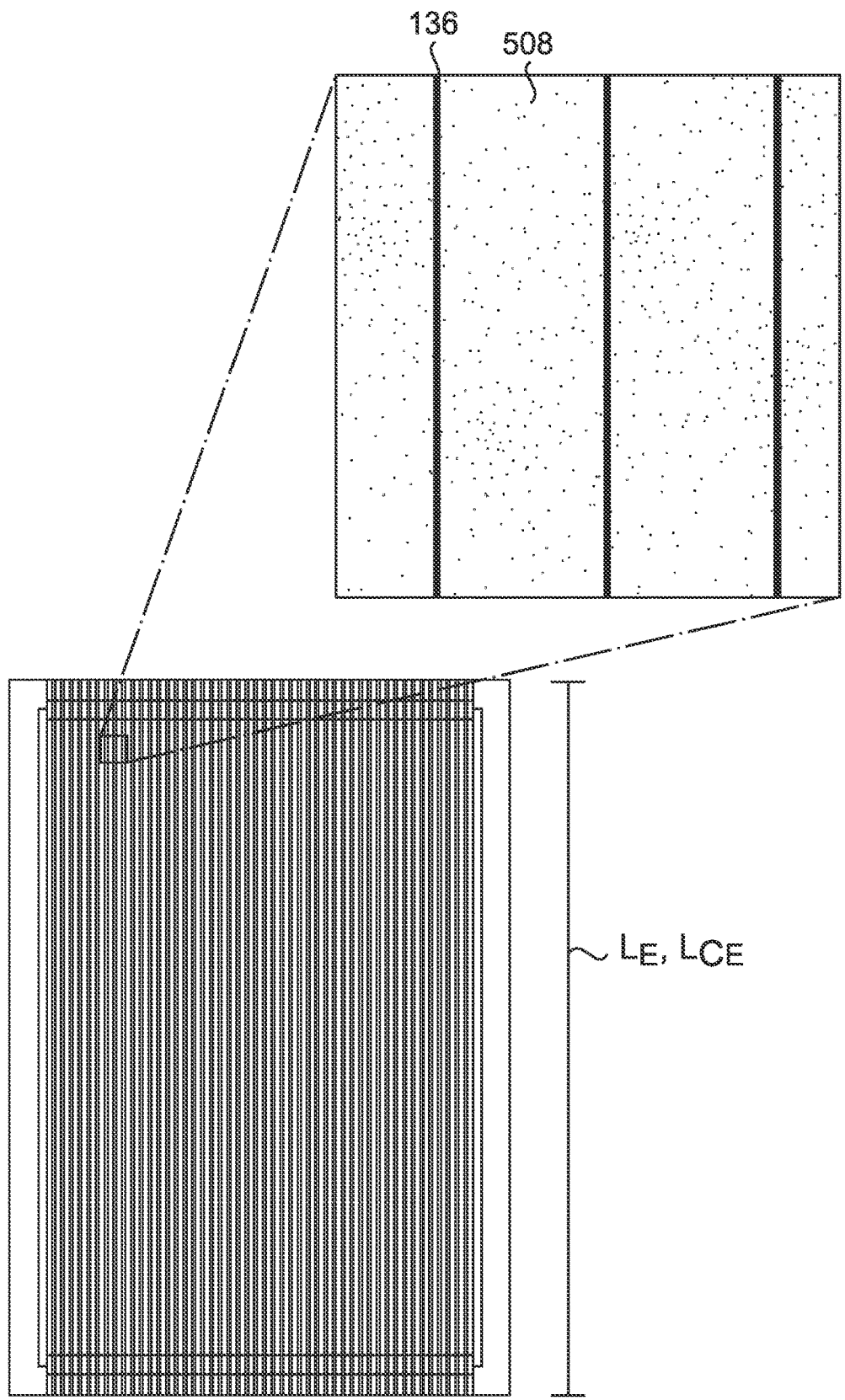
FIG. 5 is a top view of an embodiment of an electrode assembly illustrating upper end surface of electrode current collectors prior to adhering to a constraint system.

According to one embodiment, the first and second primary connecting members 162, 164 (which may be the same as the first and second secondary growth constraints 158, 160), respectively, are connected to a secondary connecting member 166 that comprises at least a portion of an electrode 110 or counter electrode 112 structure, or other interior structure of the electrode assembly 106. In one embodiment, the first primary connecting member 162 (which may be the first secondary growth constraint 158) is connected to the upper end surface(s) 500*a*, 501*a* of the electrode and/or counter-electrode structures 110, 112 of a subset 515 of members of the unit cell population 504. In another embodiment, the second primary connecting member 164 (which may be the second secondary growth constraint 160) is connected to the lower end surface(s) 500*b*, 501*b* of the electrode or counter-electrode structures 110, 112 of a subset 515 of members of the unit cell population 504. The subset 515 of the unit cell members that are connected at the upper end surface(s) may be the same as the subset of unit cell members that are connected at the lower end surface(s), or may be different subsets. In one embodiment, the first and/or second secondary growth constraints 158, 160 can be connected to other interior structures in the electrode assembly forming the secondary connecting member 166. In one embodiment, the first and/or second secondary growth constraints 158, 160 may be connected to upper and/or lower end surfaces of the electrode structures 110 and/or counter-electrode structures 112 including one or more of the electrode current collector 136, electrode active material layer 132, counter-electrode current collector 140 and counter-electrode active material layer 138, in members of the unit cell population 504. In another example, the first and second secondary growth constraints 158, 160 can be connected to upper and/or lower end surfaces of the electrically insulating separator 130. Accordingly, the secondary connecting member 166 can comprise, in certain embodiments, one or more of the electrode structures 110 and/or counter-electrodes structures 112 including one or more of the electrode current collector 136, electrode active material layer 132, counter-electrode current collector 140 and counter-electrode active material layer 138, in members of the unit cell population 504. Referring to FIGS. 3A-3B, embodiments are shown in which the first and second secondary growth constraints 158, 160 are connected to secondary connecting members 166 comprising the electrode current collectors 136 of subsets of members of the unit cell population. In FIGS. 10 and 4, the first and second secondary growth constraints 158, 160 are connected to secondary connecting members 166 comprising electrode structures 110 including the electrode current collectors 136. In one embodiment, members of the population of electrode structures 110 comprise electrode current collectors 136 having opposing upper and lower end surfaces 510*a*, 510*b* in the vertical direction, and members of the population of counter-electrode structures comprise counter-electrode current collectors 140 having opposing upper and lower end surfaces 509*a*, 509*b* in the vertical direction, and wherein the first and second connecting members 162, 164 are connected to vertical end surfaces of the electrode and/or counter-electrode current collectors of the subset of members of the electrode and/or counter-electrode population.

Referring to FIGS. 3A and 4, in one embodiment, the first and second primary connecting members 162, 164 separated in the vertical direction respectively connect the first and second primary growth constraints 154, 156, and further connect to a subset of the members of the electrode or counter-electrode population 110, 112. According to embodiments herein, the first and second connecting members 158, 160 have opposing upper and lower inner surfaces

400a, 400b to which the upper and lower end surfaces of the subset 500a, 501a, 500b, 501b are adhered, respectively, by an electrically-insulating, thermoplastic, hot-melt adhesive 511. In some embodiments, the hot-melt adhesive 511 has a melting temperature in the range of 75° C. to 130° C., preferably in the range of 77° C. to 100° C. In further embodiments, the hot-melt adhesive has a melt index value as measured according to ASTM D1238 in a range of at least 20 to no more than 350, preferably in a range of at least 70 to no more than 350. In some embodiments, the hot-melt adhesive 511 comprises a material selected from but not limited to EM (ethylene-co-acrylic acid), EMAA (ethylene-co-methacrylic acid), functionalized polyethylenes and polypropylenes, and combinations thereof. For example, in one embodiment, the hot melt adhesive comprises a mixture of EM and EMAA copolymers. In some embodiments, the hot-melt adhesive 511 does not significantly react or lose adhesion at temperature at or above about 80° C. In some embodiments, the hot-melt adhesive 511 does not significantly lose adhesion over 200, 500, 800 and/or 1000 consecutive cycles of the secondary battery. In one embodiment, the hot-melt adhesive 511 has a film shape with a thickness in the range of about 10 to about 100 micrometers and a predetermined pattern geometry.

Referring to FIGS. 3A-3B, in one embodiment, the first and/or second primary connecting members 162, 164 (which may be the same or different from the first and/or second secondary growth constraints 158, 160) comprise apertures 176 formed through respective vertical thicknesses Tc thereof. According to embodiments herein, the apertures 176 can provide passages for the flow of carrier ions from an auxiliary electrode 686 through the first and/or second primary connecting members 162, 164 and to members of the unit cell population. For example, for an auxiliary electrode 686 located outside the volume V enclosed by the constraint system 108, e.g. positioned externally to first and/or second primary connecting members 162, 164, the carrier ions provided from the auxiliary electrode 686 can access the unit cell member of the electrode assembly inside the constraints, via passage through the apertures. The auxiliary electrode 686 may be selectively electrically connected or coupled to one or more of the electrode structures 110 and/or the counter-electrode structures 112 of the unit cell members, e.g., by a switch and/or a control unit (not shown). According to certain embodiments, the auxiliary electrode is electrolytically or otherwise coupled to the counter-electrode structure and/or the electrode structure (e.g. through the separator) of members of the unit cell population, to provide a flow of carrier ions from the auxiliary electrode to the electrode and/or counter-electrode structures. By electrolytically coupled, it is meant that the carrier ions can be transferred through electrolyte, such as from the auxiliary electrode to the electrode and/or counter-electrode structures 110, 112, as well as between electrode and counter-electrode structures 110, 112. The auxiliary electrode 686 is also electrically coupled directly or indirectly to the electrode and/or counter-electrode structures 110, 112, such by a series of wires or other electrical connection.

Figure 6:
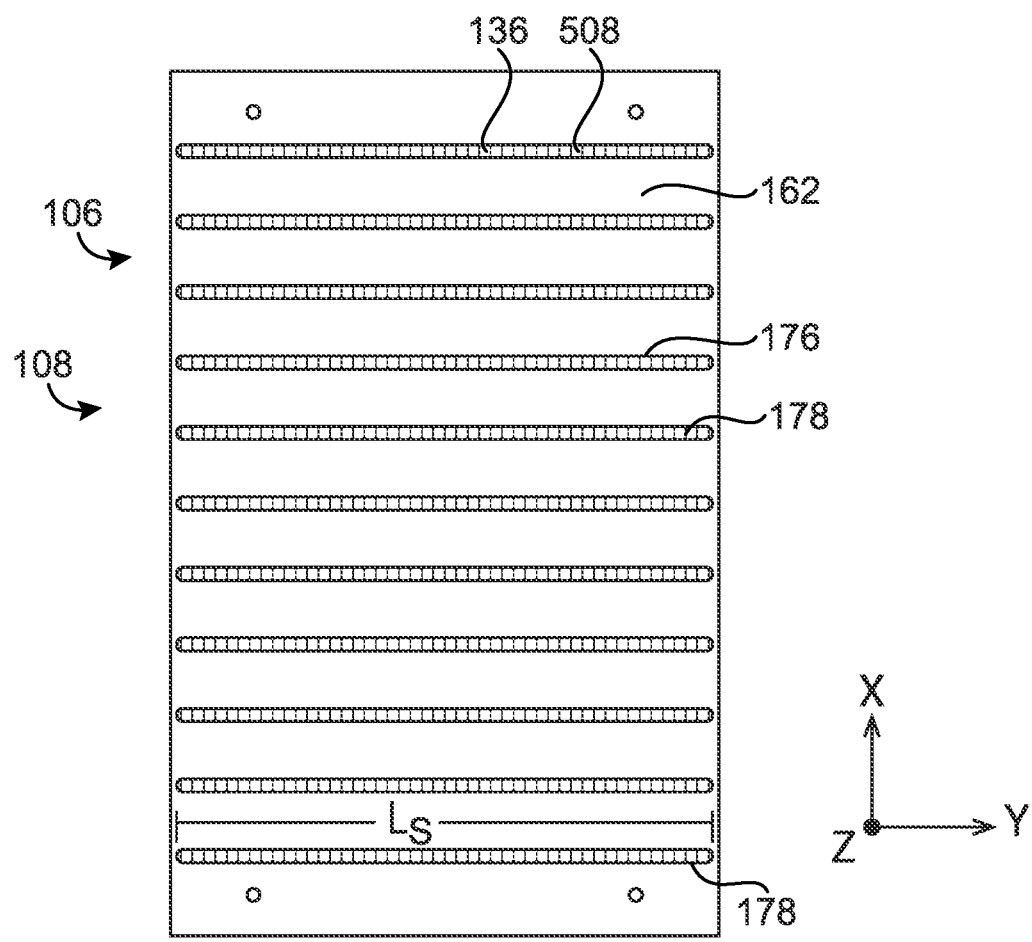
FIG. 6 is a top view of the embodiment of the electrode assembly of FIG. 5, after the constraint system has been adhered.

In the embodiment shown in FIG. 6, which depicts a top view of electrode assembly 106 showing the first primary connecting members 162, the apertures 176 comprise a slot-shape with the elongated dimension oriented in the longitudinal and/or stacking direction (Y-direction), and which extends across a plurality of unit cell members. Other shapes and/or configurations of the apertures 176 may also be provided. For example, in one embodiment, the plurality of apertures comprise a plurality of slots 178 spaced apart from one another in a transverse direction that is orthogonal to the stacking direction and the vertical direction, each slot 178 having a longitudinal axis Ls oriented in the stacking direction, and wherein each slot extends across a plurality of members of the unit cell population. In some embodiments, the first and/or second primary connecting members 162, 164 comprise bonding regions 901a, 901b of the inner surfaces 400a, 400b that are adjacent the apertures 176, where the hot melt adhesive 511 is provided for adhering to the subset of the members of the electrode and/or counter-electrode population 110, 112. As shown in FIGS. 100 and 10D, in some embodiments, the apertures 176 comprise a plurality of slots extending in the longitudinal direction, and the bonding regions 901a, 901b that adhere to the subset of the members of the electrode and/or counter-electrode population 110, 112 are located on inner surface regions 400a, 400b in between the slots of the first and/or second connecting members 158, 160.

In one embodiment, a method for preparing an electrode assembly 106 comprising a constraint system 108 is provided, where the electrode assembly 106 may be used as a part of a secondary battery that is configured to cycle between a charged state and a discharged state. The method can generally comprise forming a sheet structure, cutting the sheet structure into pieces (and/or pieces), stacking the pieces, and applying a constraint system. By strip, it is understood that a piece other than one being in the shape of a strip could be used. The pieces comprise an electrode active material layer 132, an electrode current collector 136, a counter-electrode active material layer 138, a counter-electrode current collector 140, and a separator 130, and may be stacked so as to provide an alternating arrangement of electrode active material and/or counter-electrode active material. The sheets can comprise, for example, at least one of a unit cell 504 and/or a component of a unit cell 504. For example, the sheets can comprise a population of unit cells, which can be cut to a predetermined size (such as a size suitable for a 3D battery), and then the sheets of unit cells can be stacked to form the electrode assembly 106. In another example, the sheets can comprise one or more components of a unit cell, such as for example at least one of an electrode current collector 136, an electrode active material layer 132, a separator 130, a counter-electrode active material layer 138, and a counter-electrode current collector 140. The sheets of components can be cut to predetermined sizes to form the pieces (such as sizes suitable for a 3D battery), and then stacked to form an alternating arrangement of the electrode and counter-electrode active material layer components.

In yet another embodiment, the constraint system 108 that is applied may correspond to any of those described herein, such as for example a constraint system 108 comprising a primary growth constraint system 151 comprising first and second primary growth constraints 154, 156 and at least one primary connecting member 162, the first and second primary growth constraints 154, 156 separated from each other in the longitudinal direction, and the at least one primary connecting member 162 connecting the first and second primary growth constraints 154, 156. Furthermore, the constraint system 108 can comprise a secondary growth constraint system 152 comprising first and second secondary growth constraints 158, 160 separated in a direction orthogonal to the longitudinal direction (such as the vertical or transverse direction) and connected by at least one secondary connecting member 166, wherein the secondary growth constraint system 152 at least partially restrains growth of the electrode assembly in the vertical direction upon cycling of the secondary battery 102. At least one of the primary connecting member 162, or first and/or second primary growth constraints 154, 156 of the primary growth constraint system 151, and the secondary connecting member 166, or first and/or second secondary growth constraints 158, 160 of the secondary growth constraint system 152, can be one or more of the assembly components that make up the pieces, such as for example at least one of the electrode active material layer 132, electrode current collector 136, counter-electrode active material layer 138, counter-electrode current collector 140, and separator 130. For example, in one embodiment, the primary connecting member 162 of the primary growth constraint system 151, can be one or more of the assembly components that make up the pieces, such as for example at least one of the electrode active material layer 132, electrode current collector 136, counter-electrode active material layer 138, counter-electrode current collector 140, and separator 130. That is, the application of the constraints may involve applying the first and second primary growth constraints 154, 156 to a primary member connecting member 162 that is one of the structures in the stack of pieces.

Figure 2:
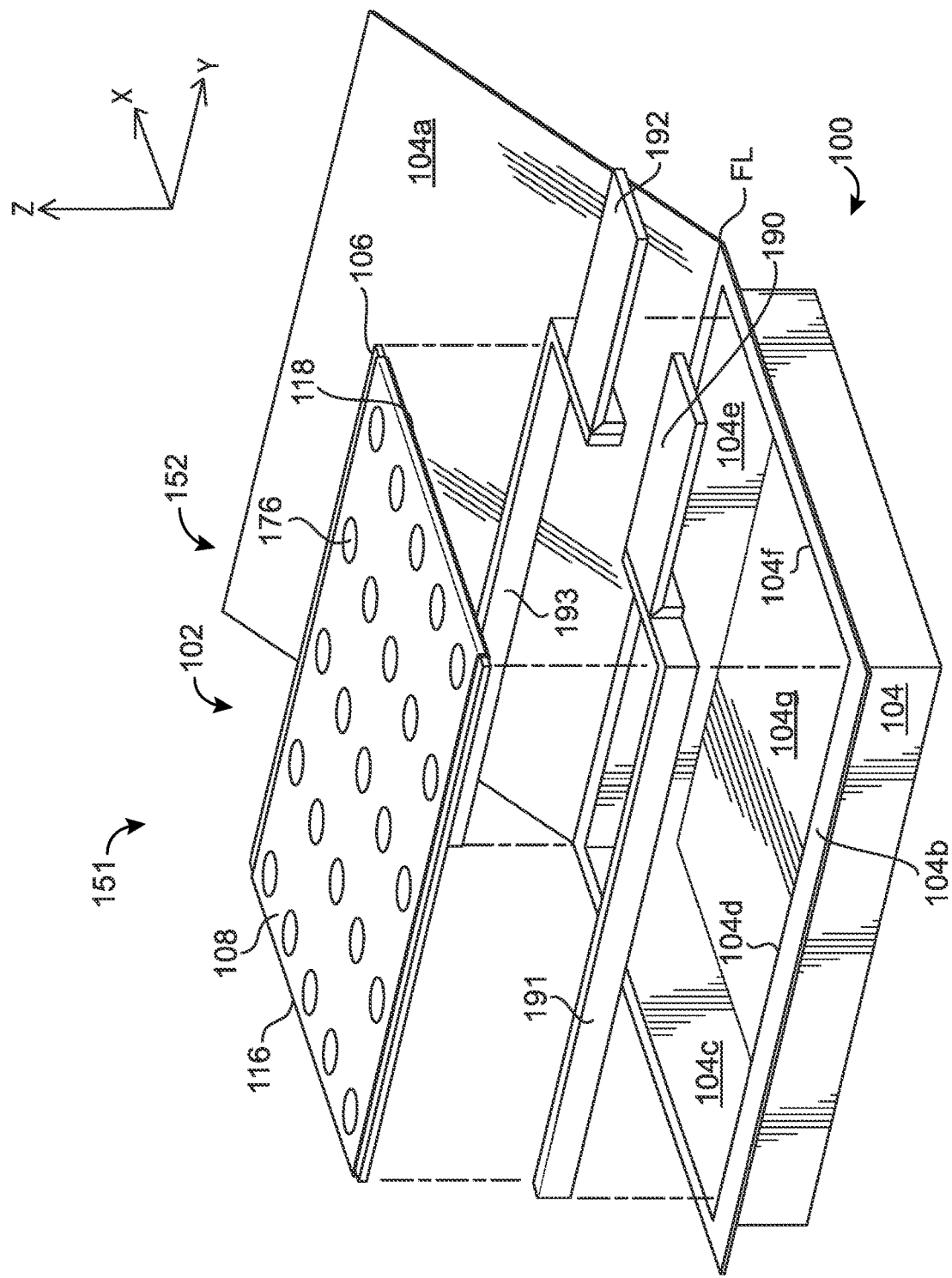
FIG. 2 illustrates an exploded view of an embodiment of an energy storage device or a secondary battery comprising an electrode assembly and a set of electrode constraints.

Referring now to FIG. 2, illustrated is an exploded view of one embodiment of a secondary battery 102 having a constraint system 108 of the present disclosure. The secondary battery 102 includes battery enclosure 104 and an electrode assembly 106 within the battery enclosure 104, the electrode assembly 106 having a first longitudinal end surface 116, an opposing second longitudinal end surface 118 (i.e., separated from first longitudinal end surface 116 along the Y axis the Cartesian coordinate system shown), as described above. Alternatively, the secondary battery 102 may comprise just a single electrode assembly 106 with a constraint system 108. Each electrode assembly 106 includes a population of electrode structures 110 and a population of counter-electrode structures 112, stacked relative to each other within each of the electrode assemblies 106 in a stacking direction D; stated differently, the populations of electrode 110 and counter-electrode 112 structures are arranged in an alternating series of electrodes 110 and counter-electrodes 112 with the series progressing in the stacking direction D between first and second longitudinal end surfaces 116, 118, respectively.

According to the embodiment shown in FIG. 2, tabs 190, 192 project out of the battery enclosure 104 and provide an electrical connection between the electrode assemblies 106 and an energy supply or consumer (not shown). More specifically, in this embodiment tab 190 is electrically connected to tab extension 191 (e.g., using an electrically conductive glue), and tab extension 191 is electrically connected to the electrodes 110 comprised by each of the electrode assemblies 106. Similarly, tab 192 is electrically connected to tab extension 193 (e.g., using an electrically conductive glue), and tab extension 193 is electrically connected to the counter-electrodes 112 comprised by each of electrode assemblies 106. The tab extensions 191, 193 may also serve as bus bars that pool current from each of the respective electrode and counter-electrode structures to which they are electrically connected.

Each electrode assembly 106 in the embodiment illustrated in FIG. 2 has an associated primary growth constraint system 151 to restrain growth in the longitudinal direction (i.e., stacking direction D). Alternatively, in one embodiment, a plurality of electrode assemblies 106 may share at least a portion of the primary growth constraint system 151. In the embodiment as shown, each primary growth constraint system 151 includes first and second primary growth constraints 154, 156, respectively, that may overlie first and second longitudinal end surfaces 116, 118, respectively, as described above; and first and second opposing primary connecting members 162, 164, respectively, that may overlie lateral surfaces 142, as described above. First and second opposing primary connecting members 162, 164, respectively, may pull first and second primary growth constraints 154, 156, respectively, towards each other, or alternatively stated, assist in restraining growth of the electrode assembly 106 in the longitudinal direction, and primary growth constraints 154, 156 may apply a compressive or restraint force to the opposing first and second longitudinal end surfaces 116, 118, respectively. As a result, expansion of the electrode assembly 106 in the longitudinal direction is inhibited during formation and/or cycling of the battery 102 between charged and discharged states. Additionally, primary growth constraint system 151 exerts a pressure on the electrode assembly 106 in the longitudinal direction (i.e., stacking direction D) that exceeds the pressure maintained on the electrode assembly 106 in either of the two directions that are mutually perpendicular to each other and are perpendicular to the longitudinal direction (e.g., as illustrated, the longitudinal direction corresponds to the direction of the Y axis, and the two directions that are mutually perpendicular to each other and to the longitudinal direction correspond to the directions of the X axis and the Z axis, respectively, of the illustrated Cartesian coordinate system).

Further, each electrode assembly 106 in the embodiment illustrated in FIG. 2 has an associated secondary growth constraint system 152 to restrain growth in the vertical direction (i.e., expansion of the electrode assembly 106, electrodes 110, and/or counter-electrodes 112 in the vertical direction (i.e., along the Z axis of the Cartesian coordinate system)). Alternatively, in one embodiment, a plurality of electrode assemblies 106 share at least a portion of the secondary growth constraint system 152. Each secondary growth constraint system 152 includes first and second secondary growth constraints 158, 160, respectively, that may overlie corresponding lateral surfaces 142, respectively, and at least one secondary connecting member 166, each as described in more detail above. Secondary connecting members 166 may pull first and second secondary growth constraints 158, 160, respectively, towards each other, or alternatively stated, assist in restraining growth of the electrode assembly 106 in the vertical direction, and first and second secondary growth constraints 158, 160, respectively, may apply a compressive or restraint force to the lateral surfaces 142), each as described above in more detail. As a result, expansion of the electrode assembly 106 in the vertical direction is inhibited during formation and/or cycling of the battery 102 between charged and discharged states. Additionally, secondary growth constraint system 152 exerts a pressure on the electrode assembly 106 in the vertical direction (i.e., parallel to the Z axis of the Cartesian coordinate system) that exceeds the pressure maintained on the electrode assembly 106 in either of the two directions that are mutually perpendicular to each other and are perpendicular to the vertical direction (e.g., as illustrated, the vertical direction corresponds to the direction of the Z axis, and the two directions that are mutually perpendicular to each other and to the vertical direction correspond to the directions of the X ads and the Y axis, respectively, of the illustrated Cartesian coordinate system).

According to certain embodiments, to complete the assembly of the secondary battery 102, the battery enclosure 104 can be filled with a non-aqueous electrolyte (not shown)

and lid 104a is folded over (along fold line, FL) and sealed to upper surface 104b. When fully assembled, the sealed secondary battery 102 occupies a volume bounded by its exterior surfaces (i.e., the displacement volume), the secondary battery enclosure 104 occupies a volume corresponding to the displacement volume of the battery (including lid 104a) less its interior volume (i.e., the prismatic volume bounded by interior surfaces 104c, 104d, 104e, 104f, 104g and lid 104a) and each of the primary and secondary growth constraint systems 151, 152 occupies a volume corresponding to its respective displacement volume. In combination, therefore, the battery enclosure 104 and the primary and secondary growth constraint systems 151, 152 occupy no more than 75% of the volume bounded by the outer surface of the battery enclosure 104 (i.e., the displacement volume of the battery). For example, in one such embodiment, the primary and secondary growth constraint systems 151, 152 and battery enclosure 104, in combination, occupy no more than 60% of the volume bounded by the outer surface of the battery enclosure 104. By way of further example, in one such embodiment, the primary and secondary growth constraint systems 151, 152 and battery enclosure 104, in combination, occupy no more than 45% of the volume bounded by the outer surface of the battery enclosure 104. By way of further example, in one such embodiment, the primary and second growth constraint systems 151, 152 and battery enclosure 104, in combination, occupy no more than 30% of the volume bounded by the outer surface of the battery enclosure 104. By way of further example, in one such embodiment, the primary and secondary growth constraint systems 151, 152 and battery enclosure 104, in combination, occupy no more than 20% of the volume bounded by the outer surface of the battery enclosure.

In general, the primary growth constraint system 151 and/or secondary growth constraint system 152 will typically comprise a material that has an ultimate tensile strength of at least 10,000 psi (>70 MPa), that is compatible with the battery electrolyte, does not significantly corrode at the floating or anode potential for the battery 102, and does not significantly react or lose mechanical strength at 45° C., and even up to 70° C. For example, the primary growth constraint system 151 and/or secondary growth constraint system 152 may comprise any of a wide range of metals, alloys, ceramics, glass, plastics, or a combination thereof (i.e., a composite). In one exemplary embodiment, the primary growth constraint system 151 and/or secondary growth constraint system 152 comprises a metal such as stainless steel (e.g., SS 316, 440C or 440C hard), aluminum (e.g., aluminum 7075-T6, hard H18), titanium (e.g., 6AI-4V), beryllium, beryllium copper (hard), copper ($O_2$ free, hard), nickel; in general, however, when the primary growth constraint system 151 and/or secondary growth constraint system 152 comprises metal it is generally preferred that it be incorporated in a manner that limits corrosion and limits creating an electrical short between the electrode structures 110 and counter-electrode structures 112. In another exemplary embodiment, the primary growth constraint system 151 and/or secondary growth constraint system 152 comprises a ceramic such as alumina (e.g., sintered or Coorstek AD96), zirconia (e.g., Coorstek YZTP), yttria-stabilized zirconia (e.g., ENrG E-Strate®). In another exemplary embodiment, the primary growth constraint system 151 comprises a glass such as Schott D263 tempered glass. In another exemplary embodiment, the primary growth constraint system 151 and/or secondary growth constraint system 152 comprises a plastic such as polyetheretherketone (PEEK) (e.g., Aptiv 1102), PEEK with carbon (e.g., Victrex 90HMF40 or Xycomp 1000-04), polyphenylene sulfide (PPS) with carbon (e.g., Tepex Dynalite 207), polyetheretherketone (PEEK) with 30% glass, (e.g., Victrex 90HMF40 or Xycomp 1000-04), polyimide (e.g., Kapton®). In another exemplary embodiment, the primary growth constraint system 151 and/or secondary growth constraint system comprises a composite such as E Glass Std Fabric/Epoxy, 0 deg, E Glass UD/Epoxy, 0 deg, Kevlar Std Fabric/Epoxy, 0 deg, Kevlar UD/Epoxy, 0 deg, Carbon Std Fabric/Epoxy, 0 deg, Carbon UD/Epoxy, 0 deg, Toyobo Zylon® HM Fiber/Epoxy. In another exemplary embodiment, the primary growth constraint system 151 and/or secondary growth constraint system 152 comprises fibers such as Kevlar 49 Aramid Fiber, S Glass Fibers, Carbon Fibers, Vectran UM LCP Fibers, Dyneema, Zylon. In yet another embodiment, the primary growth constraint system 151 and/or secondary growth constraint system 152 comprise a coating of insulating material such as insulating polymeric material on inner and/or outer surfaces thereof, such as for example on the inner and outer surfaces 400a, 400b, 401a, 401b of the first and second primary connecting members 162, 164.

Members of the electrode structure 110 and counter-electrode structure 112 populations include an electroactive material capable of absorbing and releasing a carrier ion such as lithium, sodium, potassium, calcium, magnesium or aluminum ions. In some embodiments, members of the electrode structure 110 population include an anodically active electroactive material (sometimes referred to as a negative electrode) and members of the counter-electrode structure 112 population include a cathodically active electroactive material (sometimes referred to as a positive electrode). In other embodiments, members of the electrode structure 110 population include a cathodically active electroactive material and members of the counter-electrode structure 112 population comprise an anodically active electroactive material. In each of the embodiments and examples recited in this paragraph, negative electrode active material may be, for example, a particulate agglomerate electrode, an electrode active material formed from a particulate material, such as by forming a slurry of the particulate material and casting into a layer shape, or a monolithic electrode.

According to one embodiment, an electrode active material used in an electrode structure 110 corresponding to an anode of the electrode assembly 106 comprises a material that expands upon insertion of carrier ions into the electrode active material during charge of the secondary battery 102 and/or electrode assembly 106. For example, the electrode active materials may comprise anodically active materials that accept carrier ions during charging of the secondary battery, such as by intercalating with or alloying with the carrier ions, in an amount that is sufficient to generate an increase in the volume of the electrode active material. For example, in one embodiment the electrode active material may comprise a material that has the capacity to accept more than one mole of carrier ion per mole of electrode active material, when the secondary battery 102 is charged from a discharged to a charged state. By way of further example, the electrode active material may comprise a material that has the capacity to accept 1.5 or more moles of carrier ion per mole of electrode active material, such as 2.0 or more moles of carrier ion per mole of electrode active material, and even 2.5 or more moles of carrier ion per mole of electrode active material, such as 3.5 moles or more of carrier ion per mole of electrode active material. The carrier ion accepted by the electrode active material may be at least one of lithium, potassium, sodium, calcium, and magnesium. Examples of electrode active materials that expand to provide such a volume change include one or more of silicon (e.g., SiO), aluminum, tin, zinc, silver, antimony, bismuth, gold, platinum, germanium, palladium, and alloys and compounds thereof. For example, in one embodiment, the electrode active material can comprise a silicon-containing material in particulate form, such as one or more of particulate silicon, particulate silicon oxide, and mixtures thereof. In yet another embodiment, the electrode active material can comprise a material that exhibits a smaller or even negligible volume change. For example, in one embodiment the electrode active material can comprise a carbon-containing material, such as graphite. In yet another embodiment, the electrode structure comprises a layer of lithium metal, which can serve as an electrode current collector, and on which electrode active material deposits via transfer of carrier ions to the lithium metal layer during a charging process.

Exemplary anodically active electroactive materials include carbon materials such as graphite and soft or hard carbons, or any of a range of metals, semi-metals, alloys, oxides and compounds capable of forming an alloy with lithium. Specific examples of the metals or semi-metals capable of constituting the anode material include graphite, tin, lead, magnesium, aluminum, boron, gallium, silicon, Si/C composites, Si/graphite blends, SiOx, porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof. In one exemplary embodiment, the anodically active material comprises aluminum, tin, or silicon, or an oxide thereof, a nitride thereof, a fluoride thereof, or other alloy thereof. In another exemplary embodiment, the anodically active material comprises silicon, silicon oxide, or an alloy thereof.

In yet further embodiment, the anodically active material can comprise lithium metals, lithium alloys, carbon, petroleum cokes, activated carbon, graphite, silicon compounds, tin compounds, and alloys thereof. In one embodiment, the anodically active material comprises carbon such as non-graphitizable carbon, graphite-based carbon, etc.; a metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge'; Me': Al, B, P, Si, elements found in Group 1, Group 2 and Group 3 in a periodic table, halogen; $0 < x \leq 1$; $1 \leq y \leq 3$; $1 \leq z \leq 8$), etc.; a lithium metal; a lithium alloy; a silicon-based alloy; a tin-based alloy; a metal oxide such as SnO, $SnO_2$, PbO, $FbO_2$, $Pb_2O_3$, $Pb_3O_4$, $Sb_2O_3$, $Sb_2O_4$, $Sb_2O_6$, GeO, $GeO_2$, $Bi_2O_3$, $Bi_2O_4$, $Bi_2O_5$, etc.; a conductive polymer such as polyacetylene, etc.; Li—Co—Ni-based material, etc. In one embodiment, the anodically active material can comprise carbon-based active material include crystalline graphite such as natural graphite, synthetic graphite and the like, and amorphous carbon such as soft carbon, hard carbon and the like. Other examples of carbon material suitable for anodically active material can comprise graphite, Kish graphite, pyrolytic carbon, mesophase pitch-based carbon fibers, meso-carbon microbeads, mesophase pitches, graphitized carbon fiber, and high-temperature sintered carbon such as petroleum or coal tar pitch derived cokes. In one embodiment, the negative electrode active material may comprise tin oxide, titanium nitrate and silicon. In another embodiment, the negative electrode can comprise lithium metal, such as a lithium metal film, or lithium ahoy, such as an ahoy of lithium and one or more types of metals selected from the group consisting of Na, K, Rb, Cs, Fr, Be, Mg, Ca, Sr, Ba, Ra, Al and Sn. In yet another embodiment, the anodically active material can comprise a metal compound capable of alloying and/or intercalating with lithium, such as Si, Al, C, Pt, Sn, Pb, Ir, Ni, Cu, Ti, Na, K, Rb, Cs, Fr, Be, Ca, Sr, Sb, Ba, Ra, Ge, Zn, Bi, In, Mg, Ga, Cd, a Si alloy, a Sn alloy, an Al ahoy or the like; a metal oxide capable of doping and dedoping lithium ions such as $SiO_v$ ($0 < v < 2$), $SnO_2$, vanadium oxide or lithium vanadium oxide; and a composite including the metal compound and the carbon material such as a Si—C composite or a Sn—C composite. For example, in one embodiment, the material capable of alloying/intercalating with lithium may be a metal, such as lithium, indium, tin, aluminum, or silicon, or an alloy thereof; a transition metal oxide, such as $Li_4/3Ti_5/3O_4$ or SnO; and a carbonaceous material, such as artificial graphite, graphite carbon fiber, resin calcination carbon, thermal decomposition vapor growth carbon, corks, mesocarbon microbeads ("MCMB"), furfuryl alcohol resin calcination carbon, polyacene, pitch-based carbon fiber, vapor growth carbon fiber, or natural graphite. In yet another embodiment, the negative electrode active material can comprise a composition suitable for a carrier ion such as sodium or magnesium. For example, in one embodiment, the negative electrode active material can comprise a layered carbonaceous material; and a composition of the formula $Na_xSn_{y-z}M_z$ disposed between layers of the layered carbonaceous material, wherein M is Ti, K, Ge, F, or a combination thereof, and $0 < x \leq 15$, $1 \leq y \leq 5$, and $0 \leq z \leq 1$.

In one embodiment, the negative electrode active material may further comprise a conductive material and/or conductive aid, such as carbon-based materials, carbon black, graphite, graphene, active carbon, carbon fiber, carbon black such as acetylene black, Ketjen black, channel black, furnace black, lamp black, thermal black or the Ike; a conductive fiber such as carbon fiber, metallic fiber or the like; a conductive tube such as carbon nanotubes or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like. In addition, metallic fibers such as metal mesh; metallic powders such as copper, silver, nickel and aluminum; or organic conductive materials such as polyphenylene derivatives may also be used. In yet another embodiment, a binder may be provided, such as for example one or more of polyethylene, polyethylene oxide, polypropylene, polytetrafluoroethylene (PTFE), polyvinylidene fluoride (PVDF), styrene-butadiene rubber, a tetrafluoroethylerie-perfluoro alkylvinyl ether copolymer, a vinylidene fluoride-hexafluoropropylene copolymer, a vinylidene fluoride-chlorotrifluoroethyiene copolymer, an ethylene-tetrafluoroethylene copolymer, a polychlorotrifiuoroethylene, vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoro ethylene copolymer, an ethylene-acrylic acid copolymer and the like may be used either alone or as a mixture.

Exemplary cathodically active materials include any of a wide range of cathode active materials. For example, for a lithium-ion battery, the cathodically active material may comprise a cathode material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum on/sulfides, phosphates, silicates, vanadates, sulfur, sulfur compounds, oxygen (air), $Li(Ni_xMn_yCo_z)O_2$, and combinations thereof. Furthermore, compounds for the cathodically active material layers can comprise lithium-containing compounds further comprising metal oxides or metal phosphates such as compounds comprising lithium, cobalt and oxygen (e.g., $LiCoO_2$), compounds comprising lithium, manganese and oxygen (e.g., $LiMn_2O_4$) and compound comprising lithium iron and phosphate (e.g., LiFePO). In one embodiment, the cathodically active material comprises at least one of lithium manganese oxide, lithium cobalt oxide, lithium nickel oxide, lithium iron phosphate, or a complex oxide formed from a combination of aforesaid oxides. In another embodiment, the cathodically active material can comprise one or more of lithium cobalt oxide ($LiCoO_2$), lithium nickel oxide ($LiNiO_2$), etc. or a substituted compound with one or more transition metals; lithium manganese oxide such as $Li_{1+x}Mn_{2-x}O_4$ (where, x is 0 to 0.33), $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$ etc.; Ni site-type lithium nickel oxide represented by the chemical formula of $LiNi_{1-x}M_xO_2$ (where, M=Co, Mn, Al, Cu, Fe, Mg, B or Ga, and x=0.01 to 0.3); lithium manganese complex oxide represented by the chemical formula of $LiMn_{2-x}M_xO_2$ (where, M=Co, Ni, Fe, Cr, Zn or Ta, and x=0.01 to 0.1) or $Li_2Mn_3Mo_8$ (where, M=Fe, Co, Ni, Cu or Zn); $LiMnO_4$ in which a portion of Li is substituted with alkaline earth metal ions; a disulfide compound; $Fe_2(MoO_4)_3$, and the like. In one embodiment, the cathodically active material can comprise a lithium metal phosphate having an olivine crystal structure of Formula $Li_{1-a}Fe_{1-x}M'_x(PO_{4-b})X_b$ wherein M' is at least one selected from Al, Mg, Ni, Co, Mn, Ti, Ga, Cu, V, Nb, Zr, Ce, In, Zn, and Y, X is at least one selected from F, S, and N, $-0.5 \le a \le +0.5$, $0 \le x \le 0.5$, and $0 \le b \le 0.1$, such at least one of $LiFePO_4$, $Li(Fe, Mn)PO_4$, $Li(Fe, Co)PO_4$, $Li(Fe, Ni)PO_4$, or the like. In one embodiment, the cathodically active material comprises at least one of $LiCoO_2$, $LiNiO_2$, $LiMnO_2$, $LiMn_2O_4$, $LiNi_{1-y}Co_yO_2$, $LiCo_{1-y}Mn_yO_2$, $LiNi_{1-y}Mn_yO_2$($0 \le y \le 1$), $Li(Ni_aCo_bMn_c)O_4$ ($0 < a < 2$, $0 < b < 2$, $0 < c < 2$, and $a+b+c=2$), $LiMn_{2-z}Ni_zO_4$, $LiMn_{2-z}Co_zO_4$ ($0 < z < 2$), $LiCoPO_4$ and $LiFePO_4$, or a mixture of two or more thereof.

In yet another embodiment, a cathodically active material can comprise elemental sulfur (S8), sulfur series compounds or mixtures thereof. The sulfur series compound may specifically be $Li_2S_n$ ($n \ge 1$), an organosulfur compound, a carbon-sulfur polymer (($C_2S_x)_n$; x=2.5 to 50, $n \ge 2$) or the Ike. In yet another embodiment, the cathodically active material can comprise an oxide of lithium and zirconium.

In yet another embodiment, the cathodicaily active material can comprise at least one composite oxide of lithium and metal, such as cobalt, manganese, nickel, or a combination thereof, may be used, and examples thereof are $Li_aA_{1-b}M_bD_2$ (wherein, and $0.90 \le a \le 1$, and $0 \le b \le 0.5$); $Li_aE_{1-b}M_bO_{2-c}D_c$ (wherein, $0.90 \le a \le 1$, $0 \le b \le 0.5$, and $0 \le c \le 0.05$); $LiE_{2-b}MbO_{4-c}D_c$ (wherein, $0 \le b \le 0.5$, and $0 \le c \le 0.05$); $Li_aNi_{1-b-c}Co_bM_cD_a$ (wherein, $0.90 \le a \le 1$, $0 \le b \le 0.5$, $0 \le c \le 0.05$, and $0 < a < 2$); $Li_aNi_{1-b-c}Co_bM_cO_{2-a}X_a$ (wherein, $0.90 \le a \le 1$, $0 \le b \le 0.5$, $0 \le c \le 0.05$, and $0 < a < 2$); $Li_aNi_{1-b-c}Co_bM_cO_{2-a}X_2$ (wherein, $0.90 \le a \le 1$, $0 \le b \le 0.5$, $0 \le c \le 0.05$, and $0 < a < 2$); $Li_aNi_{1-b-c}Mn_bM_cD_a$ (wherein, $0.90 \le a \le 1$, $0 \le b \le 0.5$, $0 \le c \le 0.05$, and $0 < a < 2$); $Li_aNi_{1-b-c}Mn_bM_cO_{2-a}X_a$ (wherein, $0.90 \le a \le 1$, $0 \le b \le 0.5$, $0 \le c \le 0.05$, and $0 < a < 2$); $Li_aNi_{1-b-c}Mn_bM_cO_{2-a}X_2$ (wherein, $0.90 \le a \le 1$, $0 \le b \le 0.5$, $0 \le c \le 0.05$, and $0 < a < 2$); $Li_aNi_bE_cG_dO_2$ (wherein, $0.90 \le a \le 1$, $0 \le b \le 0.9$, $0 \le c \le 0.5$, and $0.001 \le d \le 0.1$); $Li_aNi_bCo_cM_dGeO_2$ (wherein, $0.90 \le a \le 1$, $0 \le b \le 0.9$, $0 \le c \le 0.5$, $0 \le d \le 0.5$, and $0.001 \le e \le 0.1$); $Li_aNiG_bO_2$ (wherein, $0.90 \le a \le 1$ and $0.001 \le b \le 0.1$); $Li_aCoG_bO_2$ (wherein, $0.90 \le a \le 1$ and $0.001 \le b \le 0.1$); $Li_aMnG_bO_2$ (wherein, $0.90 \le a \le 1$ and $0.001 \le b \le 0.1$); $Li_aMn_2G_bO_4$ (wherein, $0.90 \le a \le 1$ and $0.001 \le b \le 0.1$); $QO_2$; $Qs_2$; $LiQS_2$; $V_2O_5$; $LiX'O_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$. In the formulas above, A is NE, Co, Mn, or a combination thereof; M is Al, Ni, Co, Mn, Cr, Fe, Mg, Sr, V, a rare-earth element, or a combination thereof; D is O, F, S, P, or a combination thereof; E is Co, Mn, or a combination thereof; X is F, S, P, or a combination thereof; G is Al, Cr, Mn, Fe, Mg, La, Ce, Sr, V, or a combination thereof; Q is Ti, Mo, Mn, or a combination thereof; X' is Cr, V, Fe, Sc, Y, or a combination thereof; and J is V, Cr, Mn, Co, Ni, Cu, or a combination thereof. For example, $LiCoO_2$, $LiMn_xO_{2x}$ (x=1 or 2), $LiNi_{1-x}Mn_xO_{2x}$ ($0 < x < 1$), $LiNi_{1-x-y}Co_xMn_yO_2$ ($0 \le x \le 0.5$, $0 \le y \le 0.5$), or $FePO_4$ may be used. In one embodiment, the cathodically active material comprises at least one of a lithium compound such as lithium cobalt oxide, lithium nickel oxide, lithium nickel cobalt oxide, lithium nickel cobalt aluminum oxide, lithium nickel cobalt manganese oxide, lithium manganese oxide, or lithium iron phosphate; nickel sulfide; copper sulfide; sulfur; iron oxide; or vanadium oxide.

In one embodiment, the cathodically active material can comprise a sodium containing material, such as at least one of an oxide of the formula $NaM^1_aO_2$ such as $NaFeO_2$, $NaMnO_2$, $NaNiO_2$, or $NaCoO_2$; or an oxide represented by the formula $NaMn_{1-a}M^1_aO_2$, wherein $M^1$ is at least one transition metal element, and $0 \le a \le 1$. Representative positive active materials include $Na[Ni_{1/2}Mn_{1/2}]O_2$, $Na_{2/3}[Fe_{1/2}Mn_{1/2}]O_2$, and the like; an oxide represented by $Na_{0.44}Mn_{1-a}M^1_aO_2$, an oxide represented by $Na_{0.7}Mn_{1-a}M^1_aO_{2.05}$ an (wherein $M^1$ is at least one transition metal element, and $0 \le a \le 1$); an oxide represented by $Na_bM^2_cSi_{12}O_{30}$ as $Na_6Fe_2Si_{12}O_{30}$ or $Na_2Fe_6Si_{12}O$ (wherein $M^2$ is at least one transition metal element, and $2 \le b \le 6$, and $2 \le c \le 5$); an oxide represented by $Na_dM^3_eSi_6O_{18}$ such as $Na_2Fe_2Si_6O_{18}$ or (wherein $M^3$ is at least one transition metal element, $3 \le d \le 6$ and $1 \le e \le 2$); an oxide represented by $Na_1M^4_gSi_2O_6$ such as $Na_2FeSiO$ (wherein $M^4$ is at least one element selected from transition metal elements, magnesium (Mg) and aluminum (Al), and $1 \le f \le 2$ and $1 \le g \le 2$); a phosphate such as $NaFePO_4$, $Na_3Fe_2(PO_4)_3$, $Na_3V_2(PO_4)_2P_2O_7$ and the like; a borate such as $NaFeBO_4$ or $Na_3Fe_2(BO_4)_3$, a fluoride represented by $Na_hM^5F_6$ such as $Na_3FeF_6$ or $Na_2MnF_6$ (wherein $M^5$ is at least one transition metal element, and $2 \le h \le 2$), a fluorophosphate such as $Na_3V_2(PO_4)_2F_3$, $Na_3V_2(PO_4)_2FO_2$ and the like. The positive active material is not limited to the foregoing and any suitable positive active material that is used in the art can be used. In an embodiment, the positive active material preferably comprises a layered-type oxide cathode material such as $NaMnO_2$, $Na[Ni_{1/2}Mn_{1/2}]O_2$ and $Na_{2/3}[Fe_{1/2}Mns_{1/2}]O_2$, a phosphate cathode such as $Na_3V_2(PO_4)_3$ and $Na_4Co_3(PO_4)_2P_2O_7$, or a fluorophosphate cathode such as $Na_3V_2(PO_4)_2F_3$ and $Na_3V_2(PO_4)_2FO_2$.

In one embodiment, the electrode current collector can comprise a negative electrode current collector, and can comprise a suitable conductive material, such as a metal material. For example, in one embodiment, the negative electrode current collector can comprise at least one of copper, nickel, aluminum, stainless steel, titanium, palladium, baked carbon, calcined carbon, indium, iron, magnesium, cobalt, germanium, lithium a surface treated material of copper or stainless steel with carbon, nickel, titanium, silver, an aluminum-cadmium alloy, and/or other alloys thereof. As another example, in one embodiment, the negative electrode current collector comprises at least one of copper, stainless steel, aluminum, nickel, titanium, baked carbon, a surface treated material of copper or stainless steel with carbon, nickel, titanium, silver, an aluminum-cadmium alloy, and/or other alloys thereof. In one embodiment, the negative electrode current collector comprises at least one of copper and stainless steel.

In one embodiment, the counter-electrode current collector can comprise a positive electrode current collector, and can comprise a suitable conductive material, such as a metal material. In one embodiment, the positive electrode current collector comprises at least one of stainless steel, aluminum, nickel, titanium, baked carbon, sintered carbon, a surface treated material of aluminum or stainless steel with carbon, nickel, titanium, silver, and/or an alloy thereof. In one embodiment, the positive electrode current collector comprises aluminum.

In yet another embodiment, the cathodically active material can further comprise one or more of a conductive aid and/or binder, which for example may be any of the conductive aids and/or binders described for the anodically active material herein.

According to certain embodiments, electrically insulating separator layers 130 may electrically isolate each member of the electrode structure 110 population from each member of the counter-electrode structure 112 population. The electrically insulating separator layers are designed to prevent electrical short circuits while also allowing the transport of ionic charge carriers that are needed to close the circuit during the passage of current in an electrochemical cell. In one embodiment, the electrically insulating separator layers are microporous and permeated with an electrolyte, e.g., a non-aqueous liquid or gel electrolyte. Alternatively, the electrically insulating separator layer may comprise a solid electrolyte, i.e., a solid ion conductor, which can serve as both a separator and the electrolyte in a battery.

In certain embodiments, electrically insulating separator layers 130 will typically include a microporous separator material that can be permeated with a non-aqueous electrolyte; for example, in one embodiment, the microporous separator material includes pores having a diameter of at least 50 Å, more typically in the range of about 2,500 Å, and a porosity in the range of about 25% to about 75%, more typically in the range of about 35-55%. Additionally, the microporous separator material may be permeated with a non-aqueous electrolyte to permit conduction of carrier ions between adjacent members of the electrode and counter-electrode populations. In certain embodiments, for example, and ignoring the porosity of the microporous separator material, at least 70 vol % of electrically insulating separator material between a member of the electrode structure 110 population and the nearest member(s) of the counter-electrode structure 112 population (i.e., an "adjacent pair") for ion exchange during a charging or discharging cycle is a microporous separator material; stated differently, microporous separator material constitutes at least 70 vol % of the electrically insulating material between a member of the electrode structure 110 population and the nearest member of the counter-electrode structure 112 population.

In one embodiment, the microporous separator material comprises a particulate material and a binder, and has a porosity (void fraction) of at least about 20 vol. % The pores of the microporous separator material will have a diameter of at least 50 Å and will typically fall within the range of about 250 to 2,500 Å. The microporous separator material will typically have a porosity of less than about 75%. In one embodiment, the microporous separator material has a porosity (void fraction) of at least about 25 vol %. In one embodiment, the microporous separator material will have a porosity of about 35-55%.

The binder for the microporous separator material may be selected from a wide range of inorganic or polymeric materials. For example, in one embodiment, the binder can be an organic polymeric material such as a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carbon/methyl cellulose, styrene rubber, butadiene rubber, styrene-butadiene rubber, isoprene rubber, polyacrylamide, polyvinyl ether, polyacrylic acid, polymethacrylic acid, polyacrylonitrile, polyvinylidene fluoride polyacrylonitrile and polyethylene oxide. In another embodiment, the binder is selected from the group consisting of acrylates, styrenes, epoxies, and silicones. Other suitable binders may be selected from polyvinylidene fluoride-co-hexafluoropropylene, polyvinylidene fluoride-co-trichloroethylene, polymethylmethacrylate, polyacrylonitrile, polyvinylpyrrolid one, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymethyl cellulose, acrylonitrile-styrene-butadiene copolymer, polyimide or mixtures thereof. In yet another embodiment, the binder may be selected from any of polyvinylidene fluoride-hexafluoro propylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, polyimide, polyethylene terephthalate, polybutylene terephthalate, polyester, polyacetal, polyamide, polyetheretherketone, polyether sulfone, polyphenylene oxide, polyphenylene sulfide, polyethylene naphthalene, and/or combinations thereof. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1 \times 10^{-4}$ S/cm. By way of further example, in one embodiment, the particulate material has a conductivity for carrier ions of less than $1 \times 10^{-5}$ S/cm. By way of further example, in one embodiment, the particulate material has a conductivity for carrier ions of less than $1 \times 10^{-6}$ S/cm. For example, in one embodiment, the particulate material is an inorganic material selected from the group consisting of silicates, phosphates, aluminates, aluminosilicates, and hydroxides such as magnesium hydroxide, calcium hydroxide, etc. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, BaO, ZnO, $ZrO_2$, BN, $Si_3N_4$, $Ge_3N_4$. See, for example, P. Arora and J. Zhang, "Battery Separators" Chemical Reviews 2004, 104, 4419-4462). Other suitable particles can comprise $BaTiO_3$, $Pb(Zr,Ti)O_3$ (PZT), $Pb_{1-x}La_xZr_{1-y}Ti_yO_2$ (PLZT), $PB(Mg_3Nb_{2/3})O_3$—$PbTiO_3$ (PMN—PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC or mixtures thereof. In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

In yet another embodiment, the electrically insulating separator 130 comprises a solid electrolyte, for example as in a solid state battery. Generally speaking, the solid electrolyte can facilitate transport of carrier ions, without requiring addition of a liquid or gel electrolyte. According to certain embodiments, in a case where a solid electrolyte is provided, the solid electrolyte may itself be capable of providing insulation between the electrodes and allowing for passage of carrier ions therethrough, and may not require addition of a liquid electrolyte permeating the structure.

In one embodiment, the secondary battery 102 can comprise electrolyte that may be any of an organic liquid electrolyte, an inorganic liquid electrolyte, an aqueous electrolyte, a non-aqueous electrolyte, a solid polymer electrolyte, a solid ceramic electrolyte, a solid glass electrolyte, a garnet electrolyte, a gel polymer electrolyte, an inorganic solid electrolyte, a molten-type inorganic electrolyte or the like. Other arrangements and/or configurations of electrically insulating separator 130, with or without liquid electrolyte, may also be provided. In one embodiment, the solid electrolyte can comprise a ceramic; or glass material that is capable of providing electrical insulation while also conducting carrier ions therethrough. Examples of ion conducting material can include garnet materials, a sulfide glass, a lithium ion conducting glass ceramic, or a phosphate ceramic material. In one embodiment, a solid polymer electrolyte can comprise any of a polymer formed of polyethylene oxide (PEO)-based, polyvinyl acetate (PVA)-based, polyethyleneimine (PEI)-based, polyvinylidene fluoride (PVDF)-based, polyacrylonitrile (PAN)-based, LiPON (lithium phosphorus oxynitricle), and polymethyl methacrylate (PMMA)-based polymers or copolymers thereof. In another embodiment, a sulfide-based solid electrolyte may be provided, such as a sulfide-based solid electrolyte comprising at least one of lithium and/or phosphorous, such as at least one of $Li_2S$ and $P_2S_5$, and/or other sulfides such as $SiS_2$, $GeS_2$, $Li_3PS_4$, $Li_4P_2S_7$, $Li_4SiS_4$, $Li_2S$—$P_2S_5$, and $50Li_4SiO_4 \cdot 50Li_3BO_3$, and/or $B_2S_3$. Yet other embodiments of solid electrolyte can include nitrides, halides and sulfates of lithium (Li) such as $Li_3N$, LiI, $Li_5NI_2$, $Li_3N$—LiI—LiOH $LiSiO_4$, $LiSiO_4$—LiI—LiOH, $Li_2SiS_3$, $Li_4SiO_4$—LiI— LiOH, and $Li_3PO_4$—$Li_2S$—$SiS_2$, $Li_2S$—$P_2S_5$, $Li_2S$—$P_2S_5$-$L_4SiO_4$, $Li_2S$—$Ga_2S_3$—$GeS_2$, $Li_2S$—$Sb_2S_3$—$GeS_2$, $Li_{3.25}$—$Ge_{0.25}$—$P_{0.75}S_4$, (La,Li)$TiO_3$ (LLTO), $Li_6La_2CaTa_2O_{12}$, $Li_6La_2ANb_2O_{12}$(A=Ca, Sr), $Li_2Nd_3TeSbO_{12}$, $Li_3BO_{2.5}N_{0.5}$, $Li_9SiAlO_8$, $Li_{1+x}Al_xGe_{2-x}(PO_4)_3$ (LAGP), $Li_{1-x}Al_xTi_{2-x}(PO_4)_3$ (LATP), $Li_{1-x}Ti_{2-x}Al_xSi_y(PO_4)_{3-y}$, $LiAl_xZr_{2-x}(PO_4)_3$, $LiTi_xZr_{2-x}(PO_4)_3$. Yet other embodiments of solid electrolyte can include garnet materials, such as for example described in U.S. Pat. No. 10,361,455, which is hereby incorporated herein in its entirety. In one embodiment, the garnet solid electrolyte is a nesosilicate having the general formula $X_3Y_2(SiO_4)_3$, where X may be a divalent cation such as Ca, Mg, Fe or Mn, or Y may be a trivalent cation such as Al, Fe, or Cr.

According to one embodiment of an assembled energy storage device, the electrically insulating separator comprises a microporous separator material that is permeated with a non-aqueous electrolyte suitable for use as a secondary battery electrolyte. Typically, the non-aqueous electrolyte comprises a lithium salt and/or mixture of salts dissolved in an organic solvent and/or solvent mixture. Exemplary lithium salts include inorganic lithium salts such as $LiClO_4$, $LiBF_4$, $LiPF_6$, $LiAsF_6$, LiCl, and LiBr; and organic lithium salts such as $LiB(C_6H_5)_4$, $LiN(SO_2CF_3)_2$, $LiN(SO_2CF_3)_2$, $LiN(SO_2CF_3)_3$, $LiNSO_2$, $CF_3$, $LiNSO_2CF_5$, $LiNSO_2$ $C_4F_9$, $LiNSO_2C_5F_{11}$, $LiNSO_2C_6F_{13}$, and $LiNSO_2C_7F_{15}$. As yet another example, the electrolyte can comprise sodium ions dissolved therein, such as for example any one or more of $NaClO_4$, $NaPF_6$, $NaBF_4$, $NaCF_3SO_3$, $NaN(CF_3SO_2)_2$, $NaN(C_2F_6SO_2)_2$, $NaC(CF_3SO_2)_3$ Salts of magnesium and/or potassium can similarly be provided. For example magnesium salts such as magnesium chloride ($MgCl_2$), magnesium bromide $MgBr_2$), or magnesium iodide ($MgI_2$) may be provided, and/or as well as a magnesium salt that may be at least one selected from the group consisting of magnesium perchlorate ($Mg(ClO_4)_2$), magnesium nitrate ($Mg(NO_3)_2$), magnesium sulfate ($MgSO_4$), magnesium tetrafluoroborate ($Mg(BF_4)_2$), magnesium tetraphenylborate ($Mg(B(C6H_6)_4)_2$, magnesium hexafluorophosphate ($Mg(PF_6)_2$), magnesium hexafluoroarsenate ($Mg(AsF_6)_2$), magnesium perfluoroalkylsulfonate (($Mg(R_{f1}2SO_3)_2$), in which $R_{f1}$ is a perfluoroalkyl group), magnesium perfluoroalkyisulfonylimide ($Mg((R_{f2}SO_2)_2N)_2$, in which $R_{f2}$ is a perfluoroalkyl group), and magnesium hexaalkyl disilazide (($Mg(HRDS)_2$), in which R is an alkyl group). Exemplary organic solvents to dissolve the lithium salt include cyclic esters, chain esters, cyclic ethers, and chain ethers. Specific examples of the cyclic esters include propylene carbonate, ethylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dial kyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

Referring to FIGS. 8A-10E, in one embodiment, a process of fabricating the secondary battery and/or electrode assembly disclosed herein is provided. In particular, the electrically-insulating, thermoplastic, hot-melt adhesive 511 is used to adhere the subset of the members of the electrode and/or counter-electrode population to the first and/or second connecting members 162, 164 of the constraint system 108. The hot-melt adhesive 511 can be applied to the inner surfaces of the first and second connecting members 400*a*, 400*b* by any suitable method, such as by providing a blown or cast film of the adhesive, by extruding the adhesive and/or by using a glue gun. In some embodiments, the hot-melt adhesive 511 is provided in the form of a film having predetermined thickness and pattern. According to embodiments herein, the predetermined pattern may conform to the shape of the inner surfaces of the first and second connecting members 510*a*, 510*b*. The predetermined pattern can be cut using a laser or a die. In some embodiments, the first and/or second connecting members 162, 164 (which may be the same as or different than the first and second secondary growth constraints 158, 160) comprise apertures 176 formed through a vertical thickness of the respective members, and the adhesive film cutouts 513 are placed along bonding regions 901*a*, 901*b* of the inner surfaces 400*a*, 400*b* of the first and/or second connecting members 162, 164 that are adjacent the apertures 176. In some embodiments, the hot-melt adhesive is melted and/or softened by heating at a temperature of at least 75° C., and no more than 130° C. In some embodiments, members of the population of electrode structures 110 comprise electrode current collectors 136 having opposing upper and lower end surfaces in the vertical direction 510*a*, 510*b*, and members of the population of counter-electrode structures 112 comprise counter-electrode current collectors 140 having opposing upper and lower end surfaces in the vertical direction 509*a*, 509*b*, and the adhesive film cutouts are placed in contact with vertical end surfaces of the electrode and/or counter-electrode current collectors of the subset of members of the electrode and/or counter-electrode population.

According one embodiment, the process of fabricating the secondary battery and/or electrode assembly of any preceding claim, comprises, providing the electrode assembly, providing the constraint system, and providing the electrically-insulating, thermoplastic, hot-melt adhesive film having (i) a melting temperature in the range of 75° C. to 130° C., and (ii) a melt index value as measured according to ASTM D1238 in a range of at least 20 to no more than 350. The process further comprises placing first side(s) 514*a* of the adhesive film in contact with upper or lower inner surfaces 400*a*, 400*b*, of the first and second connecting members 162, 164, and placing the upper or lower end surfaces of the subset of the members of the electrode and/or counter-electrode population in contact with the second side(s) 514*b* of the adhesive film 511. For example, the upper inner surface 400*a* of the first connecting member 162 can be placed in contact with a first side 514*a* of a first adhesive film 511*a*, and the lower inner surface 400*b* of the second connecting member 164 can be placed in contact with a first side of a second adhesive film 511*b*. The second sides 514*b* of the first and second adhesive films 511*a*, b can be placed in contact with the upper or lower end surfaces of the subset of the members of the electrode and/or counter-electrode population. The process can further comprise melting and/or softening the adhesive film by heating, to adhere the subset of the members of the electrode and/or counter-electrode population to the first and second connecting members. According to one embodiment, pressure is applied during, before and/or after the heating to facilitate adhesion of the film. For example, a pressure of at least 3 psi may be applied, and even at least 5 psi may be applied, such as a pressure in a range of from 3 psi to 10 psi.

EXAMPLES

Example 1

The present example demonstrates an exemplary process of fabricating the secondary battery 102 and/or electrode assembly 10, with emphasis on the application of a hot-melt adhesive. FIGS. 8A-8E are referred to herein as an embodiment of the process.

Figure 8A:
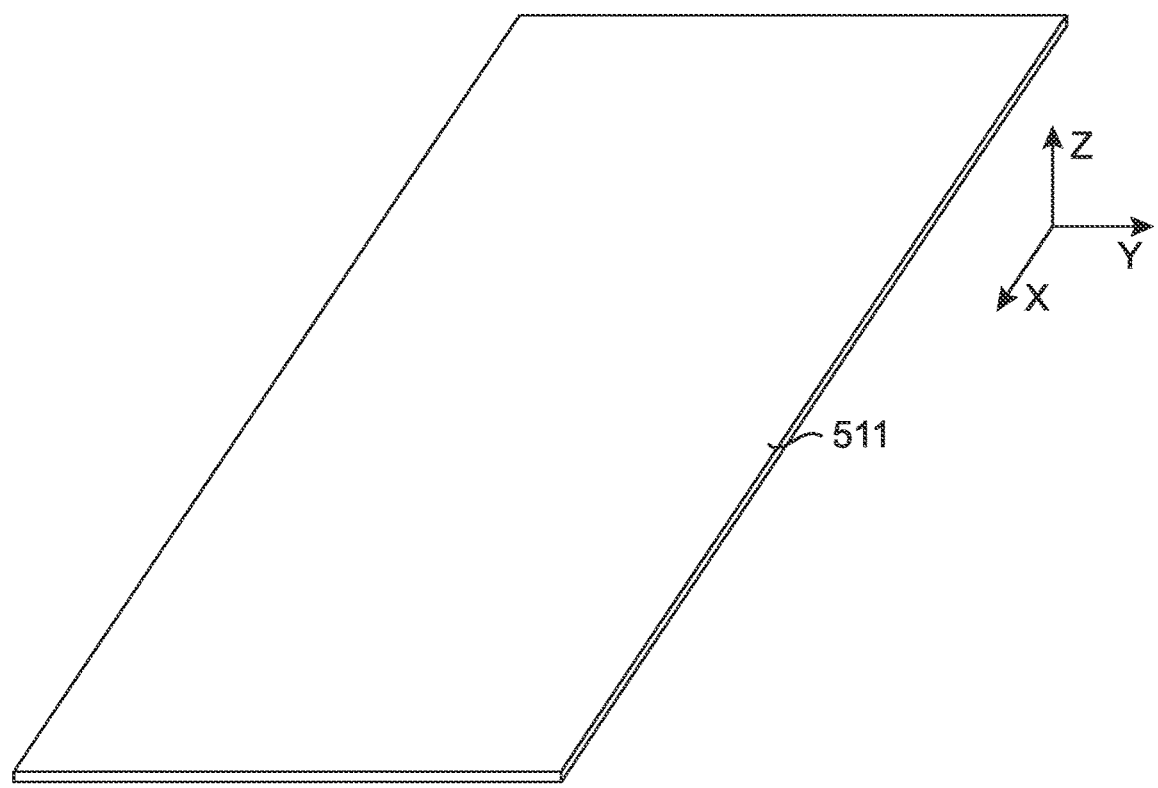
FIGS. 8A-8E show a process of fabricating the secondary battery and/or electrode assembly by using an electrically-insulating, thermoplastic, hot-melt adhesive.
Figure 8B:
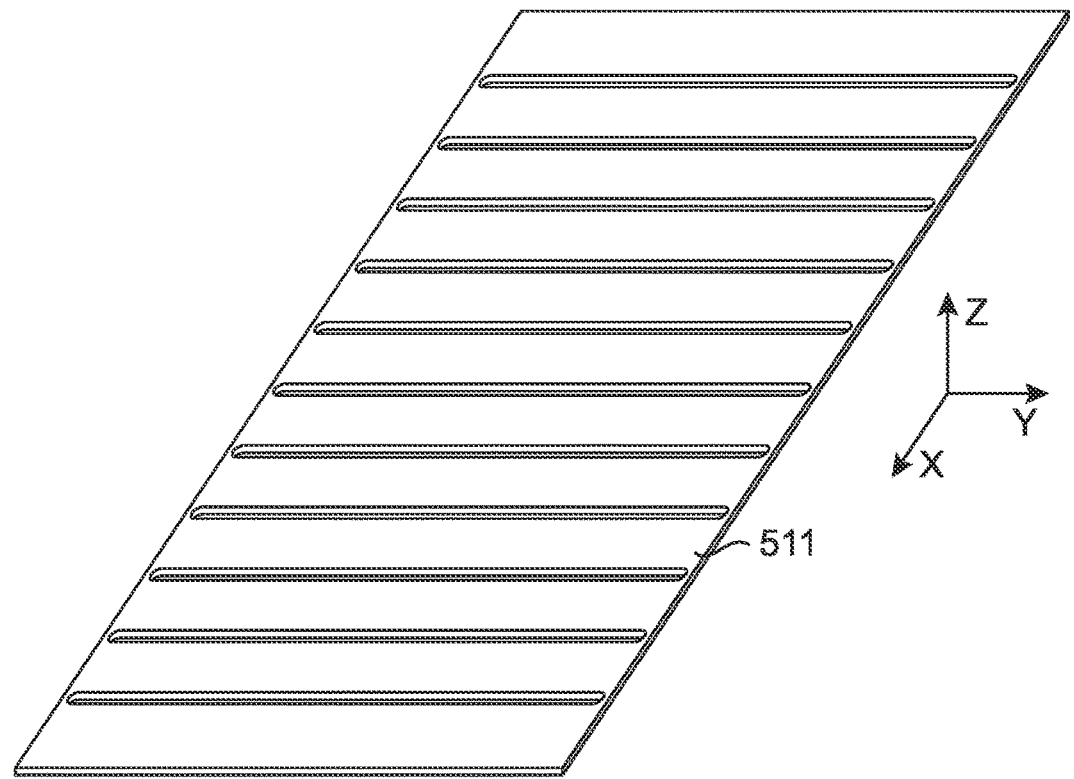
Figure 8C:
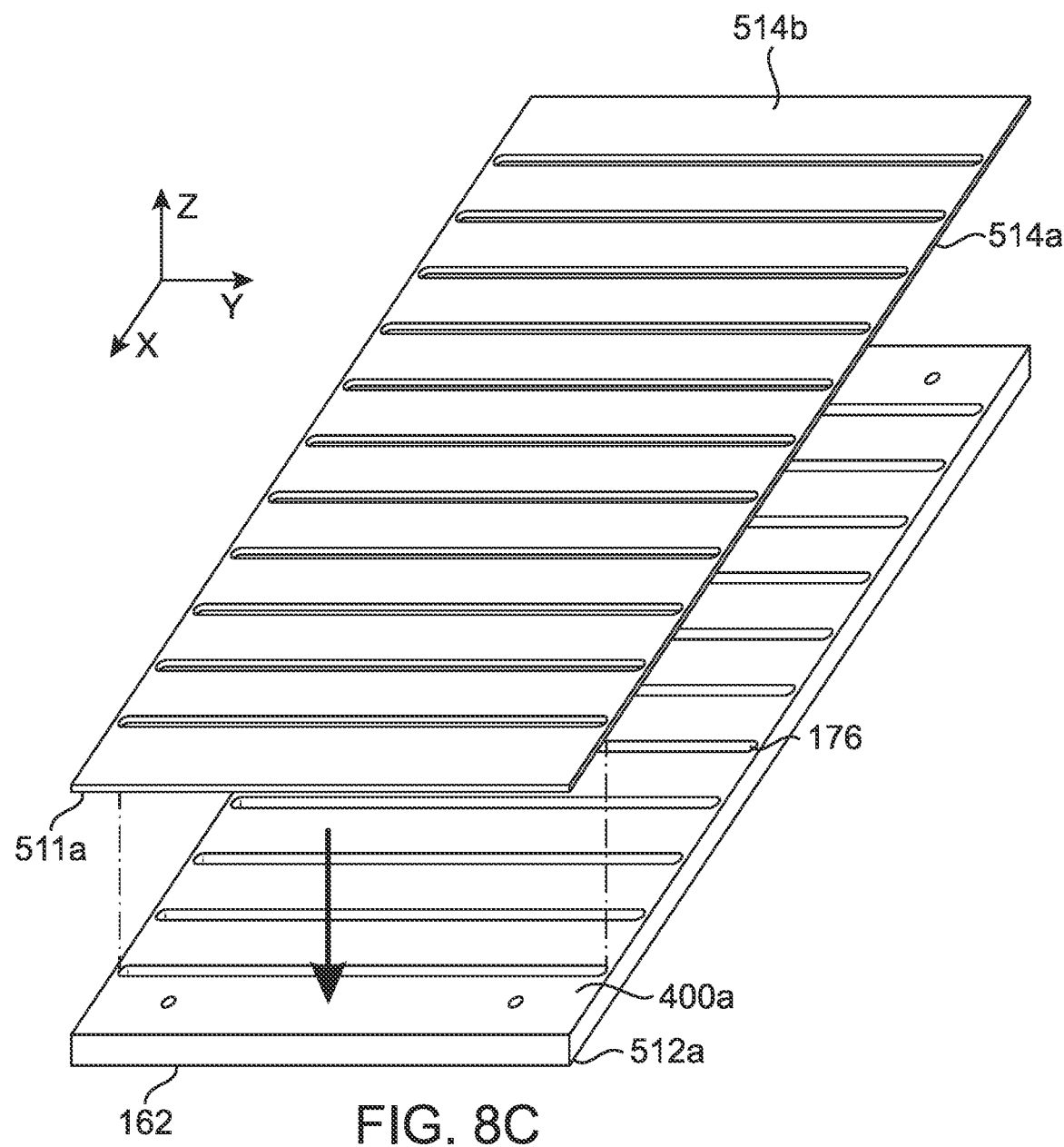
Figure 8D:
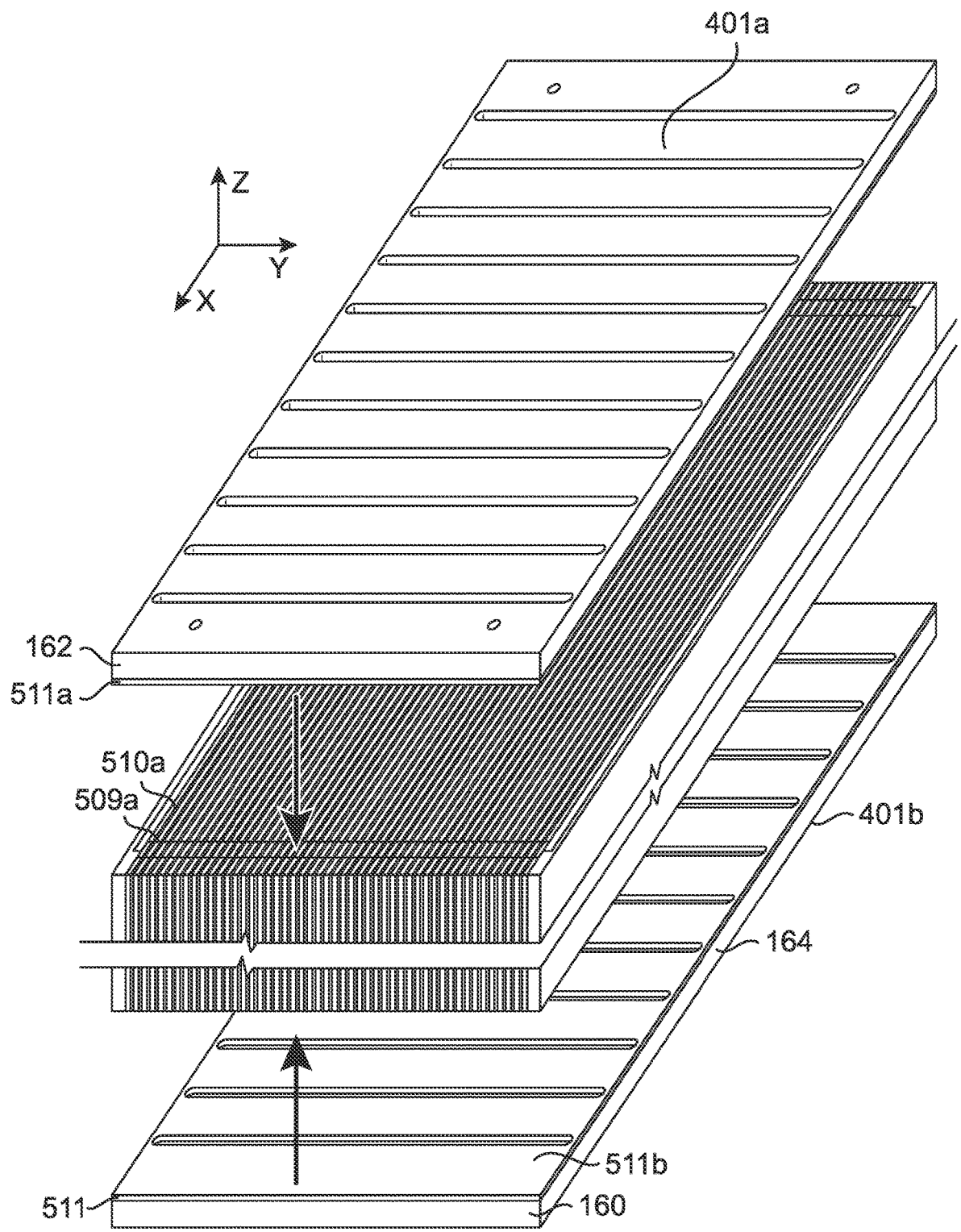
Figure 8E:
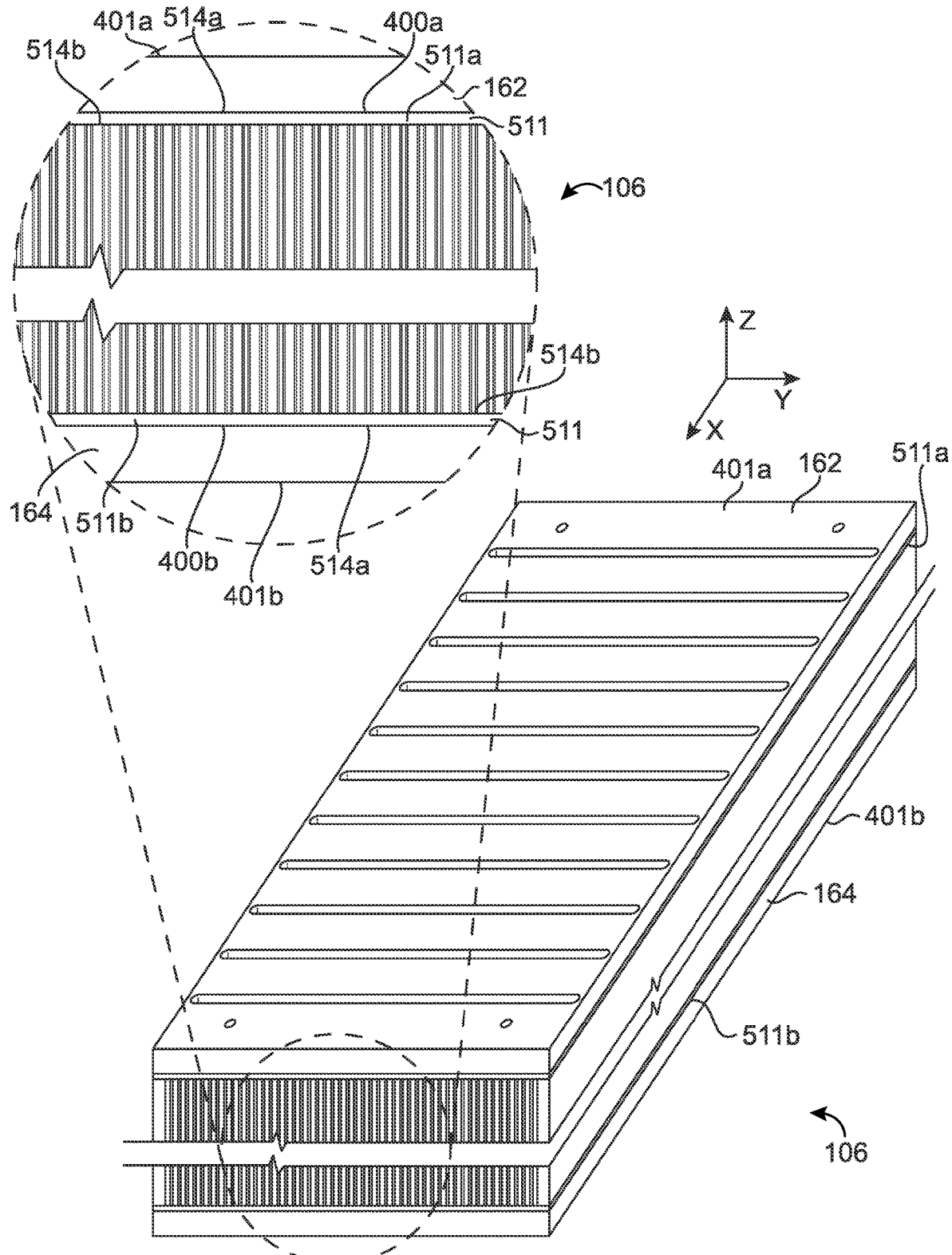
Figure 10A:
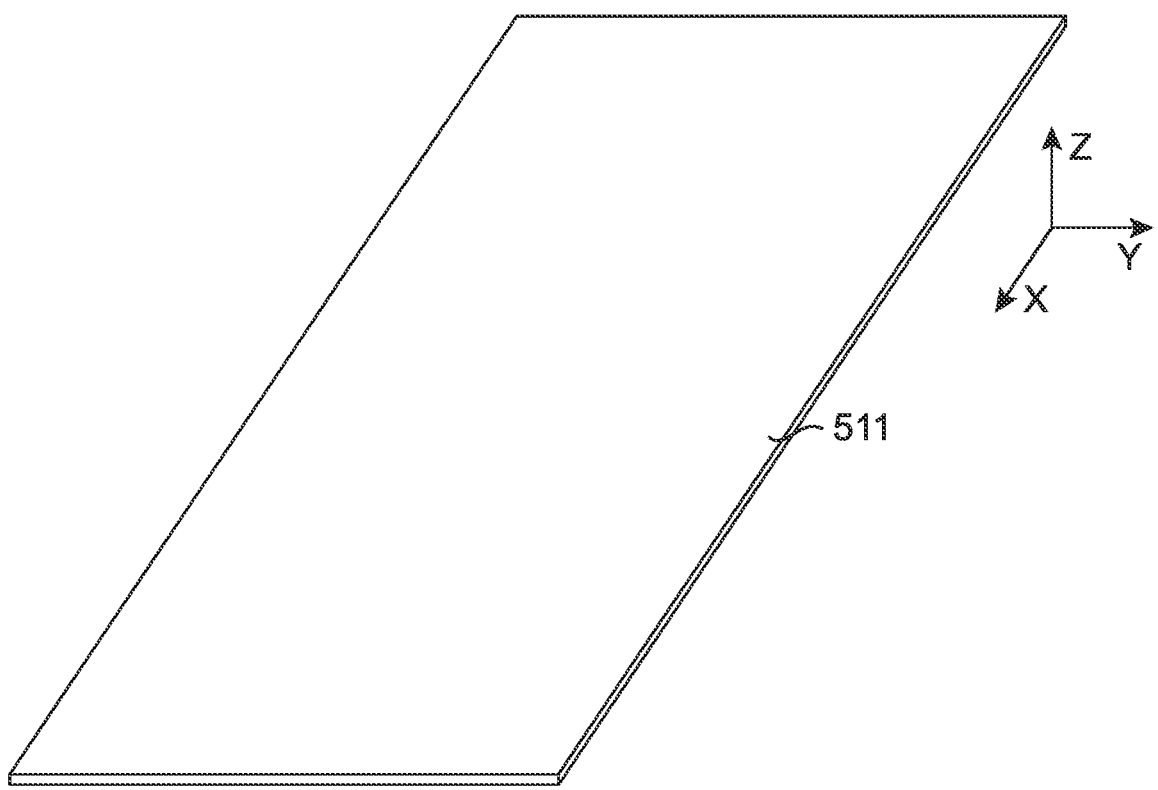
FIGS. 10A-10E show an alternative process of fabricating the secondary battery and/or electrode assembly by using an electrically-insulating, thermoplastic, hot-melt adhesive.

In this example, the hot-melt adhesive 511 is provided in the form of an adhesive film shape having a predetermined thickness and first and second adhesive portions 511*a*, 511*b* (FIG. 10A). The adhesive film 511 is then cut to form cutouts having a predetermined pattern that at least partly covers and/or conforms to the shape of the inner surfaces of the first and second connecting members 400*a*, 400*b*, as shown in FIG. 8B. Next, as shown in FIG. 8C, the first portion of adhesive film cutouts 511*a* and the second portion of the adhesive film cutouts 511*b* are placed in contact with upper and lower inner surfaces 400*a*, 400*b* of the first and second connecting members 510*a*, 510*b*, while leaving the apertures (slots) 176 open. Then, the upper and lower end surfaces of the subset of the members of the electrode and/or counter-electrode population 110, 112 are placed in contact with the second first and second portions of the adhesive film cutouts 511*a*, 511*b* (FIG. 8D), at surfaces of the adhesive film opposite to the side of the film that is placed in contact with the inner surfaces 400*a*, 400*b*. The adhesive film cutouts are melted and/or softened by heating at a temperature of at least 75° C., and no more than 130° C., to adhere the subset of the members of the electrode and/or counter-electrode population 110, 112 to the first and second connecting members 162, 164. During the heating process, a pressure can be applied to the outer surfaces 401*a*, 401*b* of the first and second connecting members 162, 164 to improve adhesion. The assembled product is shown in FIG. 8E.

Example 2

The present example demonstrates another exemplary process of fabricating the secondary battery 102 and/or electrode assembly 10, with emphasis on the application of a hot-melt adhesive. FIGS. 9A-9E are referred to herein as an embodiment of the process.

Figure 9A:
FIGS. 9A-9E show another process of fabricating the secondary battery and/or electrode assembly by using an electrically-insulating, thermoplastic, hot-melt adhesive in a form.
Figure 9B:
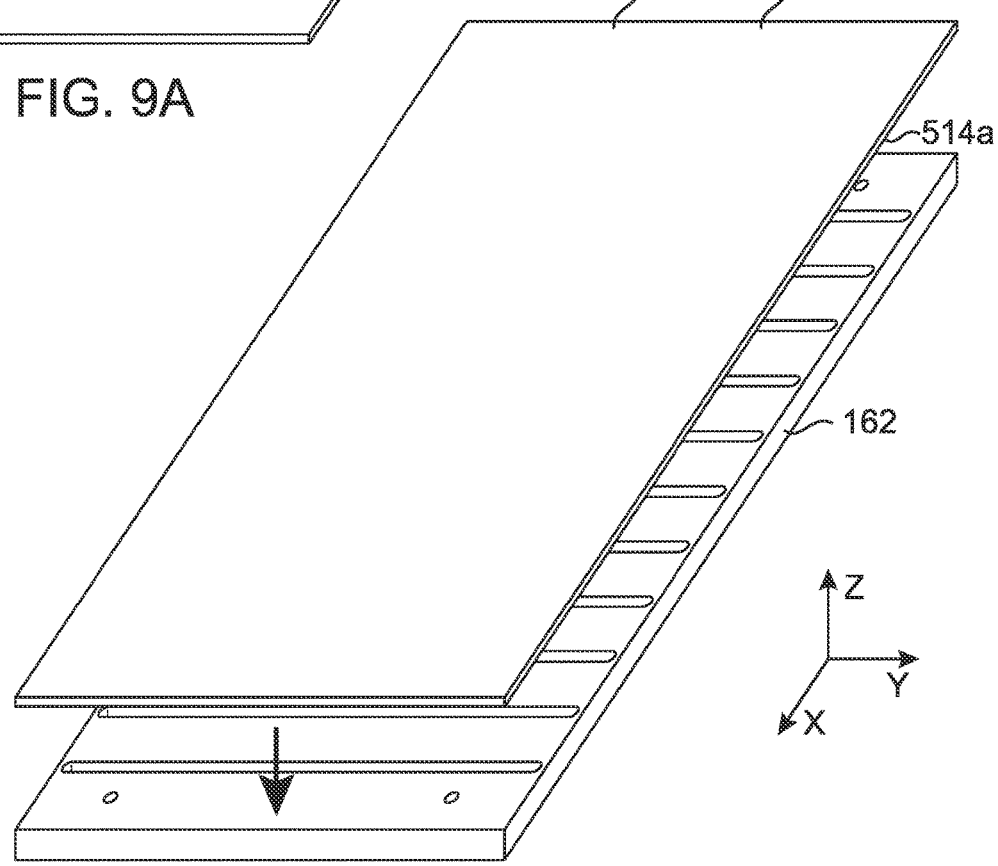
Figure 9C:
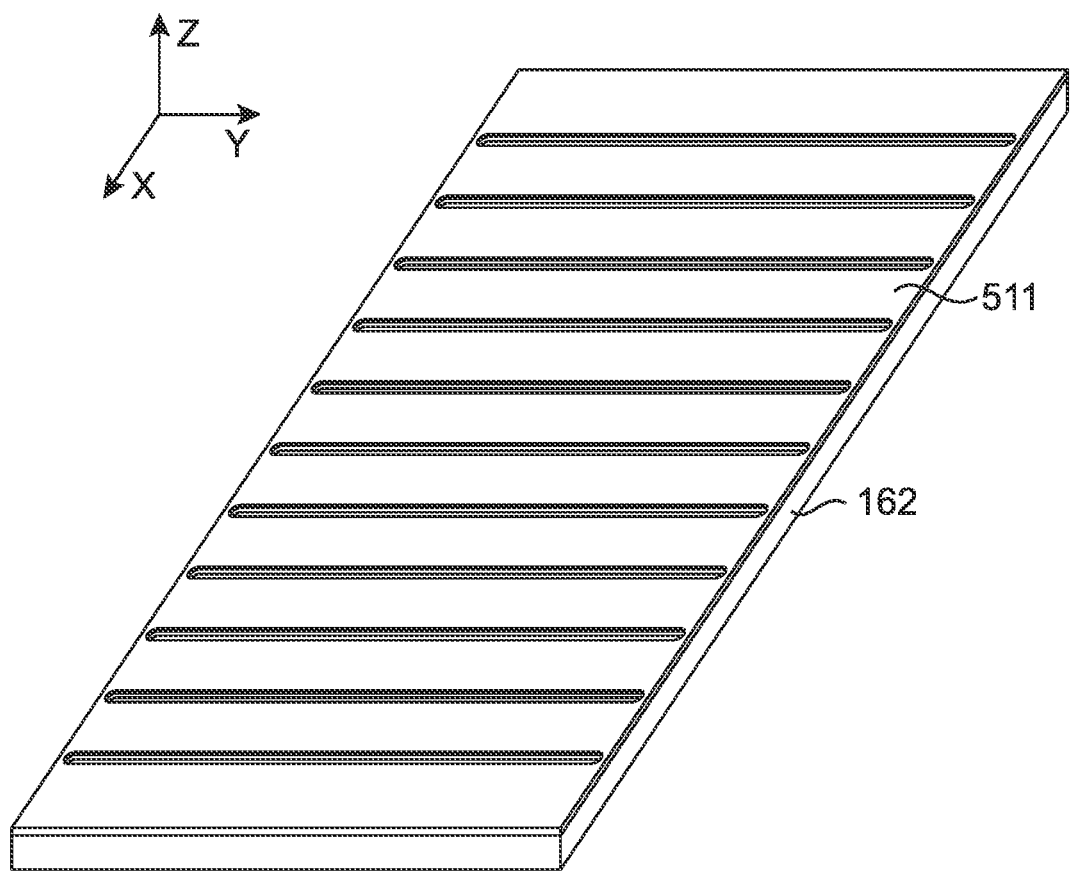
Figure 9D:
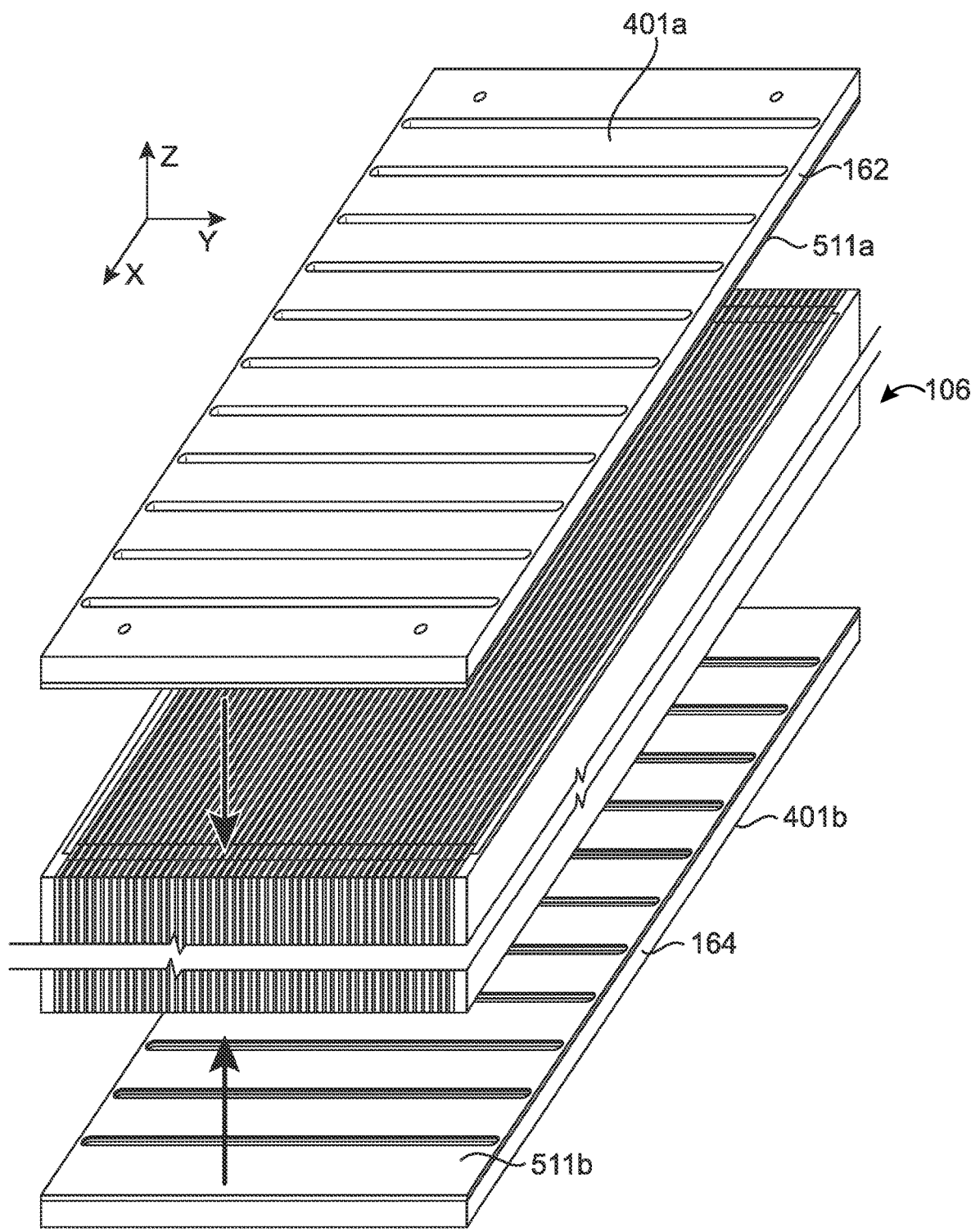
Figure 9E:
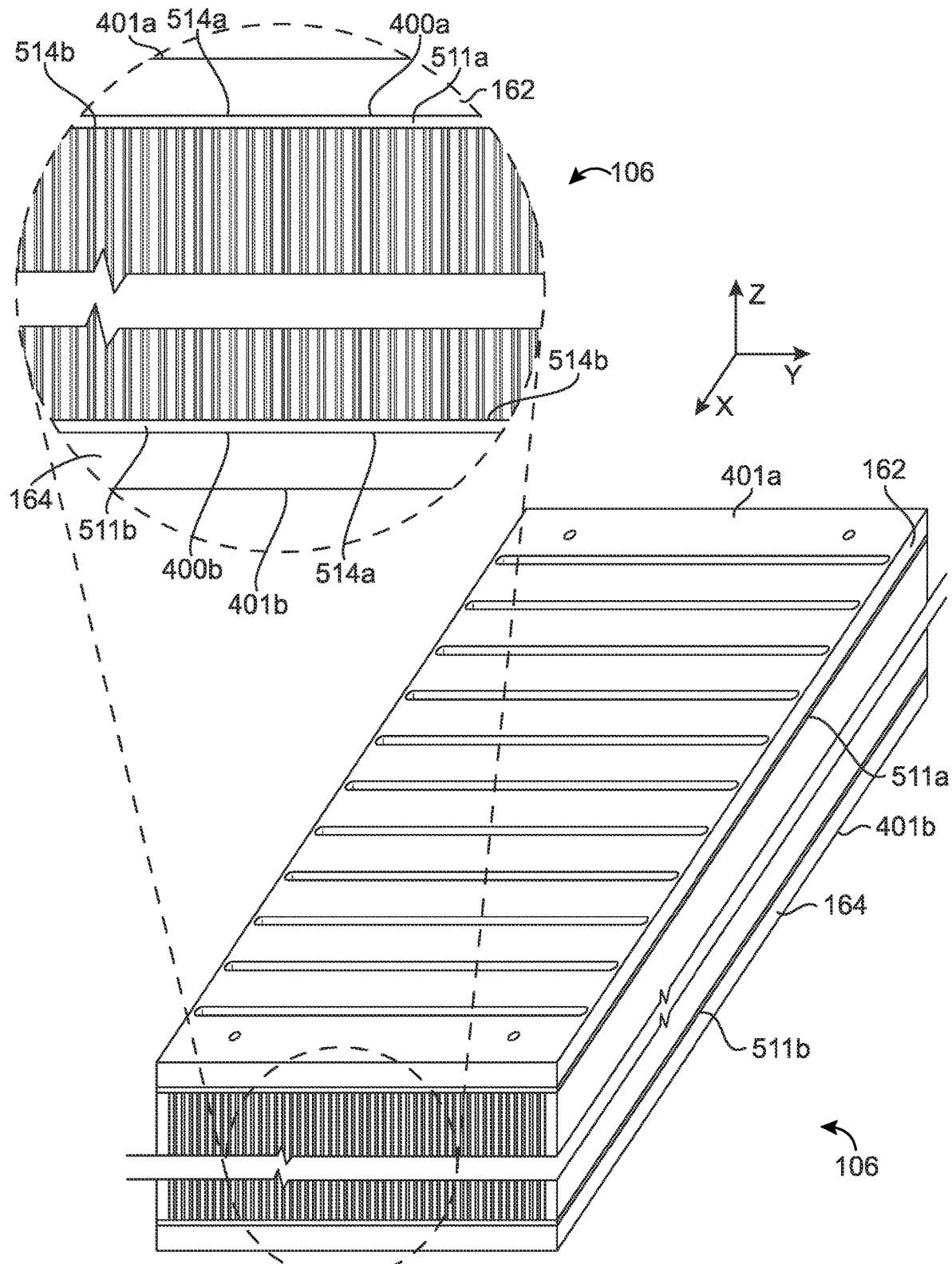

In this example, the process is different from that of Example 1 by first placing the first portion and second portion of the adhesive film 511*a*, 511*b* in contact with the upper and lower inner surfaces 400*a*, 400*b* of the first and second connecting members 162, 164 (FIG. 9B), then cutting to form the predetermined, desired pattern, as shown in FIG. 9C. The first and second secondary connecting members 162, 164 can then be connected to the subset of the members of the electrode and/or counter-electrode population 110, 112, for example as described for Example 1, and as depicted in FIGS. 9D-9E.

Example 3

The present example demonstrates another exemplary process of fabricating the secondary battery 102 and/or electrode assembly 10, with emphasis on the application of a hot-melt adhesive FIGS. 10A-10E is referred to herein as an embodiment of the process.

Figure 10B:
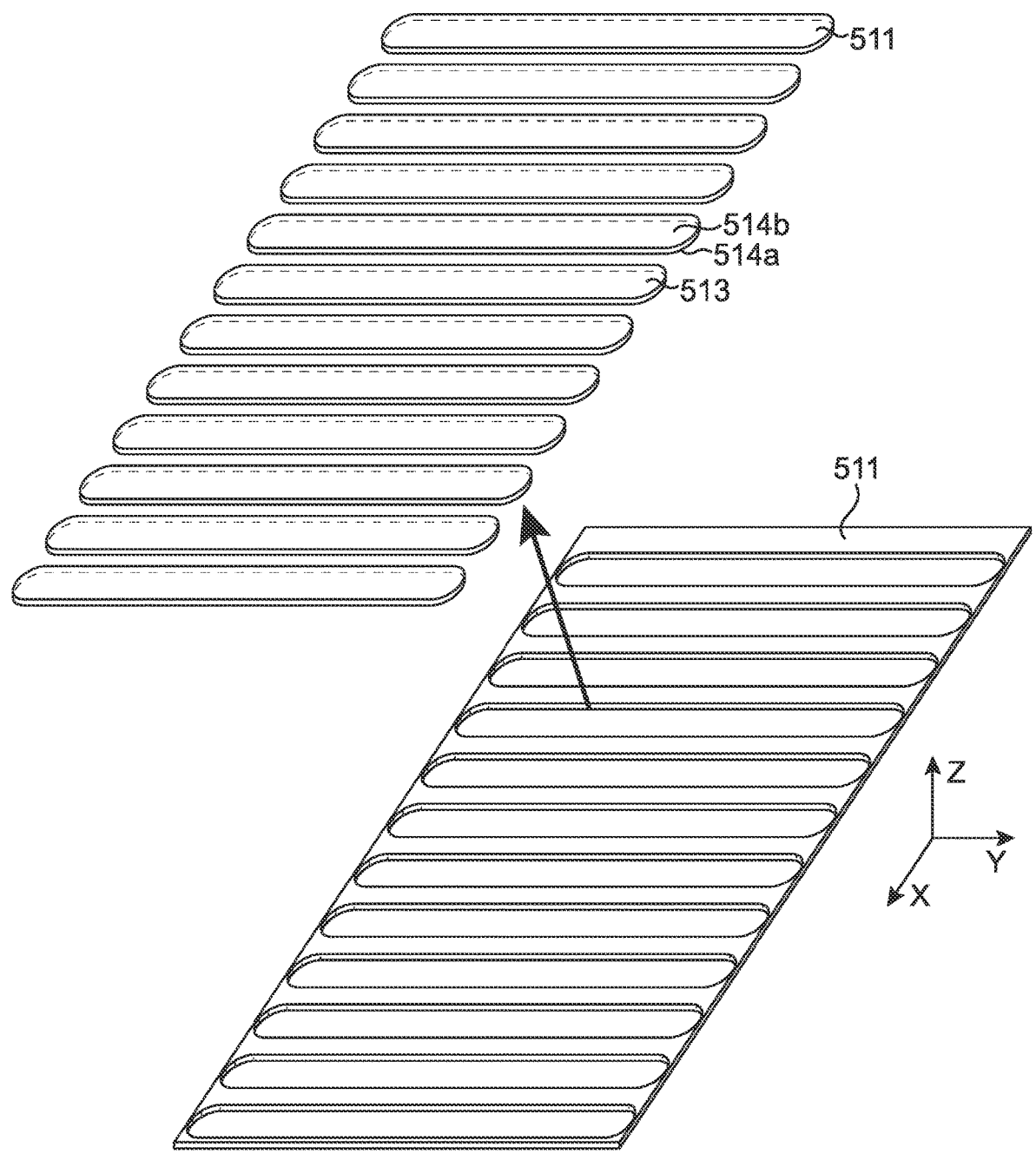
Figure 10C:
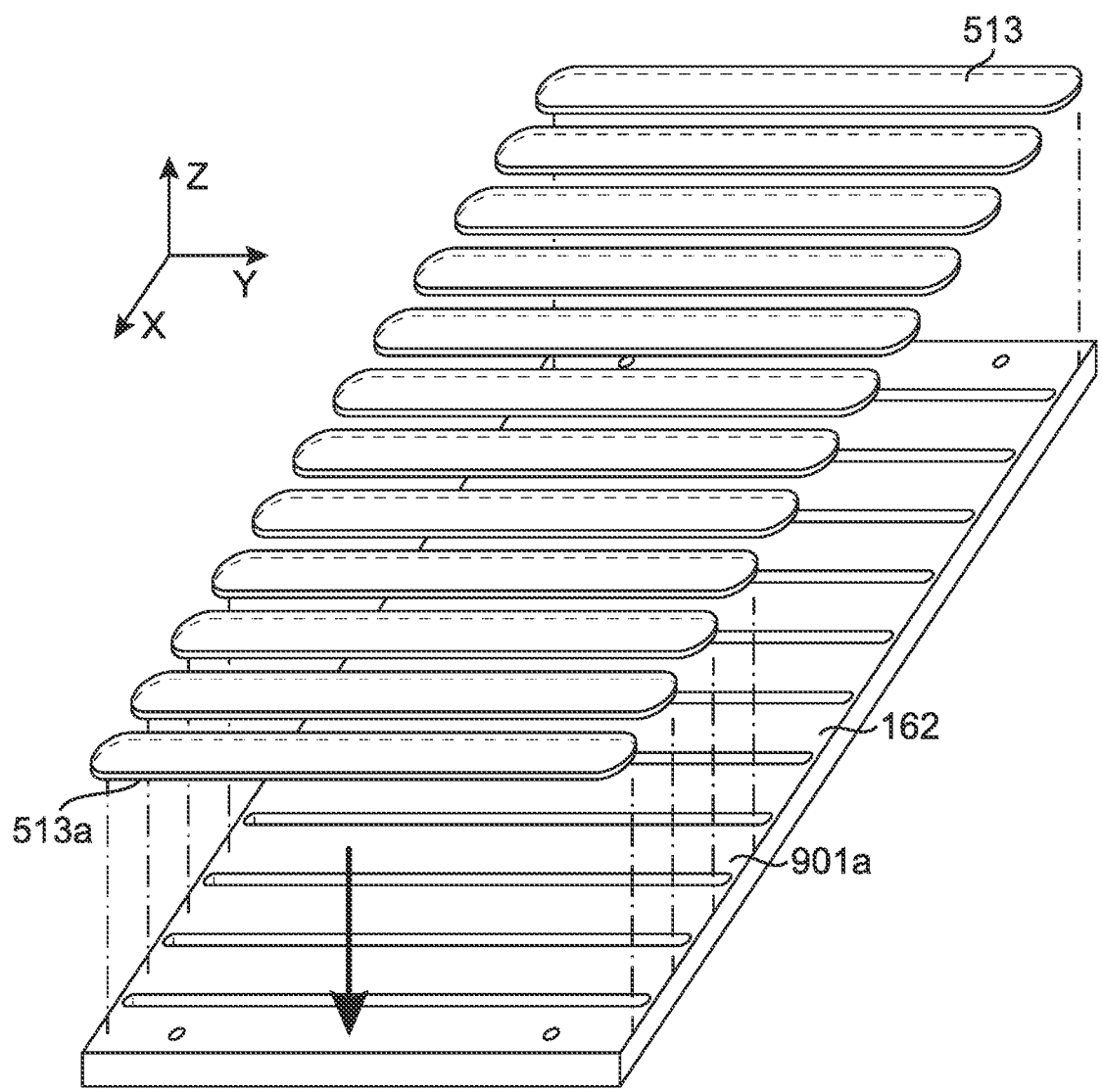
Figure 10D:
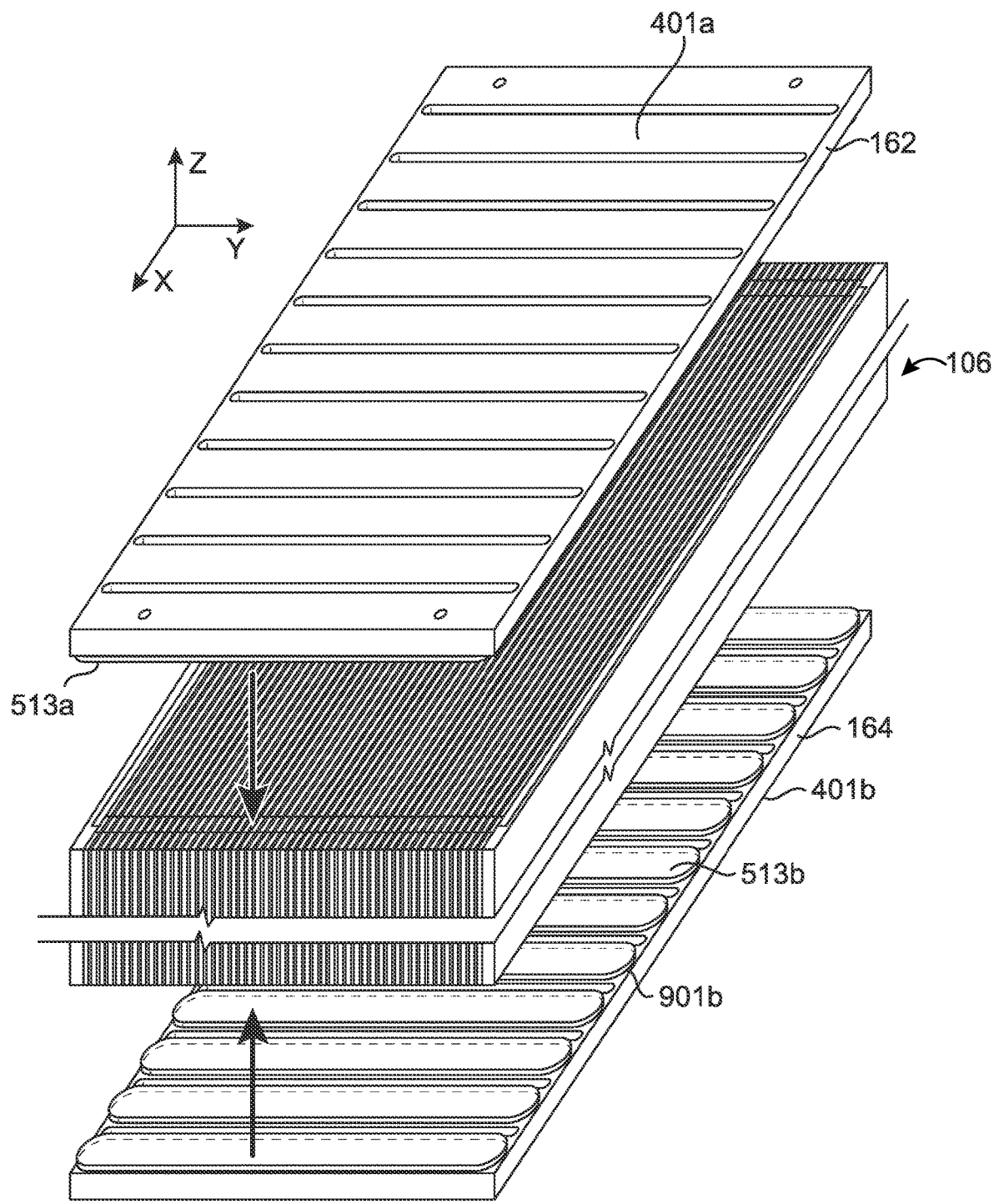
Figure 10E:
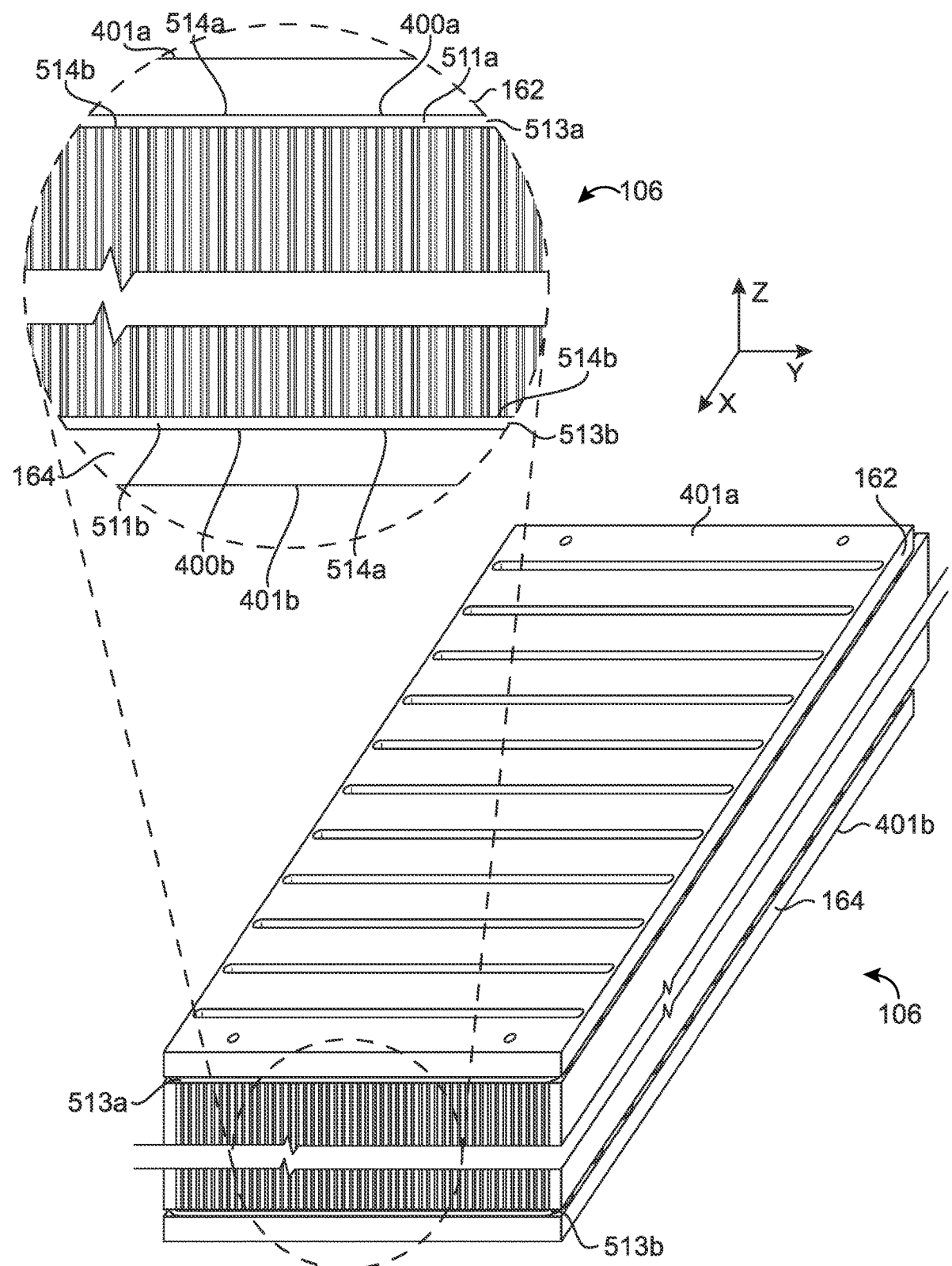

In this example, the adhesive film 511 is cut into a number of strips 513, as illustrated in FIG. 10B. The first portion of strips 513a are then placed in contact with upper inner surfaces 400a of the first connecting member 162, and the second portion of strips 513b are placed in contact with lower inner surfaces 400b of the second connecting member 164, in between the apertures (slots) 176 (FIG. 10C). The first and second secondary connecting members 162, 164 can then be connected to the subset of the members of the electrode and/or counter-electrode population 110, 112, for example as described for Example 1, and as depicted in FIGS. 10D-10E. Alternatively, similar to the process demonstrated in Example 2, the adhesive film 511 can be placed on upper and lower inner surfaces 400a, 400b of the first and second connecting members 162, 164, then cut and leave the strips 513 in contact. Other methods of applying the adhesive film 511 and/or connecting to the first and/or second primary connecting member can also be provided.

The following embodiments are provided to illustrate aspects of the disclosure, although the embodiments are not intended to be limiting and other aspects and/or embodiments may also be provided.

Embodiment 1. An electrode assembly for a secondary battery comprising a population of unit cells, a constraint system, and an adhesive, wherein
the electrode assembly has mutually perpendicular longitudinal, transverse, and vertical axes, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction,
the electrode assembly further comprises a population of electrode structures, a population of counter-electrode structures, and an electrically insulating separator material electrically separating members of the electrode and counter-electrode populations, the members of the electrode and counter-electrode structure populations having opposing upper and lower end surfaces separated in the vertical direction, and wherein each member of the unit cell population comprises an electrode structure, a counter-electrode structure, and an electrically insulating separator between the electrode and counter-electrode structures,
the constraint system comprises (i) first and second primary growth constraints separated in the longitudinal direction, (ii) first and second connecting members separated in the vertical direction that connect the first and second primary growth constraints, and a subset of the members of the electrode or counter-electrode population wherein the first and second connecting members have opposing upper and lower inner surfaces to which the upper and lower end surfaces of the subset are adhered, respectively, by an electrically-insulating, thermoplastic, hot-melt adhesive having (i) a melting temperature in the range of 75° C. to 130° C., and (ii) a melt index value.

Embodiment 2: A secondary battery comprising the electrode assembly of Embodiment 1.

Embodiment 3. The electrode assembly or secondary battery according to any of Embodiments 1-2, wherein the melting temperature of the hot-melt adhesive is in the range of 77° C. to 100° C.

Embodiment 4. The electrode assembly or secondary battery according to any preceding Embodiment, wherein the melt index value as measured according to ASTM D1238 is in a range of at least 70 to no more than 350.

Embodiment 5. The electrode assembly or secondary battery of any preceding Embodiment, wherein the members of the population of electrode structures comprise electrode current collectors having opposing upper and lower end surfaces in the vertical direction, and members of the population of counter-electrode structures comprise counter-electrode current collectors having opposing upper and lower end surfaces in the vertical direction, and wherein the first and second connecting members are adhered to vertical end surfaces of the electrode or counter-electrode current collectors of the subset of members of the electrode or counter-electrode population.

Embodiment 6. The electrode assembly or secondary battery of any preceding Embodiment, wherein the hot-melt adhesive comprises a material selected from EM (ethylene-co-acrylic acid), EMAA (ethylene-co-methacrylic acid), functionalized polyethylenes and polypropylenes, and combinations thereof.

Embodiment 7. The electrode assembly or secondary battery of any preceding Embodiment, wherein the hot-melt adhesive comprises a mixture of EM and EMAA copolymers.

Embodiment 8. The electrode assembly or secondary battery of any preceding Embodiment, wherein the hot-melt adhesive does not significantly react or lose adhesion at temperatures at or above about 80° C.

Embodiment 9. The electrode assembly or secondary battery of any preceding Embodiment, wherein the hot-melt adhesive does not significantly lose adhesion over 1000 consecutive cycles of the secondary battery.

Embodiment 10. The electrode assembly or secondary battery of any preceding Embodiment, wherein the hot-melt adhesive has a film shape with a thickness in the range of about 10 to about 100 micrometers and a predetermined pattern geometry.

Embodiment 11. The electrode assembly or secondary battery of any preceding Embodiment, wherein the first or second connecting members comprise apertures formed through a vertical thickness of the respective members, and wherein the first or second connecting members comprise bonding regions of the inner surfaces that are adjacent the apertures, where the hot melt adhesive is provided for adhering to the subset of the members of the electrode or counter-electrode population.

Embodiment 12. The electrode assembly or secondary battery of
Embodiment 11, wherein both first and second connecting members comprise apertures through the vertical thicknesses thereof.

Embodiment 13. The electrode assembly or secondary battery according to any of Embodiments 11-12, wherein the apertures comprise a plurality of slots extending in the longitudinal direction, and wherein the bonding regions to adhere to the subset are located on inner surface regions in between the slots of the first or second connecting members.

Embodiment 14. The electrode assembly or secondary battery of any preceding Embodiment, where the surface area of the first and second longitudinal end surfaces is less than 33% of the surface area of the electrode assembly.

Embodiment 15. The electrode assembly or secondary battery of any preceding Embodiment, wherein a length $L_E$ of each member of the electrode structure population and a length $L_{CE}$ of each member of the counter-electrode structure population are measured in the transverse direction of their central longitudinal axis $A_E$ and $A_{CE}$, a width $W_E$ of each member of the electrode structure population and a width $W_{CE}$ of each member of the counter-electrode structure population are measured in the longitudinal direction, and a height $H_E$ of each member the electrode structure population and a height $H_{CE}$ of each member of the counter-electrode structure population is measured in the vertical direction that is perpendicular to the central longitudinal axis $A_E$ or $A_{CE}$ of each such member and to the longitudinal direction, the ratio of $L_E$ to each of $W_E$ and $H_E$ of each member of the electrode structure population being at least 5:1, respectively, the ratio of $H_E$ to $W_E$ for each member of the electrode structure population being between 0.4:1 and 1000:1, and the ratio of $L_{CE}$ to each of $W_{CE}$ and $H_{CE}$ of each member of the counter-electrode structure population being at least 5:1, respectively, the ratio of $H_{CE}$ to $W_{CE}$ for each member of the counter-electrode structure population being between 0.4:1 and 1000:1.

Embodiment 16. The electrode assembly or secondary battery of any preceding Embodiment, wherein the ratio of each of $L_{EA}$ and $W_{EA}$ to $H_{EA}$ is at least 2:1.

Embodiment 17. The electrode assembly or secondary battery of any preceding Embodiment, wherein a projection of members of the electrode structure population and the counter electrode structure populations onto the first longitudinal surface circumscribes a first projected area and a projection of the members of the electrode structure population and the counter electrode structure population onto the second longitudinal surface circumscribes a second projected area, and wherein the first and second primary growth constraints comprises first and second compression members that overlie the first and second projected areas.

Embodiment 18. The electrode assembly or secondary battery of any preceding Embodiment, wherein the first and second primary growth constraints maintain a pressure on the electrode assembly in the longitudinal direction that exceeds the pressure maintained on the electrode assembly in the each of the two directions that are mutually perpendicular and perpendicular to the longitudinal direction, exceeds the pressure maintained on the electrode assembly in the each of the two directions that are mutually perpendicular and perpendicular to the longitudinal direction.

Embodiment 19. The electrode assembly or secondary battery of any preceding Embodiment, wherein the first and second primary growth constraints maintain a pressure on the electrode assembly in the longitudinal direction that exceeds the pressure maintained on the electrode assembly in the each of the two directions that are mutually perpendicular and perpendicular to the longitudinal direction by a factor of at least 3.

Embodiment 20. The electrode assembly or secondary battery of any preceding Embodiment, wherein the first and second primary growth constraints maintain a pressure on the electrode assembly in the longitudinal direction that exceeds the pressure maintained on the electrode assembly in the each of the two directions that are mutually perpendicular and perpendicular to the longitudinal direction by a factor of at least 4.

Embodiment 21. The electrode assembly or secondary battery of any preceding Embodiment, wherein the first and second primary growth constraints maintain a pressure on the electrode assembly in the longitudinal direction that exceeds the pressure maintained on the electrode assembly in the each of the two directions that are mutually perpendicular and perpendicular to the longitudinal direction by a factor of at least 5.

Embodiment 22. The electrode assembly or secondary battery of any preceding Embodiment, wherein the primary growth constraint system restrains growth of the electrode assembly in the longitudinal direction such that any increase in the Feret diameter of the electrode assembly in the longitudinal direction over 20 consecutive cycles is less than 20%.

Embodiment 23. The electrode assembly or secondary battery of any preceding Embodiment, wherein the primary growth constraint system restrains growth of the electrode assembly in the longitudinal direction such that any increase in the Feret diameter of the electrode assembly in the longitudinal direction over 10 consecutive cycles is less than 10%

Embodiment 24. The electrode assembly or secondary battery of any preceding Embodiment, wherein the primary growth constraint system restrains growth of the electrode assembly in the longitudinal direction such that any increase in the Feret diameter of the electrode assembly in the longitudinal direction over 5 consecutive cycles is less than 10%.

Embodiment 25. The electrode assembly or secondary battery of any preceding Embodiment, wherein the primary growth constraint system restrains growth of the electrode assembly in the longitudinal direction such that any increase in the Feret diameter of the electrode assembly in the longitudinal direction is less than 1% per cycle.

Embodiment 26. The electrode assembly or secondary battery of any preceding Embodiment, wherein the first and second connecting member comprise a secondary growth constraint system that restrains growth of the electrode assembly in the vertical direction, such that any increase in the Feret diameter of the electrode assembly in the vertical direction over 20 consecutive cycles is less than 20%

Embodiment 27. The electrode assembly or secondary battery of any preceding Embodiment, wherein the first and second connecting member comprise a secondary growth constraint system that restrains growth of the electrode assembly in the vertical direction, such that any increase in the Feret diameter of the electrode assembly in the vertical direction over 10 consecutive cycles is less than 10%

Embodiment 28. The electrode assembly or secondary battery of any preceding Embodiment, wherein the first and second connecting member comprise a secondary growth constraint system that restrains growth of the electrode assembly in the vertical direction, such that any increase in the Feret diameter of the electrode assembly in the vertical direction over 5 consecutive cycles is less than 10%.

Embodiment 29. The electrode assembly or secondary battery of any preceding Embodiment, wherein the first and second connecting member comprise a secondary growth constraint system that restrains growth of the electrode assembly in the vertical direction, such that any increase in the Feret diameter of the electrode assembly in the vertical direction is less than 1% per cycle.

Embodiment 30. The electrode assembly or secondary battery of any preceding Embodiment, wherein (i) members of the population of electrode structures are anode structures and members of the population of counter-electrode structures are cathode structures, or (ii) members of the population of electrode structures are cathode structures and members of the population of electrode structures are anode structures.

Embodiment 31. The electrode assembly or secondary battery of Embodiment 31, wherein members of the population of electrode structures are anode structures comprising anodically active material layers, and members of the population of counter-electrode structures are cathode structures comprising cathodically active material layers.

Embodiment 32. The electrode assembly, or secondary battery of any preceding Embodiment, wherein the electrode assembly is contained with a sealed battery enclosure.

Embodiment 33. The electrode assembly or secondary battery of Embodiment 33, wherein carrier ions and the set of electrode constraints are contained within the sealed battery enclosure.

Embodiment 34. The electrode assembly or secondary battery of any preceding Embodiment, wherein members of the population of electrode structures comprises anode active material comprising any one of more of carbon materials, graphite, soft or hard carbons, metals, semimetals, alloys, oxides, compounds capable of forming an alloy with lithium, tin, lead, magnesium, aluminum, boron, gallium, silicon, Si/C composites, Si/graphite blends, $SiO_x$, porous Si, intermetallic Si alloys, indium, zirconium, germanium, bismuth, cadmium, antimony, silver, zinc, arsenic, hafnium, yttrium, lithium, sodium, lithium titanate, palladium, lithium metals, carbon, petroleum cokes, activated carbon, graphite, silicon compounds, silicon alloys, tin compounds, non-graphitizable carbon, graphite-based carbon, $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements found in Group 1, Group 2 and Group 3 in a periodic; table, halogen; $0<x\leq 1$; $1\leq y\leq 3$; $1\leq z\leq 8$), a lithium alloy, a silicon-based alloy, a tin-based alloy; a metal oxide, SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, a conductive polymer, polyacetylene, Li—Co—Ni-based material, crystalline graphite, natural graphite, synthetic graphite, amorphous carbon, Kish graphite, pyrolytic carbon, mesophase pitch-based carbon fibers, meso-carbon microbeads, rnesophase pitches, graphitized carbon fiber, high-temperature sintered carbon, petroleum, coal tar pitch derived cokes, tin oxide, titanium nitrate, lithium metal film, an alloy of lithium and one or more types of metals selected from the group consisting of Na, K, Rb, Cs, Fr, Be, Mg, Ca, Sr, Ba, Ra, Al and Sn, a metal compound capable of alloying and/or intercalating with lithium selected from any of Si, Al, C, Pt, Sn, Pb, Ir, Ni, Cu, Ti, Na, K, Rb, Cs, Fr, Be, Ca, Sr, Sb, Ba, Ra, Ge, Zn, Bi, In, Mg, Ga, Cd, a Sn alloy, an Al alloy, a metal oxide capable of doping and dedoping lithium ions, $SiO_v$ ($0<v<2$), $SnO_2$, vanadium oxide, lithium vanadium oxide, a composite including a metal compound and carbon material, a Si—C composite, a Sn—C composite, a transition metal oxide, $Li_4/3Ti_{1.5}/3O_4$, SnO, a carbonaceous material, graphite carbon fiber, resin calcination carbon, thermal decomposition vapor growth carbon, corks, mesocarbon microbeads ("MCMB"), furfuryl alcohol resin calcination carbon, polyacene, pitch-based carbon fiber, vapor growth carbon fiber, or natural graphite, and a composition of the formula $Na_xSn_{y-z}M_z$ disposed between layers of the layered carbonaceous material, wherein M is Ti, K, Ge, F, or a combination thereof, and $0<x\leq 15$, $1\leq y\leq 5$, and $0\leq z\leq 1$, as well as oxides, alloys, nitrides, fluorides of any of the foregoing, and any combination of any of the foregoing.

Embodiment 35. The electrode assembly or secondary battery of Embodiment 34, wherein the anode active material comprises at least one of lithium metal, a lithium metal alloy, silicon, silicon alloy, silicon oxide, tin, tin alloy, tin oxide, and a carbon-containing material.

Embodiment 36. The electrode assembly or secondary battery of Embodiment 35, wherein the anode active material comprises at least one of silicon and silicon oxide.

Embodiment 37. The electrode assembly or secondary battery of Embodiment 35, wherein the anode active material comprises at least one of lithium and lithium metal alloy.

Embodiment 38. The electrode assembly or secondary battery according to Embodiment 35, wherein the anode active material comprises a carbon-containing material.

Embodiment 39. The electrode assembly or secondary battery of any preceding Embodiment, wherein members of the population of electrically insulating separators comprise microporous separator material permeated with non-aqueous liquid electrolyte.

Embodiment 40. The electrode assembly, or secondary battery of any of Embodiments 1-39, wherein members of the population of electrically insulating separators comprise solid electrolyte.

Embodiment 41. The electrode assembly or secondary battery of Embodiment 40, wherein members of the population of electrically insulating separators comprise a ceramic material, glass, or garnet material.

Embodiment 42. The electrode assembly or secondary battery of any preceding Embodiment, the electrode assembly comprising an electrolyte selected from the group consisting of non-aqueous liquid electrolytes, gel electrolytes, solid electrolytes and combinations thereof.

Embodiment 43. The electrode assembly or secondary battery of any preceding Embodiment, wherein the electrode assembly comprises a liquid electrolyte.

Embodiment 44. The electrode assembly or secondary battery of any preceding Embodiment, wherein the electrode assembly comprises an aqueous liquid electrolyte.

Embodiment 45. The electrode assembly or secondary battery of any preceding Embodiment, wherein the electrode assembly comprises a non-aqueous liquid electrolyte.

Embodiment 46. The electrode assembly or secondary battery of any preceding Embodiment, wherein the electrode assembly comprises a gel electrolyte.

Embodiment 47. The electrode assembly or secondary battery of any preceding Embodiment, wherein the electrically insulating separator comprises a solid electrolyte.

Embodiment 48. The electrode assembly or secondary battery of any preceding Embodiment, wherein the electrically insulating separator comprises a solid polymer electrolyte.

Embodiment 49. The electrode assembly or secondary battery of any preceding Embodiment, wherein the electrically insulating separator comprises a solid inorganic electrolyte.

Embodiment 50. The electrode assembly or secondary battery of any preceding Embodiment, wherein the electrically insulating separator comprises a solid organic electrolyte.

Embodiment 51. The electrode assembly or secondary battery of any preceding Embodiment, wherein the electrically insulating separator comprises a ceramic electrolyte.

Embodiment 52. The electrode assembly or secondary battery of any preceding Embodiment, wherein the electrically insulating separator comprises an inorganic electrolyte.

Embodiment 53. The electrode assembly or secondary battery of any preceding Embodiment, wherein the electrically insulating separator comprises a ceramic.

Embodiment 54. The electrode assembly or secondary battery of any preceding Embodiment, wherein the electrically insulating separator comprises a garnet material.

Embodiment 55. The electrode assembly or secondary battery of any preceding Embodiment, comprising an electrolyte selected from the group consisting of aqueous electrolytes, a non-aqueous liquid electrolyte, a solid polymer electrolyte, a solid ceramic electrolyte, a solid glass electrolyte, a solid garnet electrolyte, a gel polymer electrolyte, an inorganic solid electrolyte, and a molten-type inorganic electrolyte.

Embodiment 56. The electrode assembly or secondary battery of any preceding Embodiment, wherein members of the population of counter-electrode structures comprise a cathodically active material comprising at least one of transition metal oxides, transition metal sulfides, transition metal nitrides, lithium-transition metal oxides, lithium-transition metal sulfides, lithium-transition metal nitrides, including transition metal oxides, transition metal sulfides, and transition metal nitrides having metal elements having a d-shell or f-shell, and/or where the metal element is any selected from Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au, $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum on/sulfides, phosphates, silicates, vanadates, sulfur, sulfur compounds, oxygen (air), $Li(Ni_xMn_yCo_z)O_2$, lithium-containing compounds comprising metal oxides or metal phosphates, compounds comprising lithium, cobalt and oxygen (e.g., $LiCoO_2$), compounds comprising lithium, manganese and oxygen (e.g., $LiMn_2O_4$) compounds comprising lithium iron and phosphate (e.g., LiFePO), lithium manganese oxide, lithium cobalt oxide, lithium nickel oxide, lithium iron phosphate, lithium cobalt oxide ($LiCoO_2$), lithium nickel oxide ($LiNiO_2$), a substituted compound with one or more transition metals, lithium manganese oxide, $Li_{1+x}Mn_{2-x}O_4$ (where, x is 0 to 0.33), $LiMnO_3$, $LiMn_2O_3$, $LiMnO_2$, lithium copper oxide ($Li_2CuO_2$), vanadium oxide. $LiV_3O_3$, $LiFe_3O_4$, $V_2O_5$, $Cu_2V_2O_7$, Ni site-type lithium nickel oxide represented by the chemical formula of $LiNi_{1-x}M_xO_2$ (where, M=Co, Mn, Al, Cu, Fe, Mg, B or Ga, and x=0.01 to 0.3), lithium manganese complex oxide represented by the chemical formula of $LiMn_{2-x}M_{2-x}M_xO_2$ (where, Ni, Fe, Cr, Zn or Ta, and x=0.01 to 0.1),$Li_2Mn_3MO_8$ (where, M=Fe, Co, Ni, Cu or Zn), $LiMn_2O_4$ in which a portion of Li is substituted with alkaline earth metal ions, a disulfide compound, $Fe_2(MoO_4)_3$, a lithium metal phosphate having an olivine crystal structure of Formula 2 $Li_{1+a}Fe_{1-x}M'_x(PO_{4-b})X_b$ wherein M' is at least one selected from Al, Mg, Ni, Co, Mn, Ti, Ga, Cu, V, Nb, Zr, Ce, In, Zn, and Y, X is at least one selected from F, S, and N, −0.5≤a≤+0.5, 0≤x≤0.5, and 0≤b≤0.1, $LiFePO_4$, Li(Fe, Mn)$PO_4$, Li(Fe, Co)$PO_4$, Li(Fe, Ni)$PO_4$, $LiCoO_2$, $LiNiO_2$, $LiMnO_2$, $LiMn_2O_4$, $LiNi_{1-y}Co_yO_2$, $LiCo_{1-y}Mn_yO_2$, $LiNi_{1-y}Mn_yO_2$(0≤y≤1), $Li(Ni_aCo_bMn_c)O_4$(0<a<2, 0<b<2, 0<c<2, and a+b+c=2), $LiMn_{2-z}Ni_zO_4$, $LiMn_{2-z}Co_zO_4$ (0<z<2), $LiCoPO_4$ and $LiFePO_4$, elemental sulfur (S8), sulfur series compounds, $Li_2S_n$ (n≥1), an organosutfur compound, a carbon-sulfur polymer (($C_2S_x)_n$; x=2.5 to 50, n≥2), an oxide of lithium and zirconium, a composite oxide of lithium and metal (cobalt, manganese, nickel, or a combination thereof), $Li_aA_{1-b}M_bD_2$ (wherein, 0.90≤a≤1, and 0≤b≤0.5), $Li_aE_{1-b}M_bO_{2-c}D_c$ (wherein, 0.90≤a≤1, 0≤b≤0.5, and 0≤c≤0.05), $LiE_{2-b}M_bO_{4-c}D_c$ (wherein, 0≤b≤0.5, and 0≤c≤2), $Li_aNi_{1-b-c}Co_bM_cD_a$ (wherein, 0.90≤a≤1, 0≤b≤0.5, 0≤c≤0.05, and 0<a≤2), $Li_aNi_{1-b-c}Co_bM_cO_{2-a}X_a$ (wherein, 0.90≤a≤1, 0≤b≤0.5, 0≤c≤0.05, and 0<a<2), $Li_aNi_{1-b-c}Co_bM_cO_{2-a}X_2$ (wherein, 0.090≤a≤1, 0≤b≤1, 0≤c≤0.05, and 0<a<2), $Li_aNi_{1-b-c}Mn_bM_cD_a$ (wherein, 0.90≤a≤1, 0≤b≤0.5, and 0<a≤2), $Li_aNi_{1-b-c}Mn_bM_cO_{2-a}X_a$ (wherein, 0.90≤a≤1, 0≤b≤0.5, 0≤c≤0.05, and 0<a<2), $Li_aNi_{1-b-c}Mn_bM_cO_{2-a}X_2$ (wherein, 0.90≤a≤1, 0≤b≤0.5, 0≤c≤0.05, and 0<a<2), $Li_aNi_bE_cG_dO_2$ (wherein, 0.90≤a≤1, 09≤b≤0.9, 0≤c≤0.5, and 0.001≤d≤0.1), $Li_aNi_bCo_cMn_dGeO_2$ (wherein, 0.90≤a≤1, 0≤b≤0.9, 0≤c≤0.5, 0≤d≤0.5, and 0.001≤e≤0.1), $Li_aNiG_bO_2$ (wherein, 0.90≤.a≤1 and 0.001≤b≤0.1), $Li_aCoG_bO_2$ (wherein, 0.90≤a≤1 and 0.001≤b≤0.1), $Li_aMnG_bO_2$ (wherein, 0.90≤a≤1 and 0.001≤b≤0.1), $Li_aMn_2G_bO_4$ (wherein, 0.90≤a≤1 and 0.001≤b≤0.1), $QO_2$, $QS_2$, $LiQS_2$, $V_2O_5$, $LiV_2O_5$, $LiX'O_2$, $LiNiVO_4$, $Li_{(3-f)}J_2(PO_4)_3$ (0≤f≤2); $Li_{3-f}Fe_2(PO_4)_3$ (0≤f≤2), $LiFeFO_4$. (A is Ni, Co, Mn, or a combination thereof; M is Al, Ni, Co, Mn, Cr, Fe, Mg, Sr, V, a rare-earth element, or a combination thereof; D is O, F, S, P, or a combination thereof; E is Co, Mn, or a combination thereof; X is F, S, P, or a combination thereof; G is Al, Cr, Mn, Fe, Mg, La, Ce, Sr, V, or a combination thereof; Q is Ti, Mo, Mn, or a combination thereof; X' is Cr, V, Fe, Sc, Y, or a combination thereof; and J is V, Cr, Mn, Co, Ni, Cu, or a combination thereof), $LiCoO_2$, $LiMn_xO_{2x}$ (x=1 or 2), $LiNi_{1-x}Mn_xO_{2x}$ (0<x<1), $LiNi_{1-x-y}Co_xMn_yO_2$ (0≤x≤0.5, 0≤y≤0.5), $FePO_4$, a lithium compound, lithium cobalt oxide, lithium nickel oxide, lithium nickel cobalt oxide, lithium nickel aluminum oxide, lithium nickel cobalt manganese oxide, lithium manganese oxide, lithium iron phosphate, nickel sulfide, copper sulfide, sulfur, iron oxide, vanadium oxide, a sodium containing material, an oxide of the formula $NaM^1_aO_2$ (wherein $M^1$ is at least one transition metal element, and 0≤a≤1), $NaFeO_2$, $NaMnO_2$, $NaNiO_2$, $NaCoO_2$, an oxide represented by the formula $NaMn_{1-a1}M^1_aO_2$ (wherein $M^1$ is at least one transition metal element, and 0≤a<1, $Na[Ni_{1/2}Mn_{1/2}]O_2$, $Na_{2/3}$ $[Fe_{1/2}Mn_{1/2}]O_2$, an oxide represented by $Na_{0.44}Mn_{1-a}M^1_aO_2$ (wherein $M^1$ is at least one transition metal element, and 0≤a≤1), an oxide represented by $Na_{0.7}Mn_{1-a}M^1_a$ $O_{2.05}$ an (wherein $M^1$ is at least one transition metal element, and 0≤a≤1) an oxide represented by $Na_bM^2_cSi_{12}O_{30}$ (wherein $M^2$ is at least one transition metal element, 2≤b≤6, and 2≤c≤5), $Na_6Fe_2Si_{12}O_{30}$, $Na_2Fe_5Si_{12}O$ (wherein $M^2$ is at least one transition metal element, 2≤b≤6, and 2≤c≤6), an oxide represented by $Na_dM^3_eSi_6O_{18}$ (wherein $M^3$ is at least one transition metal element, 3≤d≤6, and 1≤e≤2), $Na_2Fe_2Si_6O_{16}$, $Na_2MnFeSi_6O_{18}$ (wherein $M^3$ is at least one transition metal element, 3≤d≤6, and 1≤e≤2), an oxide represented by $Na_fM^4_gSi_2O_6$ (wherein $M^4$ is at least one element selected from transition metal elements, magnesium (Mg) and aluminum (Al), 1≤f≤2 and 1≤e≤2), a phosphate, $Na_2FeSiO_6$, $NaFePO_4$, $Na_3Fe_2(PO_4)_3$, $Na_3V_2(PO_4)_3$, $Na_4Co_3(PO_4)_2P_2O_7$, a borate, $NaFeBO_4$ or $Na_3Fe_2(BO_4)_3$, a fluoride, $Na_nM^5F_6$ (wherein $M^5$ is at least one transition metal element, and 2≤h≤3), $Na_3FeF_6$, $Na_2MnF_6$, a fluorophosphate, $Na_3V_2(PO_4)_2F_3$, $Na_3V_2(PO_4)_2FO_2$, $NaMnO_2$, $Na[Ni_{1/2}Mn_{1/2}]O_2$, $Na_{2/3}[Fe_{1/2}Mn_{1/2}]O_2$, $Na_3V_2(PO_4)_3$, $Na_4Co_3(PO_4)_2P_2O_7$, $Na_3V_2(PO_4)_2F_3$ and/or $Na_3V_2(PO_4)_2FO_2$, as well as any complex oxides and/or other combinations of the foregoing.

Embodiment 57. The electrode assembly or secondary battery of Embodiment 56, wherein the cathodically active material comprises at least one of a transition metal oxide, transition metal sulfide, transition metal nitride, transition metal phosphate, and transition metal nitride.

Embodiment 58. The electrode assembly or secondary battery of any of Embodiments 56-57, wherein the cathodically active material comprises a transition metal oxide containing lithium and at least one of cobalt and nickel.

Embodiment 59. The electrode assembly or secondary battery of any preceding Embodiment, wherein members of the population of electrode structures comprise anode current collectors comprising at least one of copper, nickel, aluminum, stainless steel, titanium, palladium, baked carbon, calcined carbon, indium, iron, magnesium, cobalt, germanium, lithium, a surface treated material of copper or stainless steel with carbon, nickel, titanium, silver, an aluminum-cadmik.Arn alloy, and/or alloys thereof.

Embodiment 60. The electrode assembly or secondary battery of Embodiment 59, wherein members of the population of electrode structures comprise anode current collectors comprising at least one of copper, nickel, stainless steel and alloys thereof.

Embodiment 61. The electrode assembly or secondary battery of any preceding Embodiment, wherein the counter-electrode structures comprise cathode current collectors comprising at least one of stainless steel, aluminum, nickel, titanium, baked carbon, sintered carbon, a surface treated material of aluminum or stainless steel with carbon, nickel, titanium, silver, or an alloy thereof.

Embodiment 62. The electrode assembly or secondary battery of Embodiment 61, wherein the cathode current collectors comprising at least one of stainless steel, aluminum, nickel, titanium, baked carbon, sintered carbon, a surface treated material of aluminum or stainless steel with carbon, silver, or an ahoy thereof.

Embodiment 63. The electrode assembly or secondary battery of any of Embodiments 61-62, wherein the cathode current collectors comprising aluminum.

Embodiment 64. The electrode assembly or secondary battery of any preceding Embodiment, wherein the first and second connecting members of the constraint system comprise any of stainless steel, titanium, or glass fiber composite.

Embodiment 65. The electrode assembly or secondary battery of Embodiment 64, wherein the first and second connecting members of the constraint system comprises stainless steel.

Embodiment 66. The electrode assembly or secondary battery of any preceding Embodiment, wherein the first and second connecting members of the constraint system comprise a coating of insulating material on inner and outer surfaces thereof.

Embodiment 67. The electrode assembly or secondary battery of any preceding Embodiment, wherein the electrode assembly comprises at least 5 electrode structures and at least 5 counter-electrode structures.

Embodiment 68. The electrode assembly or secondary battery of any preceding Embodiment, wherein the electrode assembly comprises at least 10 electrode structures and at least 10 counter-electrode structures.

Embodiment 69. The electrode assembly or secondary battery of any preceding Embodiment, wherein the electrode assembly comprises at least 50 electrode structures and at least 50 counter-electrode structures.

Embodiment 70. The electrode assembly or secondary battery of any preceding Embodiment, wherein the electrode assembly comprises at least 100 electrode structures and at least 100 counter-electrode structures.

Embodiment 71. The electrode assembly or secondary battery of any preceding Embodiment, wherein the electrode assembly comprises at least 500 electrode structures and at least 500 counter-electrode structures.

Embodiment 72. A process of fabricating the secondary battery or electrode assembly of any preceding Embodiment, comprising: (a) stacking the population of electrode structures, population of counter-electrode structures, and the population of electrically insulating separator materials electrically separating members of the electrode and counter-electrode populations, in a stacked series; (b) placing a first side of at least one of adhesive film comprising the electrically-insulating, thermoplastic, hot-melt adhesive in contact with upper or lower inner surfaces of the first or second connecting members of the constraint system (c) placing the upper or lower end surfaces of the subset of the members of the electrode or counter-electrode population in contact with a second side of the at least one adhesive film and (d) at least partly melting or softening the at least one adhesive film by heating, to adhere the subset of the members of the electrode or counter-electrode population to the first and second connecting members.

Embodiment 73. The process of Embodiment 72, wherein first adhesive film(s) adhere the upper inner surface of the first connecting member to the upper end surfaces of the subset of members of the electrode or counter-electrode population, and second adhesive film(s) adhere the lower inner surface of the second connecting members to the lower end surfaces of the subset of members of the electrode or counter-electrode population.

Embodiment 74. The process of any of Embodiments 72-73, further comprising cutting the at least one adhesive film to form film cutouts having a predetermined pattern, and applying the film cutouts to the upper and lower inner surfaces of the first and second connecting members.

Embodiment 75. The process of any of Embodiments 72-74, further comprising applying a pressure to one or more of the first and second connecting members and the subset of members of the population of electrode structures and counter-electrode structures, to facilitate adhesion.

Embodiment 76. The process of Embodiment 75, comprising apply a pressure of at least 3 psi.

Embodiment 77. The process of any of Embodiments 72-76, wherein the at least one adhesive film is provide by an extrusion, cast film or blown film method.

Embodiment 78. The process of any of Embodiments 72-77, wherein the at least one adhesive film is cut into film cutouts using a laser or die.

Embodiment 79. The process of any of Embodiments 72-78, wherein the at least one adhesive film is cut into film cutouts that conforms to the shape of the upper and lower inner surfaces of the first and second connecting members.

Embodiment 80. The process of Embodiment 79, wherein the first and second connecting members comprise apertures formed through a vertical thickness of the respective members, and comprising placing the adhesive film cutouts along bonding regions of the inner surfaces of the first and second connecting members that are adjacent the apertures.

Embodiment 81. The process of any of Embodiments 72-80, wherein members of the population of electrode structures comprise electrode current collectors having opposing upper and lower end surfaces in the vertical direction, and members of the population of counter-electrode structures comprise counter-electrode current collectors having opposing upper and lower end surfaces in the vertical direction, and comprising placing the adhesive film cutouts in contact with vertical end surfaces of the electrode or counter-electrode current collectors of the subset of members of the electrode or counter-electrode population.

Embodiment 82. The process of any of Embodiments 72-81, comprising before, during or after contacting the at least one adhesive film with the first or second connecting members and the subset of members of the electrode or counter-electrode population, heating the adhesive film to a temperature of at least 75° C., and no more than 130° C.

Embodiment 83. The electrode assembly, secondary battery, or process of any of Embodiments 1-3 and 5-82, wherein the melt index value of the electrically-insulating, thermoplastic, hot-melt adhesive as measured according to ASTM D1238 is in a range of at least 20 to no more than 350.

Incorporation by Reference

All publications and patents mentioned herein, including those items listed below, are hereby incorporated by reference in their entirety for all purposes as if each individual publication or patent was specifically and individually incorporated by reference. In case of conflict, the present application, including any definitions herein, will control.

Equivalents

While specific embodiments have been discussed, the above specification is illustrative, and not restrictive. Many variations will become apparent to those skilled in the art upon review of this specification. The full scope of the embodiments should be determined by reference to the claims, along with their full scope of equivalents, and the specification, along with such variations.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained.

What is claimed is:

1. An electrode assembly for a secondary battery comprising a population of unit cells, a constraint system, and an adhesive, wherein
    the electrode assembly has mutually perpendicular longitudinal, transverse, and vertical axes, a first longitudinal end surface and a second longitudinal end surface separated from each other in a longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in a transverse direction, and a maximum height $H_{EA}$ bounded by the lateral surface and measured in a vertical direction,
    the electrode assembly further comprises a population of electrode structures, a population of counter-electrode structures, and an electrically insulating separator material electrically separating members of the electrode and counter-electrode populations, the members of the electrode and counter-electrode structure populations having opposing upper and lower end surfaces separated in the vertical direction, and wherein each member of the unit cell population comprises an electrode structure, a counter-electrode structure, and an electrically insulating separator between the electrode and counter-electrode structures,
    the constraint system comprises (i) first and second primary growth constraints separated in the longitudinal direction, (ii) first and second connecting members separated in the vertical direction that connect the first and second primary growth constraints, and a subset of the members of the electrode or counter-electrode population wherein the first and second connecting members have opposing upper and lower inner surfaces to which the upper and lower end surfaces of the subset are adhered, respectively, by an electrically-insulating, thermoplastic, hot-melt adhesive, wherein:
    the adhesive comprises a plurality of strips;
    a first strip of the plurality of strips partially covers the upper inner surface of the first connecting member;
    a second strip of the plurality of strips partially covers the lower inner surface of the second connecting member; and
    the adhesive has (i) a melting temperature in a range of 75° C. to 130° ° C., and (ii) a melt index value as measured according to ASTM D1238 in a range of at least 20 to no more than 350.

2. A secondary battery comprising the electrode assembly of claim 1.

3. The electrode assembly according to claim 1, wherein the melting temperature of the hot-melt adhesive is in a range of 77° C. to 100° C.

4. The electrode assembly according to claim 1, wherein the melt index value as measured according to ASTM D1238 is in a range of at least 70 to no more than 350.

5. The electrode assembly of claim 1, wherein the members of the population of electrode structures comprise electrode current collectors having opposing upper and lower end surfaces in the vertical direction, and members of the population of counter-electrode structures comprise counter-electrode current collectors having opposing upper and lower end surfaces in the vertical direction, and wherein the first and second connecting members are adhered to vertical end surfaces of the electrode or counter-electrode current collectors of the subset of members of the electrode or counter-electrode population.

6. The electrode assembly of claim 1, wherein the hot-melt adhesive comprises a material selected from EAA (ethylene-co-acrylic acid), EMAA (ethylene-co-methacrylic acid), functionalized polyethylenes and polypropylenes, and combinations thereof.

7. The electrode assembly of claim 1, wherein the hot-melt adhesive comprises a mixture of EAA and EMAA copolymers.

8. The electrode assembly of claim 1, wherein the hot-melt adhesive has a film shape with a thickness in a range of about 10 to about 100 micrometers and a predetermined pattern geometry.

9. The electrode assembly of claim 1, wherein the first or second connecting members comprise apertures formed through a vertical thickness of the respective members, and wherein the first or second connecting members comprise bonding regions of the upper and lower inner surfaces that are adjacent the apertures, where the hot melt adhesive is provided for adhering to the subset of the members of the electrode or counter-electrode population.

10. The electrode assembly of claim 9, wherein both first and second connecting members comprise apertures through the vertical thicknesses thereof.

11. The electrode assembly according to claim 9, wherein the apertures comprise a plurality of slots extending in the longitudinal direction, and wherein the bonding regions to adhere to the subset are located on inner surface regions in between the slots of the first or second connecting members.

12. The electrode assembly of claim 1, where a surface area of the first and second longitudinal end surfaces is less than 33% of the surface area of the electrode assembly.

13. The electrode assembly of claim 1, wherein a length $L_E$ of each member of the electrode structure population and a length $L_{CE}$ of each member of the counter-electrode structure population are measured in the transverse direction of their central longitudinal axis $A_E$ and $A_{CE}$, a width $W_E$ of each member of the electrode structure population and a width $W_{CE}$ of each member of the counter-electrode structure population are measured in the longitudinal direction, and a height $H_E$ of each member the electrode structure population and a height $H_{CE}$ of each member of the counter-electrode structure population is measured in the vertical direction that is perpendicular to the central longitudinal axis $A_E$ or $A_{CE}$ of each such member and to the longitudinal direction, a ratio of $L_E$ to each of $W_E$ and $H_E$ of each member of the electrode structure population being at least 5:1, respectively, a ratio of $H_E$ to $W_E$ for each member of the electrode structure population being between 0.4:1 and 1000:1, and a ratio of $L_{CE}$ to each of $W_{CE}$ and $H_{CE}$ of each member of the counter-electrode structure population being at least 5:1, respectively, a ratio of $H_{CE}$ to $W_{CE}$ for each member of the counter-electrode structure population being between 0.4:1 and 1000:1.

14. The electrode assembly of claim 1, wherein a ratio of each of $L_{EA}$ and $W_{EA}$ to $H_{EA}$ is at least 2:1.

15. The electrode assembly of claim 1, wherein a projection of members of the electrode structure population and the counter electrode structure populations onto the first longitudinal surface circumscribes a first projected area and a projection of the members of the electrode structure population and the counter electrode structure population onto the second longitudinal surface circumscribes a second projected area, and wherein the first and second primary growth constraints comprises first and second compression members that overlie the first and second projected areas.

16. The electrode assembly of claim 1, wherein the first and second primary growth constraints maintain a pressure on the electrode assembly in the longitudinal direction that exceeds a pressure maintained on the electrode assembly in the each of the two directions that are mutually perpendicular and perpendicular to the longitudinal direction, exceeds the pressure maintained on the electrode assembly in the each of the two directions that are mutually perpendicular and perpendicular to the longitudinal direction.

17. The electrode assembly of claim 1, wherein the first and second primary growth constraints maintain a pressure on the electrode assembly in the longitudinal direction that exceeds a pressure maintained on the electrode assembly in the each of the two directions that are mutually perpendicular and perpendicular to the longitudinal direction by a factor of at least 3, at least 4, or at least 5.

18. The electrode assembly of claim 1, wherein:
the first connecting member comprises a first plurality of apertures on the upper inner surface of the first connecting member; and
the second connecting member comprises a second plurality of apertures on the lower inner surface of the second connecting member.

19. The electrode of assembly 18, wherein:
the first strip is adjacent to a first aperture of the first plurality of apertures; and
the second strip is adjacent to a first aperture of the second plurality of apertures.

* * * * *